(12) United States Patent
Hirabayashi et al.

(10) Patent No.: US 9,623,376 B2
(45) Date of Patent: Apr. 18, 2017

(54) FUEL REFORMER AND EXHAUST GAS PURIFIER USING THE SAME

(75) Inventors: Hiroshi Hirabayashi, Tokyo (JP); Mitsuru Hosoya, Tokyo (JP); Keiichi Hayashizaki, Tokyo (JP); Shinya Sato, Tokyo (JP); Yoshihiro Kawada, Tokyo (JP); Satoshi Sato, Tokyo (JP); Hiroshi Inoue, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 466 days.

(21) Appl. No.: 14/344,852

(22) PCT Filed: Sep. 12, 2012

(86) PCT No.: PCT/JP2012/073289
§ 371 (c)(1),
(2), (4) Date: Aug. 29, 2014

(87) PCT Pub. No.: WO2013/039091
PCT Pub. Date: Mar. 21, 2013

(65) Prior Publication Data
US 2014/0369890 A1    Dec. 18, 2014

(30) Foreign Application Priority Data

Sep. 14, 2011  (JP) .................. 2011-200371
Jan. 16, 2012  (JP) .................. 2012-005805

(51) Int. Cl.
*C01B 3/36*     (2006.01)
*B01D 53/90*    (2006.01)
(Continued)

(52) U.S. Cl.
CPC ......... *B01D 53/9431* (2013.01); *B01D 53/90* (2013.01); *B01J 19/2485* (2013.01);
(Continued)

(58) Field of Classification Search
CPC ...... C01B 3/00; C01B 2300/1614–2300/1638; C01B 2203/1614–2203/1638; F01N 2240/30
See application file for complete search history.

(56) References Cited

U.S. PATENT DOCUMENTS 3,982,910 A    9/1976  Houseman et al.
4,033,133 A *  7/1977  Houseman .............. C01B 3/386
                                             123/179.8
(Continued)

FOREIGN PATENT DOCUMENTS

JP    61-116731 U1    7/1986
JP    3-179121 A      8/1991
(Continued)

OTHER PUBLICATIONS

International Preliminary Report on Patentability dated Nov. 8, 2013, for corresponding International Application No. PCT/JP2012/073289, 11 pages.
(Continued)

*Primary Examiner* — Matthew Merkling
(74) *Attorney, Agent, or Firm* — Seed IP Law Group LLP

(57) ABSTRACT

A carrier gas supplied from a carrier gas source is injected from a carrier gas injection nozzle. Also, a fuel including a hydrocarbon-based liquid and supplied from a fuel source is supplied to a tip end of the carrier gas injection nozzle, whereby this fuel is atomized with the carrier gas injected from the carrier gas injection nozzle. Furthermore, an inlet of a reforming part that decomposes the atomized fuel and reforms the atomized fuel into a reducing gas including either or both of hydrogen and an oxygen-containing hydrocarbon is provided so as to face the carrier gas injection nozzle and the fuel supply nozzle, and a reducing gas supply (Continued)

nozzle that supplies the reducing gas discharged from an outlet of the reforming part is provided in an exhaust pipe.

15 Claims, 32 Drawing Sheets

(51) Int. Cl.
    *B01D 53/94*     (2006.01)
    *F01N 3/20*     (2006.01)
    *C01B 3/38*     (2006.01)
    *B01J 19/24*     (2006.01)

(52) U.S. Cl.
    CPC ............ *C01B 3/36* (2013.01); *C01B 3/382* (2013.01); *F01N 3/206* (2013.01); *B01D 53/9418* (2013.01); *B01D 2251/202* (2013.01); *B01D 2251/208* (2013.01); *B01D 2255/104* (2013.01); *B01D 2255/2092* (2013.01); *B01D 2255/20738* (2013.01); *B01D 2255/20761* (2013.01); *B01D 2255/50* (2013.01); *B01D 2259/122* (2013.01); *B01J 2219/2414* (2013.01); *B01J 2219/2419* (2013.01); *B01J 2219/2428* (2013.01); *B01J 2219/2438* (2013.01); *C01B 2203/0233* (2013.01); *C01B 2203/0261* (2013.01); *C01B 2203/107* (2013.01); *C01B 2203/1052* (2013.01); *C01B 2203/1064* (2013.01); *C01B 2203/1288* (2013.01); *F01N 2240/30* (2013.01); *F01N 2610/03* (2013.01); *F01N 2610/04* (2013.01); *F01N 2610/08* (2013.01)

(56) References Cited

U.S. PATENT DOCUMENTS

| | | | | |
|---|---|---|---|---|
| 2001/0026777 | A1* | 10/2001 | Negishi | B01B 1/005 422/112 |
| 2004/0018132 | A1* | 1/2004 | Bartley | B01D 53/9409 423/239.1 |
| 2004/0144083 | A1* | 7/2004 | Ament | B01D 53/9454 60/286 |
| 2006/0201139 | A1* | 9/2006 | Khadiya | F01N 3/035 60/286 |
| 2007/0000239 | A1* | 1/2007 | Liu | B01D 53/9409 60/286 |
| 2007/0044454 | A1* | 3/2007 | Bonadies | F01N 3/0253 60/289 |
| 2007/0101698 | A1* | 5/2007 | Goulette | F01N 3/0231 60/284 |
| 2009/0246569 | A1 | 10/2009 | Muehlner et al. | |

FOREIGN PATENT DOCUMENTS

| | | |
|---|---|---|
| JP | 4-214918 A | 8/1992 |
| JP | 6-101454 A | 4/1994 |
| JP | 2000-186532 A | 7/2000 |
| JP | 2001-055918 A | 2/2001 |
| JP | 2002-106338 A | 4/2002 |
| JP | 2002-514495 A | 5/2002 |
| JP | 2002-221024 A | 8/2002 |
| JP | 2004-251273 A | 9/2004 |
| JP | 2004-284835 A | 10/2004 |
| JP | 2005-127291 A | 5/2005 |
| JP | 2006-242020 A | 9/2006 |
| JP | 2006-283604 A | 10/2006 |
| JP | 2007-009701 A | 1/2007 |
| JP | 2009-097422 A | 5/2009 |
| JP | 2011-032952 A | 2/2011 |
| JP | 2011-069270 A | 4/2011 |
| JP | 2011-153580 A | 8/2011 |
| WO | 2005/124917 A2 | 12/2005 |

OTHER PUBLICATIONS

Written Opinion of the International Searching Authority dated Nov. 30, 2012, for corresponding International Application No. PCT/JP2012/073289, 6 pages.

International Search Report, dated Dec. 11, 2012, for corresponding International Application No. PCT/JP2012/073289, 9 pages.

* cited by examiner

FUEL REFORMER AND EXHAUST GAS PURIFIER USING THE SAME

TECHNICAL FIELD

The present invention relates to a reformer that decomposes a fuel including a hydrocarbon-based liquid to reform it into a reducing gas and to an apparatus that purifies NOx in an exhaust gas of an engine by using, as a reducing agent, the reducing gas reformed by this reformer.

BACKGROUND ART

Conventionally, as an exhaust gas purifier of this type, there is disclosed an exhaust purifier that is configured so that an oxidation catalyst for oxidizing a part of NO in an exhaust gas to $NO_2$ is provided in an exhaust pipe of an internal combustion engine, a NOx trapping catalyst for trapping NOx in the exhaust gas in copresence of hydrogen is provided in the exhaust pipe on a downstream side of the oxidation catalyst, a hydrogen supply means for reforming a fuel to generate a reductive gas containing at least hydrogen and supplying this reductive gas between the oxidation catalyst and the NOx trapping catalyst in the exhaust pipe is provided separately from the exhaust pipe; and furthermore, a control means supplies the reductive gas by the hydrogen supply means under conditions including a condition that a temperature of the exhaust gas is in a predetermined range (see, for example, Patent Literature 1). In this exhaust purifier, a first catalyst converter and a second catalyst converter are provided in the exhaust pipe in this order from the upstream side, and a supply port of a fuel reformer is provided between the first catalyst converter and the second catalyst converter in the exhaust pipe. The fuel reformer has a reformed gas introducing passageway, one end side of which is connected to the supply port, a reforming catalyst provided in this reformed gas introducing passageway, and a fuel gas supply device for supplying a fuel gas to the reforming catalyst from the other end side of the reformed gas introducing passageway. This fuel reformer reforms the fuel of the engine by the action of the reforming catalyst, to thereby generate the reformed gas of the reductive gas containing hydrogen ($H_2$), carbon monoxide (CO), and hydrocarbon (HC). It is noted that the fuel reformer is provided with a heating heater containing a glow plug, a spark plug, and the like and is configured so that the reforming catalyst can be heated when the fuel reformer is started. According to this, the temperature of the reformed gas generated by the fuel reformer reaches a high temperature in a range of from about 500° C. to 800° C.

Meanwhile, the reforming catalyst contains at least one metal catalyst component selected from the group consisting of rhodium, platinum, palladium, nickel, and cobalt, and at least one oxide selected from the group consisting of ceria, zirconia, alumina, and titania, or a composite oxide including such a material as a basic composition. This reforming catalyst reforms the fuel gas supplied from the fuel gas supply device, to thereby generate the reformed gas containing hydrogen, carbon monoxide, and a hydrocarbon. Also, the reformed gas generated with the reforming catalyst passes through the reformed gas introducing passageway and is supplied from the supply port into the exhaust pipe. Furthermore, a reformed gas introducing valve for controlling a flow rate of the reformed gas, which passes through this reformed gas introducing passageway and is introduced into the exhaust pipe, is provided in an intermediate portion of the reformed gas introducing passageway. This reformed gas introducing valve is connected to an ECU via an actuator, and a supply amount of the reformed gas to the exhaust pipe via the reformed gas introducing passageway is controlled by the ECU.

In the thus configured exhaust purifier, since the oxidation catalyst for oxidizing a part of NO in the exhaust gas to $NO_2$ is provided on the upstream side of the NOx trapping catalyst for trapping NOx in the exhaust gas in copresence of hydrogen, a mixed gas of $NO_2$-rich NO and $NO_2$ can be supplied to the NOx trapping catalyst. As a result, a NOx trapping performance by the NOx trapping catalyst at a low temperature immediately after start of the internal combustion engine can be enhanced. More specifically, even if the temperature of the NOx trapping catalyst is about 50° C. or lower, it is possible to commence trapping of a significant amount of NOx. In this way, NOx in the exhaust gas can be trapped with the NOx trapping catalyst by supplying the reductive gas containing hydrogen to the NOx trapping catalyst whose NOx trapping performance has been enhanced in this way, under conditions including a condition that the temperature of the exhaust gas is in a predetermined range, more specifically in a low temperature region, and therefore, a NOx purification rate at the cold machine time immediately after start of the internal combustion engine can be enhanced. Also, since the hydrogen supply means is provided separately from the exhaust pipe, even at the cold machine time period, the reductive gas can be stably supplied without causing an accidental fire on the internal combustion engine. Also, by supplying the reductive gas under the conditions including the condition that the temperature of the exhaust gas in the predetermined range which is in the low temperature region, the reductive gas is made to reach the NOx trapping catalyst without burning hydrogen, thereby enabling it to contribute to trapping of NOx. Furthermore, the oxidation catalyst is provided on the upstream side of the NOx trapping catalyst to supply the mixed gas of NO and $NO_2$ to the NOx trapping catalyst, and therefore, the NOx trapping performance of the NOx trapping catalyst at the low temperature immediately after start of the internal combustion engine can be enhanced. As a result, it becomes unnecessary to dispose the NOx trapping catalyst in the vicinity of the internal combustion engine.

Meanwhile, there is disclosed an internal combustion engine that is configured so that a turbo supercharger and an exhaust gas purification catalyst are provided in an exhaust passageway, through which an exhaust gas discharged from an exhaust port of a cylinder head passes, in such a manner that the turbo supercharger is located on an upstream side and the exhaust gas purification catalyst is located on a downstream side, and a fuel can be vaporized and supplied to the exhaust gas purification catalyst (see, for example, Patent Literature 2). In this internal combustion engine, a vaporization chamber for vaporizing the fuel by heating with heat of the exhaust gas is provided in a portion of the exhaust passageway on the upstream side of the turbo supercharger, and this vaporization chamber is connected to a portion of the exhaust passageway on the downstream side of the turbo supercharger. Also, the vaporization chamber is integrally provided with a part of an exhaust manifold fixed to the cylinder head in such a manner that an interior of the vaporization chamber and an interior of the exhaust manifold are partitioned by a partition wall, and the above-described partition wall is provided with a communication hole for injecting only a small amount of the exhaust gas into the vaporization chamber.

In the thus configured internal combustion engine, nevertheless the fuel is vaporized utilizing the heat of the exhaust gas, it is possible to avoid the fuel for reducing the catalyst from being introduced into the turbo supercharger. Therefore, nevertheless its structure is simple, it is possible to prevent a turbine or the like of the turbo supercharger from erosion or to prevent properties of the exhaust gas from deterioration on the occasion that the exhaust gas is returned to the exhaust gas to the cylinder. In particular, since the fuel is exposed to the exhaust gas, the fuel can be vaporized rapidly and surely, and since the vaporized fuel is quickly fed to the catalyst by a pressure (positive pressure) of the exhaust gas, there is brought such an advantage that the responsibility is high.

Also, there is disclosed an exhaust gas purifier of a diesel engine in which a vaporization combustion chamber for a reducing agent in which a vaporization chamber for the reducing agent is integrated with a protector so that vaporization and combustion of the reducing agent are not affected by an exhaust gas flow is provided on an upstream side of a catalyst part for denitration of an exhaust gas discharge passage (see, for example, Patent Literature 3). In this exhaust gas purifier, magnetite ($Fe_3O_4$) is used as a denitration catalyst, and this magnetite is used in a shape having a large contact area with the exhaust gas, for example, a granulate shape, a pellet shape, a honeycomb shape, etc. Also, as a hydrocarbon which is used as the reducing agent, light oil, heavy oil, benzin, methane, ethane, and the like can be used. Furthermore, in order to increase combustion properties of the reducing agent or for the nitration reaction of the exhaust gas, secondary air is introduced into the exhaust gas discharge passage.

In the thus configured exhaust gas purifier of the diesel engine, when the reducing agent including a hydrocarbon or an alcohol and secondary air (oxygen) are added to the exhaust gas and the mixture is brought into contact with magnetite ($Fe_3O_4$), NOx in the exhaust gas is reduced and converted into nitrogen. Also, when the reducing agent such as light oil or heavy oil is burnt with high efficiency in a place where the exhaust gas of the diesel engine always flows, particulate on the catalyst surface is removed, and the denitration of the diesel engine can be efficiently achieved while cleaning the catalyst surface. For that reason, when the vaporization combustion chamber for the reducing agent is provided on the upstream side of the catalyst part disposed in the exhaust gas discharge passageway and when the reducing agent is vaporized in this vaporization combustion chamber, even if the exhaust gas of the diesel engine is discharged, the protector does not hinder the vaporization and combustion of the reducing agent in the vaporization combustion chamber, and therefore, the vaporization and combustion of the reducing agent are performed in the vaporization combustion chamber without hindrance. As a result, by setting up the vaporization combustion chamber capable of surely performing the vaporization of the reducing agent and the combustion of the reducing agent and being free from hindrance of the combustion by the exhaust gas in the exhaust gas passage of the diesel engine, the particulate on the catalyst surface is effectively removed, and the denitration of the exhaust gas of the diesel engine can be efficiently achieved while cleaning the catalyst surface.

CITATION LIST

Patent Literature

Patent Literature 1: JP 2011-69270 A (claim 1, paragraphs [0013], [0014], and [0024] to [0030], and FIG. 1)

Patent Literature 2: JP 2006-283604 A (claims 1 and 2, paragraphs [0008] and [0009], and FIGS. 1 and 2)
Patent Literature 3: JP Hei. 6-101454 A (claim 1, paragraphs [0012] to [0014] and [0027], and FIG. 1)

SUMMARY OF THE INVENTION

Technical Problem

However, in the exhaust purifier disclosed in the above-described conventional Patent Literature 1, by heating the reforming catalyst by the heating heater including the glow plug, a spark plug, or the like and supplying the fuel gas from the fuel gas supply device to this reforming catalyst, the reformed gas having a temperature of from about 500° C. to 800° C. is generated. However, a specific configuration is not described, and there is such a defect that the fuel gas cannot be efficiently reformed into the reformed gas. Also, for example, there is a concern that when the reforming catalyst is directly heated by the glow plug, the spark plug, or the like, a portion of the reforming catalyst being in contact with the glow plug or the like, or a portion of the reforming catalyst in close vicinity thereto becomes extremely high in temperature and deteriorates. Meanwhile, in the internal combustion engine disclosed in the above-described conventional Patent Literature 2 and the exhaust gas purifier disclosed in the Patent Literature 3, the fuel for reduction and the reducing agent are heated and vaporized by the exhaust gas, and therefore, there is such a defect that immediately after start of the engine or when the exhaust gas temperature is relatively low, the fuel for reduction or the like cannot be sufficiently vaporized, and NOx in the exhaust gas cannot be efficiently decreased.

A first object of the present invention is to provide a fuel reformer that can sufficiently atomize a fuel by means of injection of a carrier gas, whereby the fuel can be efficiently reformed into a reducing gas. A second object of the present invention is to provide a fuel reformer that can prevent deterioration of the reforming catalyst when a glow plug and a reforming catalyst are used. A third object of the present invention is to provide a fuel reformer in which a reformer housing can be relatively easily attached to an exhaust pipe together with a reducing gas supply nozzle. A fourth object of the present invention is to provide a fuel reformer in which by sufficiently ensuring a carrier gas passage in a carrier gas heating part, a carrier gas can be sufficiently heated in the carrier gas heating part, and a fuel does not flow in the carrier gas passage of the carrier gas heating part, but only the carrier gas flows therein, whereby adhering of the fuel onto an inner wall of the carrier gas passage can be hindered, and the carrier gas smoothly flows in the carrier gas passage. A fifth object of the present invention is to provide an exhaust gas purifier using a fuel reformer, in which even if the exhaust gas temperature is a relatively low temperature or the exhaust gas temperature is in a wide temperature range of from a relatively low temperature to a high temperature, NOx can be efficiently decreased. A sixth object of the present invention is to provide an exhaust gas purifier in which by vaporizing or vaporizing and misting a liquid fuel by heating and bringing this vaporized or vaporized and misted fuel into contact with a reforming catalyst in a high pressure state, a reformation reaction of the fuel with the reforming catalyst can be promoted.

Solution to Problem

As shown in FIGS. 1 to 3, a first aspect of the invention is a fuel reformer including a carrier gas injection nozzle 17, a fuel supply nozzle 19, a reforming part 22, and a reducing gas supply nozzle 23. The carrier gas injection nozzle 17 injects a carrier gas supplied from a carrier gas source 14. The fuel supply nozzle 19 supplies a fuel 18, including a hydrocarbon-based liquid and supplied from a fuel source 37, to a tip end of the carrier gas injection nozzle 17 so that the fuel 18 is atomized with the carrier gas injected from the carrier gas injection nozzle 17. The reforming part 22 that includes an inlet that faces the carrier gas injection nozzle 17 and the fuel supply nozzle 19 and that decomposes the atomized fuel 18 so as to reform the atomized fuel 18 into a reducing gas including either or both of hydrogen and an oxygen-containing hydrocarbon. The reducing gas supply nozzle 23 that is attached to in an exhaust pipe 12 of an engine 11 so as to supply the reducing gas discharged from an outlet of the reforming part 22 to the exhaust pipe 11.

In a second aspect of the invention that is an invention based on the first aspect, as further shown in FIG. 1, the reforming part 22 includes a glow plug 22a that decomposes a part or a large part of the atomized fuel 18 by heating the atomized fuel 18 so as to reform the part or the large part of atomized fuel 18 into the reducing gas including either or both of the hydrogen and the oxygen-containing hydrocarbon.

In a third aspect of the invention that is an invention based on the second aspect, as further shown in FIG. 4, the reforming part 72 includes the glow plug 22a and a reforming catalyst 72b. The reforming catalyst 72b is provided between the glow plug 22a and the reducing gas supply nozzle 23 at a predetermined distance from the glow plug 22a. The reforming catalyst 72b decomposes a part or a large part of a remaining atomized fuel 18 so as to reduce the part or the large part of the remaining atomized fuel 18 into the reducing gas including either or both of the hydrogen and the oxygen-containing hydrocarbon.

In a fourth aspect of the invention that is an invention based on the first aspect, as further shown in FIG. 5, a fuel vaporizer 91 that vaporizes a part or a large part of the fuel 18 by heating is provided between the fuel source and the fuel supply nozzle 19.

A fifth aspect of the invention that is an invention based on the first aspect, as further shown in FIGS. 8 and 11, further includes a carrier gas heating part 116, a carrier gas temperature sensor 132, and a controller 57. The carrier gas heating part 116 is provided between the carrier gas source 14 and the carrier gas injection nozzle 17 and can adjust an amount of heat generation for heating the carrier gas supplied from the carrier gas source 14 The carrier gas temperature sensor 132 detects an outlet temperature of the carrier gas heating part 116 The controller 57 controls the amount of heat generation of the carrier gas heating part 116 based on a detection output of the carrier gas temperature sensor 132 and controls a supply flow rate of the fuel 18 to the fuel supply nozzle 19 according to a flow rate of NOx flowing through the exhaust pipe 12 The reforming part 122 includes either or both of the glow plug and the reforming catalyst 122a.

In a sixth aspect of the invention that is an invention based on the fifth aspect, as further shown in FIG. 8, the carrier gas heating part 116, the carrier gas injection nozzle 17, the fuel supply nozzle 19, and the reforming part 122 are housed in a reformer housing 124. The reformer housing 124 is connected to a base end of the reducing gas supply nozzle 23.

In a seventh aspect of the invention that is an invention based on the fifth aspect, as further shown in FIGS. 8 and 9, the carrier gas heating part 116 includes a coil holding part 116a, a heating coil 116c, and a carrier gas passage coil 116d. The coil holding part 116a is formed in a columnar shape. The heating coil 116c is embedded so as to extend along an outer peripheral surface of this coil holding part 116a and not to be exposed on the outer peripheral surface of the coil holding part 116a. The carrier gas passage coil 116d is helically wound around the outer peripheral surface of the coil holding part 116a to thereby form a carrier gas passage 116d through which the carrier gas flows helically along the outer peripheral surface of the coil holding part 116a.

In an eighth aspect of the invention that is an invention based on the first aspect, as further shown in FIGS. 12 and 13, a bypass pipe 154 that bypasses the reforming part 122 is provided. A circulation pump 156 that returns the reducing gas and the atomized fuel 18, which are discharged from the reforming part 122, to just before the carrier gas injection nozzle 17 is provided in the bypass pipe 154. A temperature of the reforming part 122 is detected by a reforming part temperature sensor 151, 152. The controller 57 controls the circulation pump 156 based on a detection output of the reforming part temperature sensor 151, 152.

As shown in FIGS. 15 to 17, a ninth aspect of the invention is a fuel reformer including a carrier gas heating part 116, a first carrier gas injection nozzle 181, a first fuel supply nozzle 191, an exothermic catalyst part 174, a second carrier gas supply pipe 172, a second carrier gas injection nozzle 182, a second fuel supply nozzle 192, a reforming part 122, a reducing gas supply nozzle 23, a first carrier gas temperature sensor 271, a second carrier gas temperature sensor 272, and a controller 57. The carrier gas heating part 116 can adjust an amount of heat generation for heating a first carrier gas supplied from a carrier gas source 14 through a first carrier gas supply pipe 171. The first carrier gas injection nozzle 181 injects the first carrier gas heated by the carrier gas heating part 116. The first fuel supply nozzle 191 supplies a fuel 18 including a hydrocarbon-based liquid to a tip end of the first carrier gas injection nozzle 181 so that the fuel 18 is atomized with the first carrier gas injected from the first carrier gas injection nozzle 181. The exothermic catalyst part 174 includes an inlet facing the first carrier gas injection nozzle 181 and the first fuel supply nozzle 191 and oxidizes the atomized fuel 18 to further heat the first carrier gas and to increase a temperature thereof. The second carrier gas supply pipe 172 mixes a second carrier gas supplied from the carrier gas source 14 with the first carrier gas heated by the exothermic catalyst part 174. The second carrier gas injection nozzle 182 injects the mixed carrier gas of the first and second carrier gases. The second fuel supply nozzle 192 supplies the fuel 18 including the hydrocarbon-based liquid to a tip end of the second carrier gas injection nozzle 182 so that the fuel 18 is atomized with the mixed carrier gas injected from the second carrier gas injection nozzle 182. The reforming part 122 includes an inlet facing the second carrier gas injection nozzle 182 and the second fuel supply nozzle 192 and decomposes the atomized fuel 18 to reform the atomized fuel 18 into a reducing gas including either or both of hydrogen and an oxygen-containing hydrocarbon. The reducing gas supply nozzle 23 is attached to an exhaust pipe 12 of an engine 11 so as to supply, to the exhaust pipe 12, the reducing gas discharged from an outlet of the reforming part 122. The first carrier gas temperature sensor 271 detects an outlet temperature of the carrier gas heating part 116. The second carrier gas temperature sensor 272 detects an outlet temperature of the exothermic catalyst part 174. The controller 57 controls the amount of heat generation of the carrier gas heating part 116 based on a detection output of the first carrier gas temperature sensor 271, controls a supply flow rate of the fuel 18 to the first fuel supply nozzle 191 based on a detection output of the second carrier gas temperature sensor 272, and further controls a supply flow rate of the fuel 18 to the second fuel supply nozzle 192 according to a flow rate of NOx flowing through the exhaust pipe 12.

In a tenth aspect of the invention that is an invention based on the ninth aspect, as further shown in FIG. 15, the carrier gas heating part 116, the first carrier gas injection nozzle 181, the first fuel supply nozzle 191, the exothermic catalyst part 174, the second carrier gas injection nozzle 182, the second fuel supply nozzle 192, and the reforming part 122 are housed in a reformer housing 176. The reformer housing 176 is connected to a base end of the reducing gas supply nozzle 23.

In an eleventh aspect of the invention that is an invention based on the ninth aspect, as further shown in FIGS. 15 and 16, the carrier gas heating part 116 includes a coil holding part 116a, a heating coil 116c, and a carrier gas passage coil 116d. The coil holding part 116a is formed in a columnar shape. The heating coil 116c is embedded so as to extend along an outer peripheral surface of this coil holding part 116a and not to be exposed on the outer peripheral surface of the coil holding part 116a. The carrier gas passage coil 116d is helically wound around the outer peripheral surface of the coil holding part 116a, to thereby form a carrier gas passage 116e through which the first carrier gas flows helically along the outer peripheral surface of the coil holding part 116a.

As shown in FIGS. 1 to 3, a twelfth aspect of the invention is an exhaust gas purifier including a selective reduction catalyst 31, a fuel reformer 13, an exhaust gas temperature sensor 53, and a controller 57. The selective reduction catalyst 31 is provided in an exhaust pipe 12 of an engine 11 and can reduce NOx in an exhaust gas to N2. The fuel reformer 13 includes a reducing gas supply nozzle 23 extending to the exhaust pipe 12 on an exhaust gas upstream side of the selective reduction catalyst 31 and supplies, from the reducing gas supply nozzle 23 to the exhaust pipe 12, a reducing gas functioning as a reducing agent in the selective reduction catalyst 31. The exhaust gas temperature sensor 53 detects an exhaust gas temperature related to the selective reduction catalyst 31. The controller 57 controls the fuel reformer 13 based on a detection output of the exhaust gas temperature sensor 53. The fuel reformer 13 includes a carrier gas injection nozzle 17, a fuel supply nozzle 19, a reforming part 22, and a reducing gas supply nozzle 23. The carrier gas injection nozzle 17 injects a carrier gas supplied from a carrier gas source 14. The fuel supply nozzle 19 supplies a fuel 18, including a hydrocarbon-based liquid and supplied from a fuel source 37, to a tip end of the carrier gas injection nozzle 17 so that the fuel 18 is atomized with the carrier gas injected from the carrier gas injection nozzle 17. The reforming part 22 includes an inlet that faces the carrier gas injection nozzle 17 and the fuel supply nozzle 19 and decomposes the atomized fuel 18 so as to reform the atomized fuel 18 into the reducing gas including either or both of hydrogen and an oxygen-containing hydrocarbon. The reducing gas supply nozzle 23 is attached to in the exhaust pipe 12 of the engine 11 so as to supply, to the exhaust pipe 12, the reducing gas discharged from an outlet of the reforming part 22.

As shown in FIGS. 15 to 18, a thirteenth aspect of the invention is an exhaust gas purifier including a selective reduction catalyst 31, a fuel reformer 173, an exhaust gas temperature sensor 53, and a controller 57. The selective reduction catalyst 31 is provided in an exhaust pipe 12 of an engine 11 and can reduce NOx in an exhaust gas to N2. The fuel reformer 173 includes a reducing gas supply nozzle 23 extending to the exhaust pipe 12 on an exhaust gas upstream side of the selective reduction catalyst 31 and supplies, from the reducing gas supply nozzle 23 to the exhaust pipe 12, a reducing gas functioning as a reducing agent in the selective reduction catalyst 31. The exhaust gas temperature sensor 53 detects an exhaust gas temperature related to the selective reduction catalyst 31. The controller 57 controls the fuel reformer 173 based on a detection output of the exhaust gas temperature sensor 53. The fuel reformer 173 includes a carrier gas heating part 116, a first carrier gas injection nozzle 181, a first fuel supply nozzle 191, an exothermic catalyst part 174, a second carrier gas supply pipe 172, a second carrier gas injection nozzle 182, a second fuel supply nozzle 192, a reforming part 122, a reducing gas supply nozzle 23, a first carrier gas temperature sensor 271, a second carrier gas temperature sensor 272, and a controller 57. The carrier gas heating part 116 can adjust an amount of heat generation for heating a first carrier gas supplied from a carrier gas source 14 through a first carrier gas supply pipe 171. The first carrier gas injection nozzle 181 injects the first carrier gas heated by the carrier gas heating part 116. The first fuel supply nozzle 191 supplies a fuel 18 including a hydrocarbon-based liquid to a tip end of the first carrier gas injection nozzle 181 so that the fuel 18 is atomized with the first carrier gas injected from the first carrier gas injection nozzle 181. The exothermic catalyst part 174 includes an inlet facing the first carrier gas injection nozzle 181 and the first fuel supply nozzle 191 and oxidizes the atomized fuel 18 to further heat the first carrier gas and to increase a temperature thereof. The second carrier gas supply pipe 172 mixes a second carrier gas supplied from the carrier gas source 14 with the first carrier gas heated by the exothermic catalyst part 174. The second carrier gas injection nozzle 182 injects the mixed carrier gas of the first and second carrier gases. The second fuel supply nozzle 192 supplies the fuel 18 including the hydrocarbon-based liquid to a tip end of the second carrier gas injection nozzle 182 so that the fuel 18 is atomized with the mixed carrier gas injected from the second carrier gas injection nozzle 182. The reforming part 122 includes an inlet facing the second carrier gas injection nozzle 182 and the second fuel supply nozzle 192 and decomposes the atomized fuel 18 to reform the atomized fuel 18 into the reducing gas including either or both of hydrogen and an oxygen-containing hydrocarbon. The reducing gas supply nozzle 23 is attached to the exhaust pipe 12 of the engine 11 so as to supply, to the exhaust pipe 12, the reducing gas discharged from an outlet of the reforming part 122. The first carrier gas temperature sensor 271 detects an outlet temperature of the carrier gas heating part 116. The second carrier gas temperature sensor 272 detects an outlet temperature of the exothermic catalyst part 174. The controller 57 controls the amount of heat generation of the carrier gas heating part 116 based on a detection output of the first carrier gas temperature sensor 271, controls a supply flow rate of the fuel 18 to the first fuel supply nozzle 191 based on a detection output of the second carrier gas temperature sensor 272, and further controls a supply flow rate of the fuel 18 to the second fuel supply nozzle 192 according to a flow rate of NOx flowing through the exhaust pipe 12.

As shown in FIGS. 19 to 21, a fourteenth aspect of the invention is an exhaust gas purifier for purifying an exhaust gas of an engine 11. The exhaust gas purifier includes a selective reduction catalyst 31, a fuel reformer 313, fuel supply device 316, an injecting nozzle 318, an exhaust gas temperature sensor 53, a pressure sensor 348, and a controller 57. The selective reduction catalyst 31 is provided in an exhaust pipe 12 of the engine 11 and can reduce NOx in the exhaust gas to N2. The fuel reformer 313 heats a liquid fuel 18 in a hermetically sealed reforming case 327 by a heater 331 to vaporize or vaporize and mist the liquid fuel 18 and further reforms the vaporized or vaporized and misted fuel 18 with a reforming catalyst 328 into a hydrocarbon-based gas. The fuel supply device 316 supplies the fuel 18 into the fuel reformer 313. The injecting nozzle 318 extends to an exhaust pipe 12 on an exhaust gas upstream side of the selective reduction catalyst 31 and can inject the hydrocarbon-based gas reformed with the reforming catalyst 328. The exhaust gas temperature sensor 53 detects an exhaust gas temperature related to the selective reduction catalyst 31. The pressure sensor 348 detects an inlet pressure of the fuel reformer 313. The controller 57 controls the fuel reformer 313 and the fuel supply device 316 based on respective detection outputs of the exhaust gas temperature sensor 53 and the pressure sensor 348.

In a fifteenth aspect of the invention that is an invention based on the fourteenth aspect, as further shown in FIGS. 20 and 21, the fuel reformer 313 includes the hermetically sealed cylindrical reforming case 327, the reforming catalyst 328, a fuel passageway 329, and the heater 331. The reforming catalyst 328 is housed in this reforming case 327. The fuel passageway 329 is provided helically between an inner peripheral surface of the reforming case 327 and an outer peripheral surface of the reforming catalyst 328. The heater 331 is helically arranged so as to surround the fuel passageway 329 and is embedded in a wall of the reforming case 327.

A sixteenth aspect of the invention that is an invention based on the fourteenth aspect further includes a bypass pipe 343 and an opening degree regulation valve 344. The bypass pipe 343 communicates and connects an inlet part and an outlet part of the fuel reformer 313 with each other so as to bypass the fuel reformer 313. The opening degree regulation valve 344 is provided in the bypass pipe 343 and that regulates an opening degree of the bypass pipe 343.

Advantageous Effects of Invention

According to the fuel reformer of the first aspect of the present invention, by injecting the carrier gas, which is supplied from the carrier gas source, from the carrier gas injection nozzle and atomizing the fuel supplied from the fuel supply nozzle with the carrier gas injected from the above-described carrier gas injection nozzle, this atomized fuel is decomposed in the reforming part and reformed into the reducing gas. As a result, the fuel can be efficiently reformed into the reducing gas.

According to the fuel reformer of the second aspect of the present invention, by injecting the carrier gas, which is supplied from the carrier gas source, from the carrier gas injection nozzle and atomizing the fuel supplied from the fuel supply nozzle with the carrier gas injected from the above-described carrier gas injection nozzle, this atomized fuel is heated and decomposed by the glow plug and reformed into the reducing gas. As a result, the fuel can be efficiently reformed into the reducing gas even without using a reforming catalyst.

According to the fuel reformer of the third aspect of the present invention, by injecting the carrier gas, which is supplied from the carrier gas source, from the carrier gas injection nozzle and atomizing the fuel supplied from the fuel supply nozzle with the carrier gas injected from the above-described carrier gas injection nozzle, a part or a residue of this atomized fuel is heated and decomposed by the glow plug and reformed into the reducing gas, and thereafter, a part or a large part of the remaining atomized fuel is decomposed with the reforming catalyst and reformed into the reducing gas. As a result, not only the fuel can be more efficiently reformed into the reducing gas, but also even though the glow plug and the reforming catalyst are used, the glow plug is provided apart from the reforming catalyst without being in contact with the reforming catalyst or being in close vicinity thereto, and therefore, deterioration of the reforming catalyst can be prevented.

According to the fuel reformer of the fourth aspect of the present invention, a part or a large part of the fuel supplied from the fuel source is heated and vaporized by the fuel vaporizer and then supplied from the fuel supply nozzle, and therefore, this vaporized fuel is uniformly mixed with the carrier gas injected from the carrier gas injection nozzle to constitute a fuel gas, and the fuel in the liquid state is atomized by the carrier gas injected from the carrier gas injection nozzle. As a result, the fuel gas containing the atomized fuel is decomposed in the reforming part and rapidly reformed into the reducing gas, and therefore, the fuel can be efficiently reformed into the reducing gas.

According to the fuel reformer of the fifth aspect of the present invention, by heating the carrier gas supplied from the carrier gas source in the carrier gas heating part, injecting this heated carrier gas from the carrier gas injection nozzle, and atomizing the fuel supplied from the fuel supply nozzle with the carrier gas injected from the above-described carrier gas injection nozzle, this atomized fuel is decomposed in the reforming part and reformed into the reducing gas. As a result, the fuel can be more efficiently reformed into the reducing gas.

According to the fuel reformer of the sixth aspect of the present invention, the carrier gas heating part, the carrier gas injection nozzle, the fuel supply nozzle, and the reforming part are housed in the reformer housing, and this reformer housing is connected to the base end of the reducing gas supply nozzle, and therefore, the reformer housing can be relatively easily attached to the exhaust pipe together with the reducing gas supply nozzle.

According to the fuel reformer of the seventh or eleventh aspect of the present invention, by forming the coil holding part having a high heat conductivity into a columnar shape, embedding the heating coil so that it lies along the outer peripheral surface of this coil holding part and is not exposed on the outer peripheral surface of the coil holding part, and winding the coil for the carrier gas passage having a high heat conductivity helically around the outer peripheral surface of the coil holding part, to thereby form the carrier gas passage in which the carrier gas or the first carrier gas flows helically along the outer peripheral surface of the coil holding part, and therefore, the carrier gas passage in the carrier gas heating part can be sufficiently ensured. As a result, the carrier gas or the like can be sufficiently heated in the carrier gas heating part. Also, since the fuel does not flow in the carrier gas passage, but only the carrier gas or the like flows therein, the fuel does not adhere onto the inner wall of the carrier gas passage. As a result, the carrier gas or the like smoothly flows in the carrier gas passage.

According to the fuel reformer of the eighth aspect of the present invention, since the controller controls the circulation pump on the basis of the detection output of the reforming part temperature sensor, a part of the reducing gas containing the atomized fuel resulting from mixing of the reducing gas reformed by the reforming part and the atomized fuel which has not been reformed by the reforming part but passed through the reforming part as it is passes through the bypass pipe, returns to just before the fuel injection nozzle, and again flows into the reforming part, and the atomized fuel in the atomized-fuel-containing reducing gas is reformed by the reforming part. As a result, efficiency for reforming the fuel into the reducing gas can be enhanced.

According to the fuel reformer of the ninth aspect of the present invention, by heating the first carrier gas supplied from the carrier gas source in the carrier gas heating part, injecting this heated first carrier gas from the first carrier gas injection nozzle, atomizing the fuel supplied from the first fuel supply nozzle with the first carrier gas injected from the above-described first carrier gas injection nozzle, and oxidizing this atomized fuel in the exothermic catalyst part, the first carrier gas further heats up to cause temperature rise. By mixing this first carrier gas having further heated up to cause temperature rise with the second carrier gas and injecting the mixture from the second carrier gas injection nozzle and atomizing the fuel supplied from the second fuel supply nozzle with the mixed carrier gas injected from the above-described second carrier gas injection nozzle, this atomized fuel is decomposed by the reforming part and reformed into the reducing gas. In this way, the first carrier gas is subjected to the temperature rise in the two steps, and therefore, an electric power required for heating-up of the first carrier gas in the carrier gas heating part can be decreased. As a result, the fuel can be more efficiently reformed into the reducing gas.

According to the fuel reformer of the tenth aspect of the present invention, the carrier gas heating part, the carrier gas injection nozzle, the first fuel supply nozzle, the exothermic catalyst part, the second carrier gas injection nozzle, the second fuel supply nozzle, and the reforming part are housed in the reformer housing, and this reformer housing is connected to the base end of the reducing gas supply nozzle, and therefore, the reformer housing can be relatively easily attached to the exhaust pipe together with the reducing gas supply nozzle.

According to the exhaust gas purifier of the twelfth or thirteenth aspect of the present invention, if the carrier gas temperature sensor detects that the exhaust gas temperature has reached a predetermined temperature or higher, the controller drives the fuel reformer. According to this, the fuel reformer decomposes the fuel and reforms it into the reducing gas, and this reducing gas is then supplied to the exhaust pipe from the reducing gas supply nozzle. Then, when the reducing gas flows into the selective reduction catalyst together with the exhaust gas, the reducing gas functions as the reducing agent for reducing NOx in the exhaust gas, and NOx in the exhaust gas is rapidly reduced to $N_2$. As a result, NOx can be efficiently decreased in a wide temperature range of the exhaust gas temperature of from a relatively low temperature to a high temperature.

According to the exhaust gas purifier of the fourteenth aspect of the present invention, since the liquid fuel is vaporized or vaporized and misted by heating with the heater in the hermetically sealed reforming case, the pressure in the reforming case becomes high, and this vaporized or vaporized and misted fuel in the high pressure state is reformed with the reforming catalyst into a hydrocarbon-based gas or a lightened hydrocarbon-based gas. As a result, since the reformation reaction of the vaporized or vaporized and misted fuel with the reforming catalyst can be promoted, the liquid fuel can be surely reformed into a hydrocarbon-based gas by the fuel reformer. In consequence, when the above-described reformed hydrocarbon-based gas is injected from the injection nozzle into the exhaust pipe, this hydrocarbon-based gas functions as the reducing agent for reducing NOx in the exhaust gas to $N_2$ on the selective reduction catalyst, and therefore, even if the exhaust gas temperature is relatively low, NOx in the exhaust gas can be efficiently decreased.

According to the exhaust gas purifier of the fifteenth aspect of the present invention, the liquid fuel is vaporized or vaporized and misted by heating with the heater during a course of passing through the fuel passageway, and therefore, the volume of the fuel in the reforming case expands, and the vaporized or vaporized and misted fuel in a state where its partial pressure has become high flows into the reforming catalyst and comes into contact with a surface thereof. As a result, since the reformation reaction of the fuel with the reforming catalyst can be promoted, the liquid fuel can be surely reformed into the hydrocarbon-based gas or the lightened hydrocarbon-based gas by the fuel reformer. In consequence, similar to the foregoing, when the reformed hydrocarbon-based gas is injected from the injection nozzle into the exhaust pipe, this hydrocarbon-based gas functions as the reducing agent for reducing NOx in the exhaust gas to $N_2$ on the selective reduction catalyst, and therefore, even if the exhaust gas temperature is relatively low, NOx in the exhaust gas can be efficiently decreased.

According to the exhaust gas purifier of the sixteenth aspect of the present invention, if the exhaust gas temperature becomes relatively high, the bypass pipe is opened at a predetermined opening degree by the opening degree regulation valve, to thereby allow the liquid fuel to pass through the bypass pipe as it is without being reformed by the fuel reformer, and the liquid fuel is injected into the exhaust pipe from the injection nozzle. This injected liquid fuel is rapidly reformed into the hydrocarbon-based gas with the exhaust gas having a relatively high temperature, and therefore, this hydrocarbon-based gas functions as the reducing agent for reducing NOx in the exhaust gas to $N_2$ on the selective reduction catalyst, and NOx in the exhaust gas is efficiently decreased.

DESCRIPTION OF EMBODIMENTS

Next, embodiments of the present invention will be described with reference to the accompanying drawings.

First Embodiment

Figure 1:
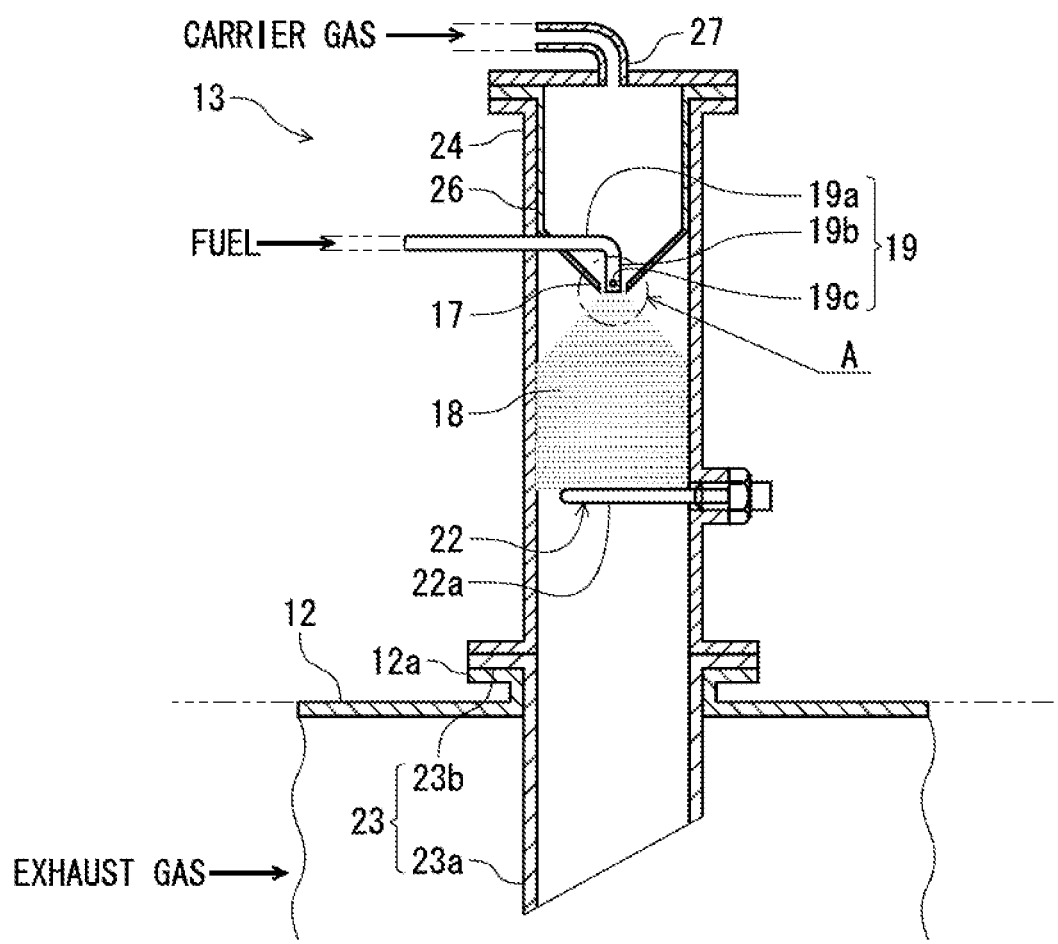
FIG. 1 is a longitudinal section configuration view showing a fuel reformer of a first embodiment of the present invention.
Figure 2:
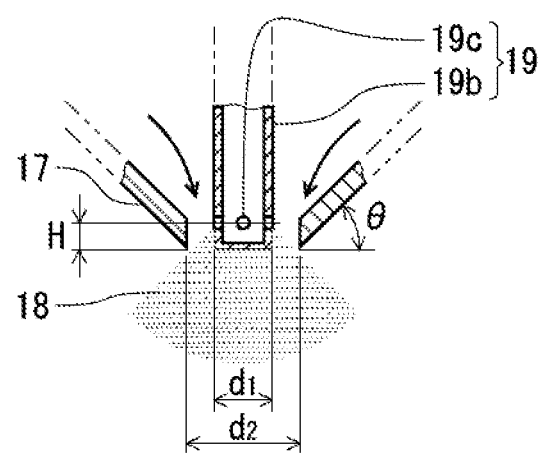
FIG. 2 is an enlarged section view of an A part in FIG. 1.
Figure 3:
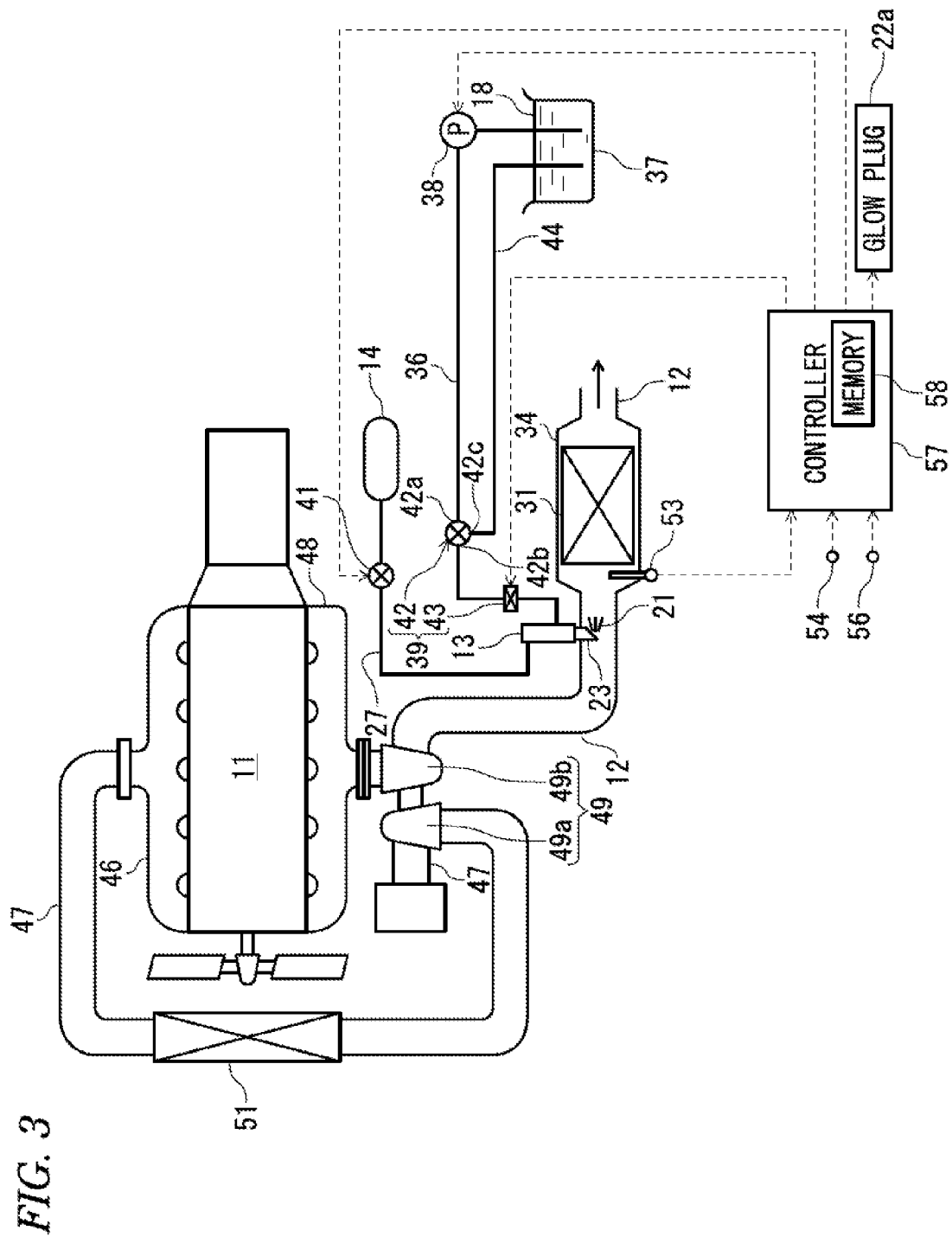
FIG. 3 is a configuration view showing an exhaust gas purifier using the fuel reformer.

As shown in FIGS. 1 and 3, a fuel reformer 13 is provided in an exhaust pipe 12 of a diesel engine 11. This fuel reformer 13 has a carrier gas injection nozzle 17 that injects a carrier gas supplied from a carrier gas source 14, a fuel supply nozzle 19 that supplies a fuel 18 into a tip end of the carrier gas injection nozzle 17 so that the fuel 18 is atomized with a carrier gas injected from the carrier gas injection nozzle 17, a reforming part 22 that decomposes this atomized fuel 18 and reforms it into a reducing gas 21, and a reducing gas supply nozzle 23 that supplies the reducing gas 21 discharged from an outlet of the reforming part 22 to the exhaust pipe 12 of the engine 11. The above-described carrier gas injection nozzle 17, reforming part 22 and fuel supply nozzle 19 are housed in a cylindrical reformer housing 24 extending in a vertical direction, and a lower end of this reformer housing 24 is connected to an upper end of the reducing gas supply nozzle 23. With this configuration, it becomes possible to relatively easily install the reformer housing 24 in the exhaust pipe 12 together with the reducing gas supply nozzle 23. Also, in this embodiment, the carrier gas source 14 is a carrier gas tank (air tank) that stores the carrier gas (air) compressed by a compressor (not sown) (FIG. 2). It is noted that the carrier gas source may also be configured by a compressor that supplies air in the atmosphere, an exhaust gas of the engine, or a mixed gas thereof to a carrier gas heating part without using the carrier gas tank (air tank). Also, the fuel 18, which is supplied to the fuel supply nozzle 19, is the same as a fuel supplied to the diesel engine 11.

The above-described carrier gas injection nozzle 17 is formed in a lower end of a carrier gas inflow case 26 inserted into an upper part of the reformer housing 24. An upper part of this case 26 is formed in a cylindrical shape, and a lower part of the case 26 is formed in a funnel shape which tapers downward. Then, the configuration is made so that the carrier gas which has flown into the carrier gas inflow case 26 is injected downward from a tip (lower end) of the carrier gas injection nozzle 17. It is noted that a reference sign 27 in FIG. 1 indicates a carrier gas supply pipe having a tip end connected to a lid that closes an upper surface of the reformer housing 24. A base end of this carrier gas supply pipe 27 is connected to the carrier gas tank 14 (FIG. 3).

As shown in FIGS. 1 and 2, the fuel supply nozzle 19 has a horizontal pipe part 19a that is provided to extend from an outer peripheral surface, which is at a center in the vertical direction, of the reformer housing 24 to a center of the reformer housing 24, a vertical pipe part 19b that is communicated with and connected to a tip end of this horizontal pipe part 19a and provided to extend downward and that has a lower end being closed, and a plurality of supply holes 19c that are formed at intervals of predetermined angles in the same horizontal plane in a lower side surface of the vertical pipe part 19b. In this embodiment, four supply holes 19c are formed at every 90 degrees in the same horizontal plane on the lower side surface of the vertical pipe part 19b. By configuring the fuel supply nozzle 19 in this way, the fuel 18 supplied to the supply holes 19c of the fuel supply nozzle 19 is blown away with the carrier gas injected from the carrier gas injection nozzle 17 and atomized.

As shown in FIG. 2, an inclination angle θ of the carrier gas injection nozzle 17 formed in the lower end of the carrier gas inflow case 26 is set to be in a range of from 30 to 60 degrees with respect to the horizontal plane, and preferably from 40 to 50 degrees against the horizontal plane. Also, a distance H between a horizontal plane including the lower end of the carrier gas injection nozzle 17 and a horizontal plane including hole centers of the supply holes 19c of the fuel supply nozzle 19 is set to be in a range from −10 to +10 mm, and preferably from 0 to +5 mm. Furthermore, assuming that d1 denotes an outer diameter of the vertical pipe part 19b of the fuel supply nozzle 19 and that d2 denotes a hole diameter of the carrier gas injection nozzle 17, d1/d2 is set to be in a range of from 0.1 to 0.98, and preferably from 0.5 to 0.8. Here, the reason why the inclination angle θ of the carrier gas injection nozzle 17 is limited in the range of from 30 to 60 degrees is that if it is less than 30 degrees, the atomization of the fuel becomes insufficient, whereas if it exceeds 60 degrees, atomized fuel does not spread. Also, the reason why the above-described distance H is limited in the range of from −10 to +10 mm is that if it is less than −10 mm, the fuel cannot be atomized, and if it exceeds +10 mm, the fuel also cannot be atomized. Furthermore, the reason why d1/d2 is limited in the range of from 0.1 to 0.98 is that if it is less than 0.1, the atomization of the fuel becomes insufficient, whereas if it exceeds 0.98, a space that sufficiently for allowing the carrier gas to flow is not provided. It is assumed that in reference to the horizontal plane including the lower end of the carrier gas injection nozzle 17, the above-described distance H is positive (+) if the hole center of the supply hole 19c of the fuel supply nozzle 19 protrudes from the tip end of the nozzle 17 and that the distance H is negative (−) if the hole center of the supply hole 19c of the fuel supply nozzle 19 is inside the nozzle 17.

Referring back to FIG. 1, in this embodiment, the reformer part 22 includes a glow plug 22a that decomposes a part or a large part of the above-described atomized fuel 18 by heating the above-described atomized fuel 18 so as to reform it into a reducing gas including either one or both of hydrogen and an oxygen-containing hydrocarbon. This glow plug 22a faces the carrier gas injection nozzle 17 and the fuel supply nozzle 19 and is inserted into a lower part of the reformer housing 24 with a relatively large gap from the lower end of the carrier gas injection nozzle 17 and the lower end of the vertical pipe part 19b of the fuel supply nozzle 19. This configuration is employed for the purpose of allowing the above-described atomized fuel 18 to gradually spread downward in a relatively wide space between the fuel supply nozzle 19 and the glow plug 22a and to substantially uniformly disperse this atomized fuel 18 in the surroundings of the glow plug 22a.

As shown in FIG. 3, the fuel reformer 13 is incorporated into the exhaust gas purifier of the diesel engine 11. This exhaust gas purifier includes a selective reduction catalyst 31 provided in the exhaust pipe 12 of the engine 11 and the above-described fuel reformer 13 having the reducing gas supply nozzle 23 extending into the exhaust pipe 12 on an upstream side of the selective reduction catalyst 31. The above-described selective reduction catalyst 31 is housed in a case 34 having a diameter larger than the exhaust pipe 12 and is configured so that NOx in the exhaust gas can be reduced to $N_2$. The selective reduction catalyst 31 is a monolith catalyst and is configured by coating a cordierite honeycomb carrier with a zeolite or alumina. Examples of the zeolite include silver-zeolite, copper-zeolite, iron-zeolite, and the like. The selective reduction catalyst 31 including silver-zeolite, copper-zeolite, or iron-zeolite is configured by coating a honeycomb carrier with a slurry containing a zeolite powder having been ion-exchanged with silver, copper or iron. Also, the selective reduction catalyst 31 including silver-alumina, copper-alumina, or iron-alumina is configured by coating a honeycomb carrier with a slurry containing a γ-alumina powder or θ-alumina powder having silver, copper or iron supported thereon. It is noted that the above-described cordierite honeycomb carrier may be a metal carrier formed of stainless steel. Furthermore, the reducing gas supply nozzle 23 is attached to the exhaust pipe 12 of the engine 11 (FIGS. 1 and 3). The reducing gas supply nozzle 23 including a nozzle main body 23a formed in a cylindrical shape and a flange part 23b formed on an upper end of this nozzle main body 23a in an integral manner with the nozzle main body 23a (FIG. 1). A lower plane of the nozzle main body 23a is formed in an inclined plane so that a length of the nozzle main body 23a becomes gradually short from the exhaust gas upstream side toward the exhaust gas downstream side. The flange part 23b is attached to a flange part 12a provided in the exhaust pipe 12.

Meanwhile, the fuel reformer 13 further includes a fuel supply pipe 36 having a tip end connected to the fuel supply nozzle 19; a fuel tank 37 that is connected to a base end of this fuel supply pipe 36 and that stores the fuel 18, a fuel supply pump 38 that forcedly supplies the fuel 18 in this fuel tank 37 to the fuel supply nozzle 19, a fuel supply amount regulation valve 39 that regulates a supply amount of the fuel 18, which is supplied from the fuel supply nozzle 19 to the tip end of the carrier gas injection nozzle 17, and a carrier gas flow rate regulation valve 41 provided in the carrier gas supply pipe 27, which connecting the carrier gas tank 14 and the carrier gas inflow case 26 (FIGS. 1 and 3). The above-described fuel supply pump 38 is provided in the fuel supply pipe 36 between the fuel supply nozzle 19 and the fuel tank 37, and the fuel supply amount regulation valve 39 is provided in the fuel supply pipe 36 between the fuel supply nozzle 19 and the fuel supply pump 38. Furthermore, the fuel supply amount regulation valve 39 includes a fuel pressure regulation valve 42 that regulates a supply pressure of the fuel 18 to the fuel supply nozzle 19 provided in the fuel supply pipe 36 and a fuel on-off valve 43 that is provided in the base end of the fuel supply nozzle 19 and that opens and closes the base end of the fuel supply nozzle 19.

The fuel pressure regulation valve 42 includes first to third ports 42a to 42c, the first port 42a is connected to a discharge port of the fuel supply pump 38, the second port 42b is connected to the fuel on-off valve 43, and the third port 42c is connected to the fuel tank 37 by a return pipe 44. The fuel 18 forcedly supplied by the fuel supply pump 38 flows from the first port 42a into the fuel pressure regulation valve 42 and is forcedly supplied from the second port 42b to the fuel on-off valve 43. Also, if the pressure at the fuel pressure regulation valve 42 reaches a predetermined pressure or more, the fuel 18 forcedly supplied by the fuel supply pump 38 flows from the first port 42a into the fuel pressure regulation valve 42, and thereafter, the fuel 18 goes through the third port 42c and the return pipe 44 and is returned to the fuel tank 37. Furthermore, the carrier gas flow rate regulation valve 41 is configured so as to be able to regulate the flow rate of the carrier gas supplied from the carrier gas tank 14 to the carrier gas inflow case 26.

Meanwhile, an air intake pipe 47 is connected to an air intake port of the diesel engine 11 via an air intake manifold 46, and the exhaust pipe 12 is connected to an exhaust port of the diesel engine 11 via an exhaust manifold 48 (FIG. 3). A compressor housing 49a of a turbo supercharger 49 and an inter cooler 51 that cools the intake air compressed by the turbo supercharger 49 are provided in the air intake pipe 47, and a turbine housing 49b of the turbo supercharger 49 is provided in the exhaust pipe 12. A compressor blade (not shown) is housed in a rotatable manner in the compressor housing 49a, and a turbine blade (not shown) is housed in a rotatable manner in the turbine housing 49b. The configuration is made so that the compressor blade and the turbine blade are connected to each other by a shaft (not shown), the compressor blade is rotated via the shaft and the turbine blade by the energy of the exhaust gas discharged from the engine 11, and the intake air in the air intake pipe is compressed by means of the rotation of this compressor blade.

An exhaust gas temperature sensor 53 that detects an exhaust gas temperature at an inlet of the selective reduction catalyst 31 is inserted into the case 34 on the exhaust gas inlet side of the selective reduction catalyst 31 (FIG. 3). Also, a rotational speed of the engine 11 is detected by a rotation sensor 54, and a load of the engine 11 is detected by a load sensor 56. Each of detection outputs of the exhaust gas temperature sensor 53, the rotation sensor 54, and the load sensor 56 is connected to a control input of a controller 57, and control outputs of the controller 57 are connected to the glow plug 22a, the fuel supply pump 38, the carrier gas flow rate regulation valve 41, and the fuel on-off valve 43, respectively. A memory 58 is provided in the controller 57. This memory 58 stores, in advance, the number of times the fuel on-off valve 43 opens and closes per unit time, presence or absence of actuation of the fuel supply pump 38, and the opening degree of the carrier gas flow rate regulation valve 41, according to the exhaust gas temperature at the inlet of the selective reduction catalyst 31, the engine rotational speed, and the engine load. Also, the memory 58 stores, as a map, a change of the flow rate of NOx in the exhaust gas discharged from the engine 11 on the basis of changes of the engine rotational speed and the engine load, respectively. It is noted that in this embodiment, the exhaust gas temperature sensor is inserted into the case on the exhaust gas inlet side of the selective reduction catalyst. However, so long as the temperature related to the selective reduction catalyst can be detected, the exhaust gas temperature sensor may be inserted into the case on the exhaust gas outlet side of the selective reduction catalyst, or may be inserted into the case on the exhaust gas inlet side and exhaust gas outlet side of the selective reduction catalyst, respectively.

An operation of the exhaust gas purifier having the thus configured fuel reformer 13 will be described. When the engine 11 is started, the controller 57 opens the carrier gas flow rate regulation valve 41 at a predetermined opening degree and energizes the glow plug 22a, to thereby heat the glow plug 22a. Then, if the exhaust gas temperature sensor 53 detects that an inlet temperature of the selective reduction catalyst 31 has increased to, for example, a relatively low temperature, for example, 200° C., the controller 57 acquires each of detection outputs of the engine rotational speed and the engine load, which are detected by the rotation sensor 54 and the load sensor 56, determines a NOx amount in the exhaust gas with respect to the respective detection outputs of the engine rotational speed and the engine load based on the map, and supplies the fuel 18 according to this NOx amount to the supply holes 19c of the fuel supply nozzle 19. That is, the controller 57 drives the fuel supply pump 38 on the basis of the respective detection outputs of the rotation sensor 54 and the load sensor 56 and repeats opening and closing of the fuel on-off valve 43 in a predetermined duty ratio, to thereby supply the fuel 18 according to the NOx amount to the supply holes 19c of the fuel supply nozzle 19.

The fuel 18 supplied to the supply holes 19c of the fuel supply nozzle 19 is blown away with the carrier gas injected from the carrier gas injection nozzle 17 and atomized, and its temperature increases by means of mixing with the high-temperature carrier gas. Then, the above-described atomized fuel 18 gradually spreads downward in the relatively wide space between the fuel supply nozzle 19 and the glow plug 22a and is substantially uniformly dispersed in the reformer housing 24. Therefore, the part or the large part of this substantially uniformly dispersed and atomized fuel 18 is heated by the flow plug 22a, decomposed as expressed in the following formulae (1) and (2), and reformed into the reducing gas 21 such as hydrogen ($H_2$), an oxygen-containing hydrocarbon (HCHO), and carbon monoxide (CO).

$$CH_2+0.5O_2 \rightarrow H_2+CO \qquad (1)$$

$$CH_2+0.5O_2 \rightarrow HCHO \qquad (2)$$

Each of the above formulae (1) and (2) expresses a chemical reaction formula in which the fuel 18 is decomposed into the reducing gas 21. It is noted that the large part of the reducing gas 21 resulting from the reformation by the glow plug 22a is hydrogen ($H_2$), and the oxygen-containing hydrocarbon (HCHO) is extremely scarce.

In this way, the fuel 18 is heated and decomposed by the glow plug 22a, and reformed into the reducing gas 21, and thereafter, this reducing gas 21 is supplied from the reducing gas supply nozzle 23 to the exhaust pipe 12. Then, when a hydrogen gas ($H_2$) as the reducing gas 21 flows into the selective reduction catalyst 31 together with the exhaust gas, the hydrogen gas ($H_2$) functions as a reducing agent that reduces NOx (NO, $NO_2$) in the exhaust gas, and NOx in the exhaust gas is rapidly reduced to $N_2$ as expressed in the following formula (3).

$$NO+NO_2+3H_2 \rightarrow N_2+3H_2O \qquad (3)$$

The above formula (3) expresses a chemical reaction formula in which NO and $NO_2$ in the exhaust gas react with the hydrogen gas ($H_2$) in the presence of the selective reduction catalyst 31, whereby NO and $NO_2$ are reduced to $N_2$. As a result, NOx can be efficiently decreased in a wide temperature range where the exhaust gas temperature is from a relatively low temperature to a high temperature.

Second Embodiment

Figure 4:
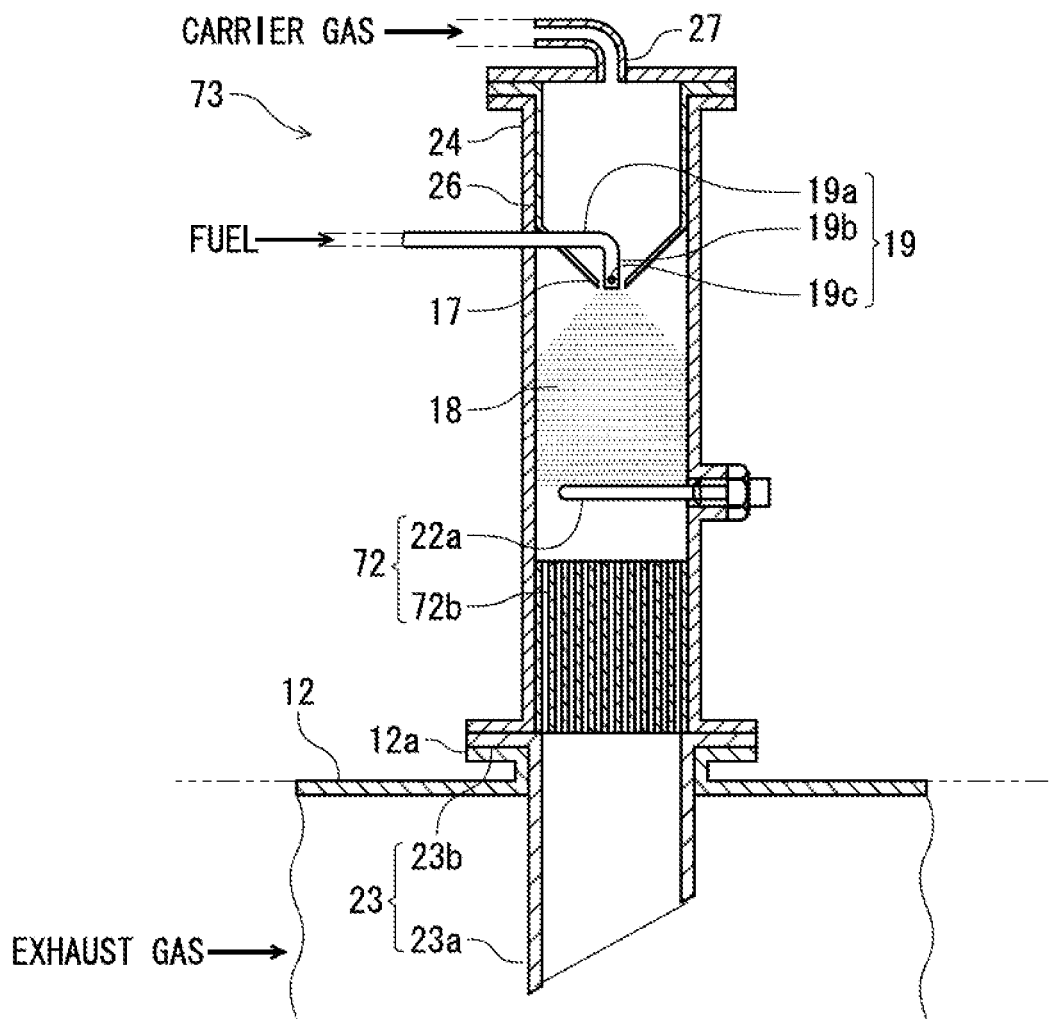
FIG. 4 is a longitudinal section configuration view showing a fuel reformer of a second embodiment of the present invention.

FIG. 4 shows a second embodiment of the present invention. In FIG. 4, the same reference signs as those in FIG. 1 indicate the same components. In this embodiment, a reforming part 72 includes the same glow plug 22a as that in the first embodiment and a reforming catalyst 72b provided between this glow plug 22a and the reducing gas supply nozzle 23, at a predetermined distance from the glow plug 22a. An inlet of the reforming catalyst 72b is provided to face the glow plug 22a and disposed below the glow plug 22a at the predetermined distance from the glow plug 22a. Also, the reforming catalyst 72b is a monolith catalyst and is configured by coating a cordierite honeycomb carrier with rhodium (Rh) or ruthenium (Ru). The reforming catalyst 72b including rhodium is configured by coating a honeycomb carrier with a slurry containing a rhodium powder. Also, the reforming catalyst 72b including ruthenium is configured by coating a honeycomb carrier with a slurry containing a ruthenium powder. It is noted that the above-described cordierite honeycomb carrier may be a metal carrier formed of stainless steel. The above-described reforming catalyst 72b is configured so that a part or a large part of the remaining atomized fuel 18, which has not been reformed by the glow plug 22a, is decomposed and reformed into a reducing gas including either or both of hydrogen and an oxygen-containing hydrocarbon. Except what is described above, the configuration is the same as that in the first embodiment.

In the exhaust gas purifier having a thus configured fuel reformer 73, by injecting the carrier gas, which is supplied from the carrier gas source, from the carrier gas injection nozzle 17 and atomizing the fuel 18 supplied from the fuel supply nozzle 19 with the carrier gas injected from the above-described carrier gas injection nozzle 17, a part of or a residue of this atomized fuel 18 is heated and decomposed by the glow plug 22a and reformed into a reducing gas, and thereafter, a part or a large part of the remaining atomized fuel 18 is decomposed with the reforming catalyst 72b and reformed into a reducing gas. As a result, the fuel 18 can be efficiently reformed into a reducing gas. Also, the glow plug 22a is provided apart from the reforming catalyst 72b without being in contact with the reforming catalyst 72b or without being in vicinity of the reforming catalyst 72b, and therefore, deterioration of the reforming catalyst 72b can be prevented. The operations other than those described above are substantially the same as those in the first embodiment, and therefore, redundant description thereon will be omitted.

Third Embodiment

Figure 5:
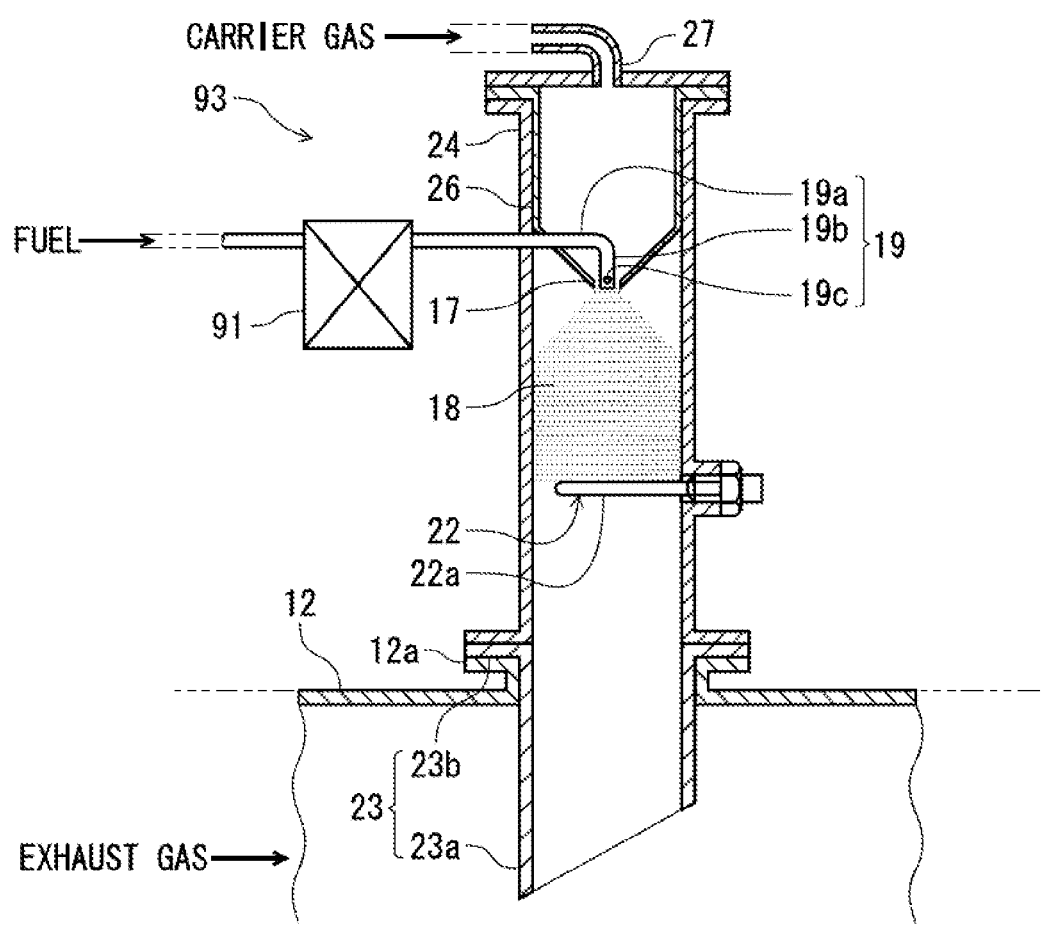
FIG. 5 is a longitudinal section configuration view showing a fuel reformer of a third embodiment of the present invention.
Figure 6:
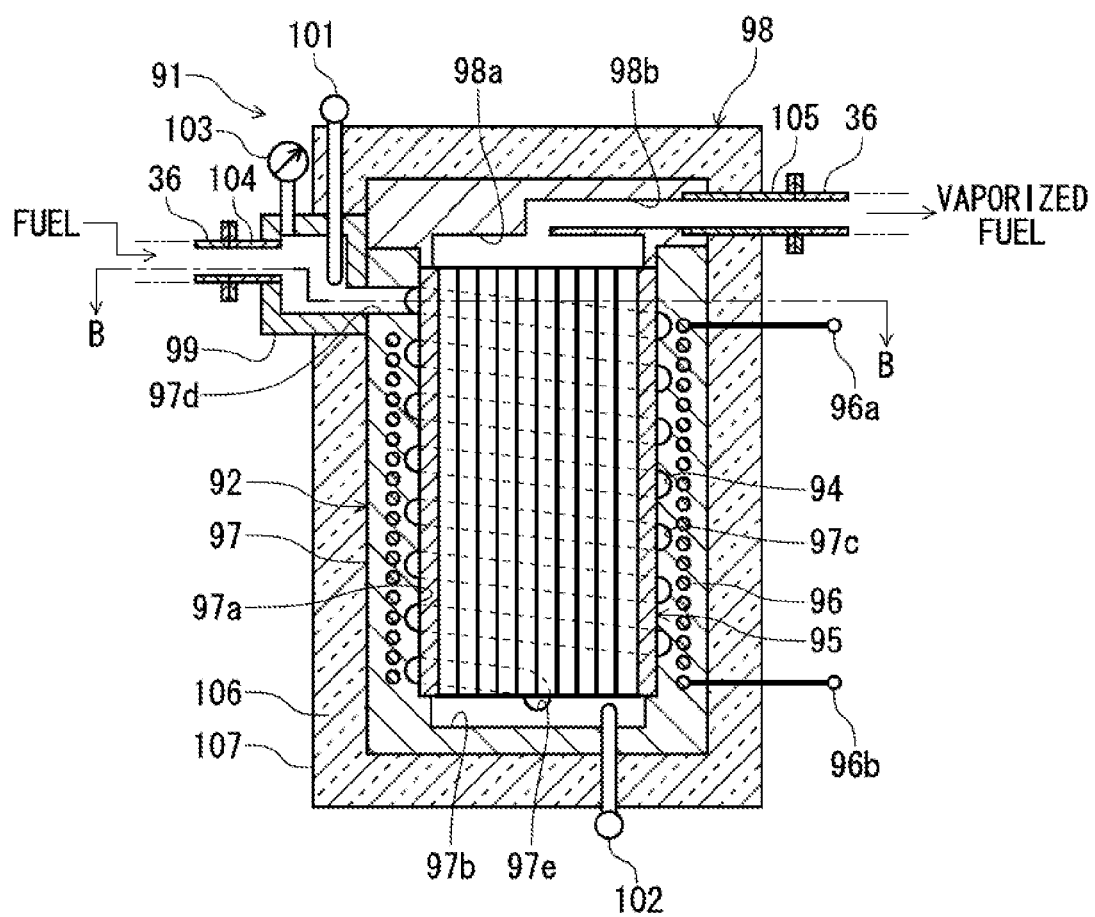
FIG. 6 is an enlarged longitudinal section view of a vaporizer of the fuel reformer.
Figure 7:
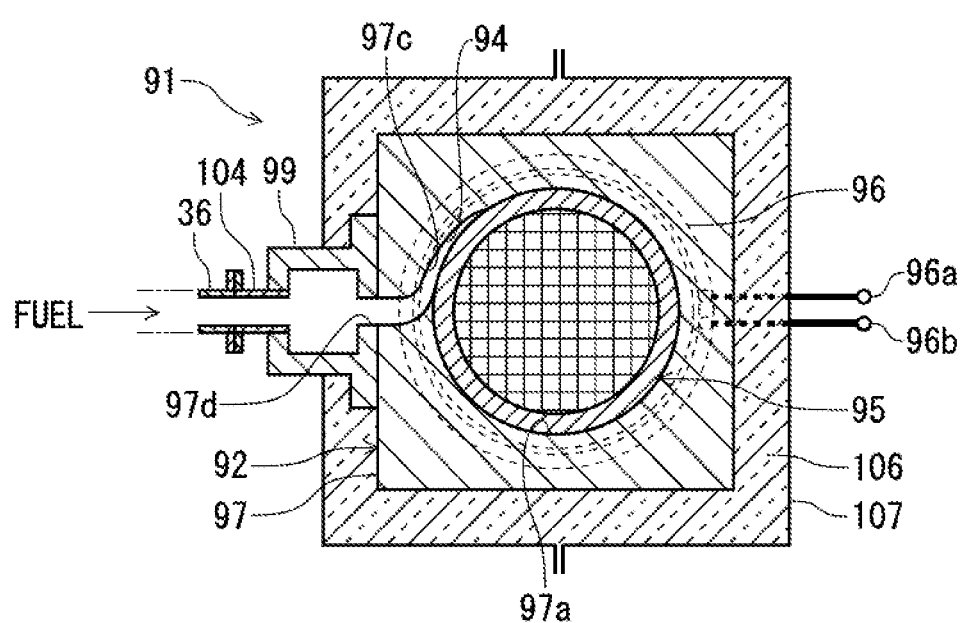
FIG. 7 is a section view taken along a B-B line in FIG. 6.

FIGS. 5 to 7 show a third embodiment of the present invention. In FIG. 5, the same reference signs as those in FIG. 1 indicate the same components. In this embodiment, a fuel vaporizer 91 that vaporizes a part or a large part of the fuel 18 by heating is provided between the fuel tank and the fuel supply nozzle 19. As shown in FIGS. 6 and 7, this fuel vaporizer 91 has a hermetically sealed cylindrical vaporization case 92, an oxidation catalyst 95 housed in this vaporization case 92, a fuel passageway 94 provided helically between an inner peripheral surface of the vaporization case 92 and an outer peripheral surface of the oxidation catalyst 95, and a heater 96 that is helically arranged so as to surround the fuel passageway 94 and that is embedded in a wall of the vaporization case 92. The vaporization case 92 includes a case main body 97 having a rectangular cylindrical shape and having an opened upper end and a closed lower end, a lid 98 that has a rectangular plate shape, that is detachably attached to the open end of the case main body 97, and that closes the open end of the case main body 97 in an openable manner, and a fuel storage part 99 that is attached to an upper outer peripheral surface of the case main body 97 and that temporarily stores the liquid fuel 18 which is to flow into the vaporization case 92.

A catalyst housing part 97a that houses the oxidation catalyst 95 is formed in the inside of the case main body 97, and a relatively shallow lower recessed part 97b having a diameter smaller than an inner diameter of the catalyst housing part 97a is formed on a bottom surface of this catalyst housing part 97a. Also, a recessed groove 97c helically extending from the upper part of the vaporization case 92 toward the lower portion of the vaporization case 92 is formed on the inner peripheral surface of the vaporization case 92. The above-described fuel passageway 94 is formed by the recessed groove 97c of the case main body 97 and the outer peripheral surface of the oxidation catalyst 95 in a state where the oxidation catalyst 95 is housed in the catalyst housing part 97a. An upper end of the above-described recessed groove 97c is connected to an inlet hole 97d formed on an upper outer peripheral surface of the case main body 97, and a lower end of the recessed groove 97c is connected to an outlet groove 97e extending to the above-described lower recessed part 97b. Furthermore, the fuel storage part 99 is attached to the upper outer peripheral surface of the case main body 97 so that its inside is communicated with the inlet hole 97d, and a supply short pipe 104 that allows the liquid fuel 18 to pass through the fuel storage part 99 and the inlet hole 97d and flow into the fuel passageway 94 is connected to an outer side surface of the fuel storage part 99.

Meanwhile, the oxidation catalyst 95 is a monolith catalyst and is configured by coating a cordierite honeycomb carrier with a zeolite or alumina. Examples of the zeolite include rhodium-zeolite, platinum-zeolite, palladium-zeolite, and the like. The oxidation catalyst 95 including rhodium-zeolite, platinum-zeolite, or palladium-zeolite is configured by coating a honeycomb carrier with a slurry containing a zeolite powder having been ion-exchanged with rhodium, platinum or palladium. Also, the oxidation catalyst 95 including rhodium-alumina, platinum-alumina, or palladium-alumina is configured by coating a honeycomb carrier with a slurry containing a γ-alumina powder or θ-alumina powder having rhodium, platinum or palladium supported thereon. When the vaporized fuel and the misted fuel are supplied to this oxidation catalyst 95, a part of this vaporized fuel is burnt with the oxidation catalyst 95, and the above-described misted fuel is vaporized. Also, a relatively shallow upper recessed part 98a having a diameter smaller than the inner diameter of the catalyst housing part 97a is formed on the lower surface of the lid 98, and an outlet hole 98b communicated with the upper recessed part 98a is formed on the side face of the lid 98. A discharge short pipe 105 that discharges the fuel vaporized with the oxidation catalyst 95 and/or the fuel, which is still in a liquid state, is connected to this outlet hole 98b.

The above-described vaporization case 92 is formed of a metal having a relatively high heat conductivity that is in a range of from 15 to 17 W/(m·K), such as SUS316, SUS304, Inconel (registered trademark, manufactured by Huntington Alloys Canada Limited), etc. Also, as for the heater 96, it is preferable to use a so-called sheathed heater which is configured by loosely inserting a heating element such as a nichrome wire into a metal sheath (metal ultrafine pipe) and filling a powder of a high-purity inorganic insulating material in a space between the metal sheath and the heating element. Furthermore, the case main body 97 and the lid 98 of the vaporization case 92 are covered by a heat insulation case 107 filled with a heat insulating material 106. With this configuration, dissipation of the heat generated by the heater 96 can be suppressed. It is noted that in FIGS. 6 and 7, reference signs 96a and 96b indicate terminals of the heater 96. Also, a pressure sensor 103 and a first temperature sensor 101 that detect an inlet pressure and an inlet temperature of the fuel vaporizer 91, namely the pressure and the temperature of the fuel 18 immediately before it flows into the fuel passageway 94, are respectively provided in the fuel storage part 99 of the fuel vaporizer 91. Also, in the lower recessed part 97b of the vaporization case 92 of the fuel vaporizer 91, a second temperature sensor 102 that detects the temperature of the fuel 18 discharged from the fuel passageway 94, namely the fuel 18 heated and vaporized by the heater 96 and the misted fuel 18 is provided. Furthermore, the engine is provided with a rotation sensor that detects a rotational speed of the engine and a load sensor that detects a load of the engine. Each of detection outputs of the pressure sensor 103, the first temperature sensor 101, the second temperature sensor 102, the exhaust gas temperature sensor (sensor that detects an exhaust gas temperature at the inlet of the selective reduction catalyst), the rotation sensor, and the load sensor is connected to a control input of the controller, and control outputs of the controller are connected to the glow plug 22a, the heater 96, the fuel supply pump, the carrier gas flow rate regulation valve, and the fuel on-off valve, respectively.

Also, a memory is provided in the controller. The memory stores, in advance, the number of times the fuel on-off valve opens and closes per unit time, presence or absence of actuation of the fuel supply pump, and the opening degree of the carrier gas flow rate regulation valve, according to the exhaust gas temperature at the inlet of the selective reduction catalyst, the engine rotational speed, and the engine load. Also, the memory stores, as a map, a change of the flow rate of NOx in the exhaust gas discharged from the engine based on a change of each of the engine rotational speed and the engine load. Furthermore, the memory stores, as a map, a change of the generation rate of the fuel gas (vaporized fuel 18) according to the inlet pressure of the fuel vaporizer 91, the temperature in the fuel passageway 94, and the flow rate of the fuel gas (vaporized fuel 18) discharged from the oxidation catalyst 95. If a partial pressure of the fuel 18, which has been heated and vaporized by the heater 96 is higher, the vaporization of the fuel 18 with the oxidation catalyst 95 can be more promoted. Therefore, the inlet pressure of the fuel vaporizer 91 is set to be relatively high and to be in a range of from 30 to 100 kPa. For that reason, the vaporization case 92 is manufactured so as to have a pressure resistance. It is noted that the heating efficiency of the fuel 18 by the heater 96 can be detected by a temperature difference between the respective detection outputs of the first and second temperature sensors 101 and 102. Except what is described above, the configuration is the same as that in the first embodiment.

An operation of the exhaust gas purifier having a thus configured fuel reformer 93 will be described. When the engine is started, the controller turns on the heater 96 on the basis of the respective detection outputs of the exhaust gas temperature sensor, the rotation sensor, and the load sensor and also gradually increases the rotational speed of the fuel supply pump. If the pressure sensor 103 detects that the inlet pressure of the fuel vaporizer 91 has reached a predetermined pressure (for example, 30 kPa), the fuel supply pump is caused to rotate at the rotational speed at that time, to thereby keep the inlet pressure of the fuel vaporizer 91 at the above-described predetermined pressure. If the first and second sensors 101 and 102 detect, in this state, that the temperature of the fuel 18 in the fuel passageway 94 has reached a predetermined temperature, the controller opens or closes the fuel on-off valve at a predetermined number of times per unit time, a predetermined opening time period, and a predetermined closing time. Thereby, a part or a large part of the liquid fuel 18 which has flown into the fuel passageway 94 is heated by the heater 96 and vaporized or misted, and a part of the vaporized fuel 18 is burnt with the oxidation catalyst 95 to thereby vaporize the misted fuel 18. This vaporized fuel 18 is uniformly mixed with the carrier gas injected from the carrier gas injection nozzle 17 to constitute a fuel gas, and the fuel 18 which is still in a liquid state is atomized with the carrier gas injected from the carrier gas injection nozzle 17. As a result, the fuel gas containing the atomized fuel 18 is decomposed by the reforming part 72 and rapidly reformed into a reducing gas, and therefore, the fuel 18 can be more efficiently reformed into the reducing gas. The operations other than those described above are substantially the same as those in the first embodiment, and therefore, redundant description thereon will be omitted.

Fourth Embodiment

Figure 8:
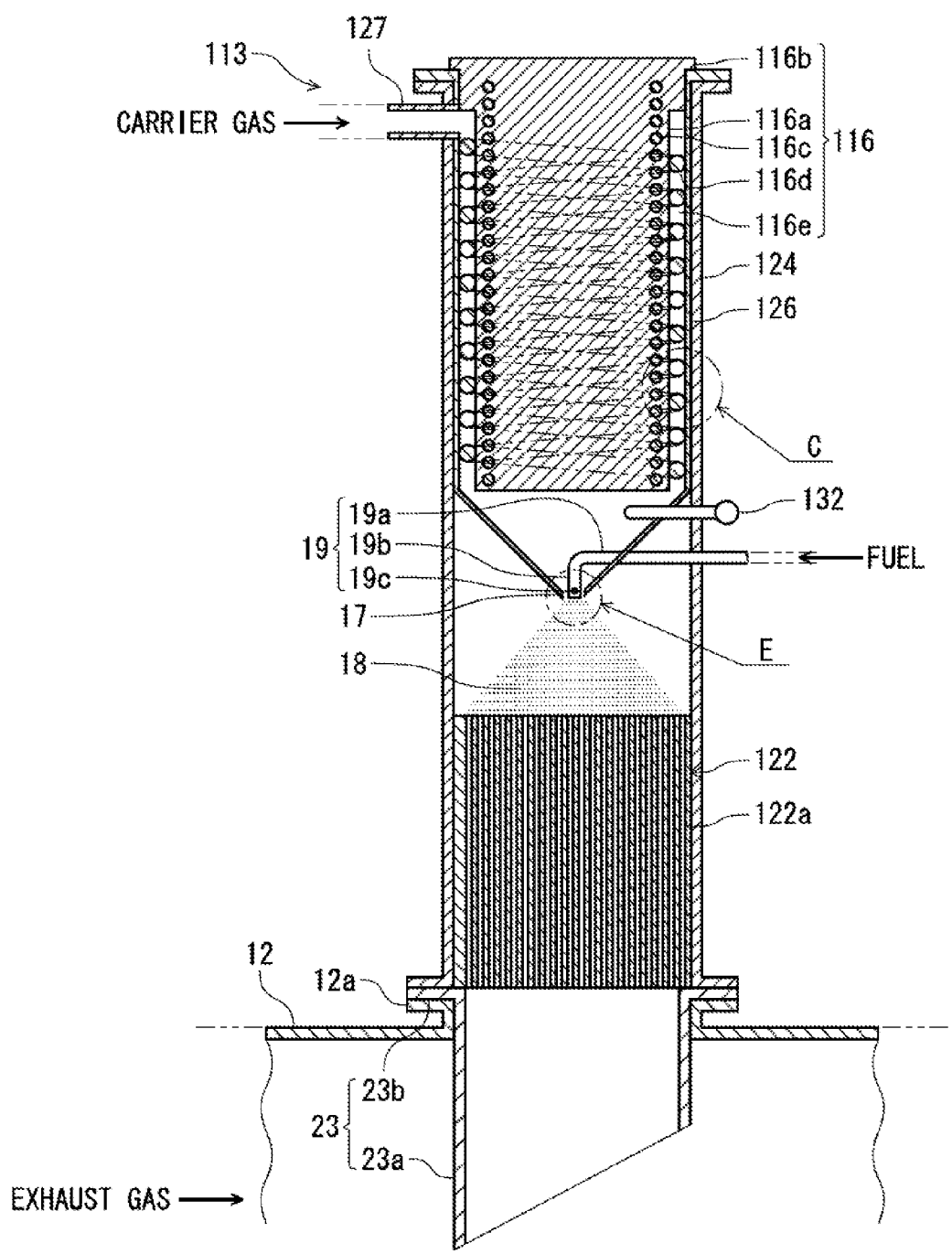
FIG. 8 is a longitudinal section configuration view showing a fuel reformer of a fourth embodiment of the present invention.
Figure 9:
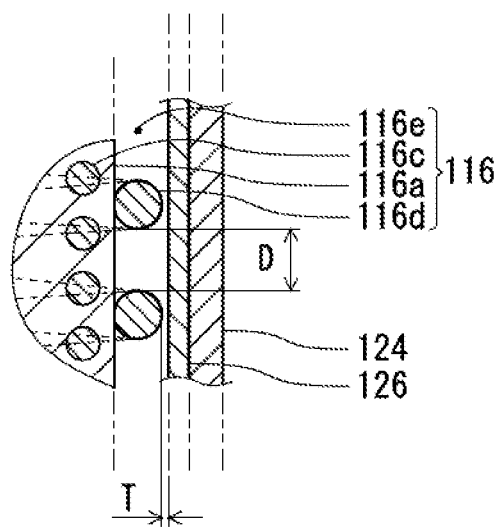
FIG. 9 is an enlarged section view of a C part in FIG. 8.
Figure 10:
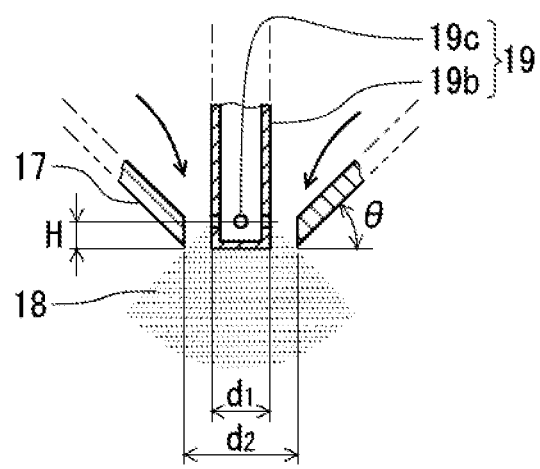
FIG. 10 is an enlarged section view of a E part in FIG. 8.
Figure 11:
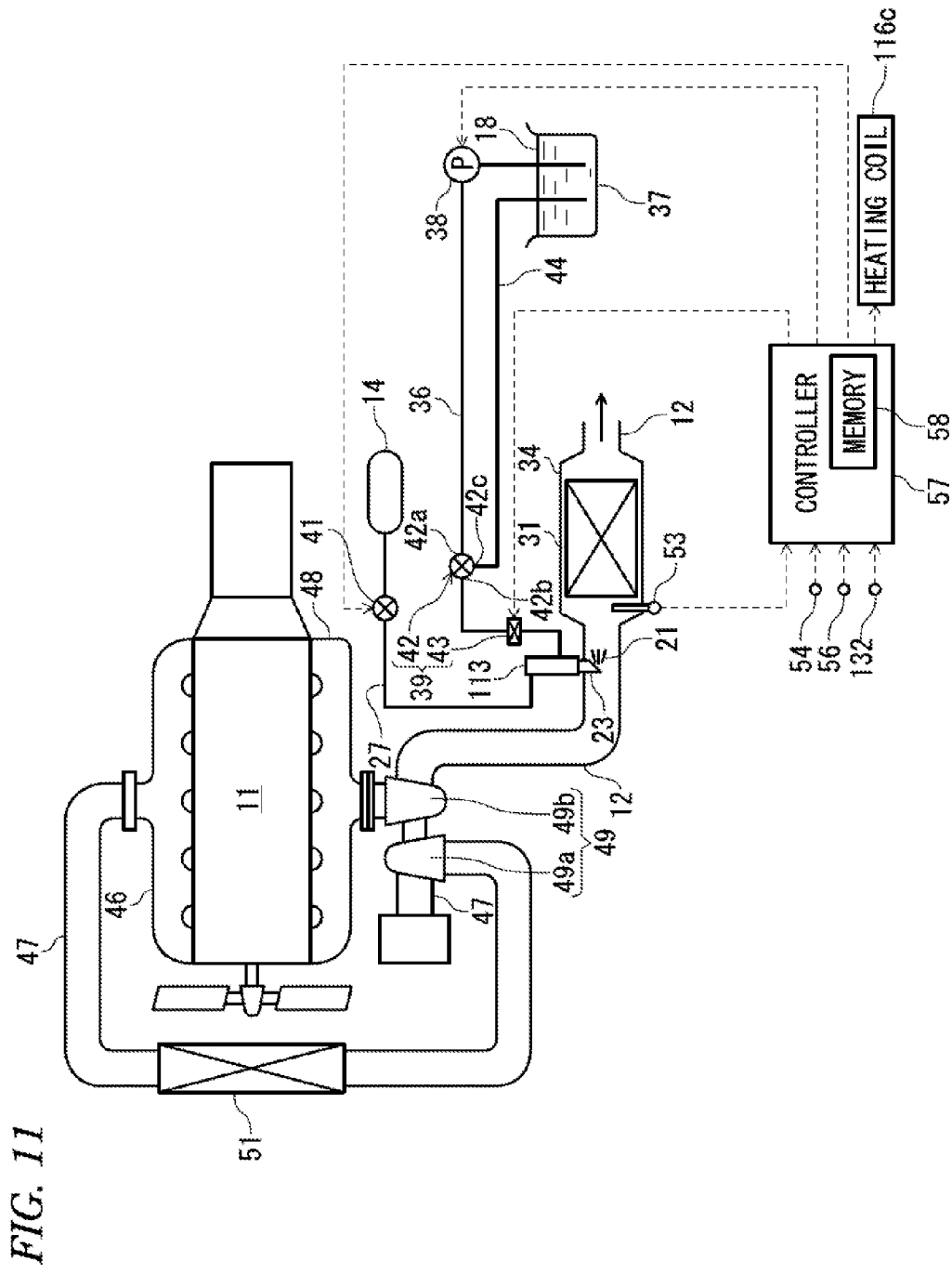
FIG. 11 is a configuration view showing an exhaust gas purifier using the fuel reformer.

FIGS. 8 to 11 show a fourth embodiment of the present invention. In FIGS. 8, 10 and 11, the same reference signs as those in FIGS. 1 to 3 indicate the same components. In this embodiment, a fuel reformer 113 includes a carrier gas heating part 116 that heats the carrier gas supplied from the carrier gas source 14, the carrier gas injection nozzle 17 that injects the carrier gas heated by the carrier gas heating part 116; the fuel supply nozzle 19 that supplies the fuel 18 to the tip end of the carrier gas injection nozzle 17 so that the fuel 18 is atomized with the carrier gas injected from the carrier gas injection nozzle 17, a reforming part 122 that decomposes this atomized fuel 18 and that reforms this atomized fuel 18 into the reducing gas 21, and the reducing gas supply nozzle 23 that supplies the reducing gas 21, which is discharged from an outlet of the reforming part 122, to the exhaust pipe 12 of the engine 11. The above-described carrier gas heating part 116, carrier gas injection nozzle 17, reforming part 122 and fuel supply nozzle 19 are housed in a cylindrical reformer housing 124 that extends in the vertical direction, and a lower end of this reformer housing 124 is connected to the upper end of the reducing gas supply nozzle 23. This reformer housing 124 has a diameter larger than the reformer housing of the first embodiment and is formed in a long cylindrical shape.

Meanwhile, the carrier gas heating part 116 includes a coil holding part 116a that is formed in a columnar shape, that extends in the vertical direction, and that is integrally formed with a stepped flange 116b in an upper end thereof, a heating coil 116c that is embedded so as to extend along an outer peripheral surface of this coil holding part 116a and not to be exposed on the outer peripheral surface of this coil holding part 116a, and a carrier gas passage coil 116d helically wound around the outer peripheral surface of the coil holding part 116a (FIG. 8). The coil holding part 116a is formed of a metal having a relatively high heat conductivity that is in a range of from 15 to 17 W/(m·K), such as SUS316, Inconel (registered trademark, manufactured by Special Metals Corporation), etc. Also, although illustration is omitted, the heating coil 116c is configured by loosely inserting a heating element such as a nichrome wire into a metal sheath (metal ultrafine pipe) and filling a powder of a high-purity inorganic insulating material in a space between the metal sheath and the heating element. Here, although illustration is omitted, as for a method for embedding the heating coil 116c in the coil holding part 116a, there are a method in which a first holding part having a columnar shape and having a diameter slightly smaller than the coil holding part 116a is prepared, a helical recessed groove capable of housing the heating coil therein is formed on an outer peripheral surface of this first holding part, the heating coil is housed in this helical recessed groove, and a second holding part having a cylindrical shape and having the same outer diameter as the coil holding part is fitted to the first holding part; and the like. Also, a carrier gas passage coil 116d is formed by helically winding a metal wire material having a relatively high heat conductivity which is in a range of from 15 to 17 W/(m·K), such as SUS316, SUS304, or Inconel, around the outer peripheral surface of the coil holding part 116a. The above-described carrier gas passage coil 116d is helically wound at a predetermined interval D (FIG. 9) between metal wire materials adjacent to each other, and according to this, a carrier gas passage 116e in which the carrier gas flows helically along the outer peripheral surface of the coil holding part 116a is formed. That is, the configuration is made so that a space formed by providing the predetermined intervals D forms the carrier gas passage 116e through which the carrier gas flows.

The above-described carrier gas heating part 116 is housed in an upper part of a heating part case 126 which has the upper part formed in a cylindrical shape and a lower part formed in a funnel shape which tapers downward, and this heating part case 126 is inserted into an upper part of the reformer housing 124. Also, when the carrier gas heating part 116 is housed in the heating part case 126, a space T (FIG. 9) that is in a range of from 0.4 to 0.5 mm is formed between the outer peripheral surface of the carrier gas passage coil 116d and the inner peripheral surface of the heating part case 126. Here, the reason why the above-described space T is limited in the range of from 0.4 to 0.5 mm is that if the space T is less than 0.4 mm, the heat which has been generated in the heating coil 116c and conducted to the carrier gas passage coil 116d through the coil holding part 116a is conducted to the heating part case 126 and dissipated, whereas if the space T exceeds 0.5 mm, a large part of the carrier gas does not flow within the helical carrier gas passage 116e but flows through the space T, so that the carrier gas cannot be sufficiently heated in the carrier gas heating part 116. Also, the configuration is made so that the carrier gas injection nozzle 17 is formed in a lower end of the heating part case 126, and the carrier gas heated in the carrier gas heating part 116 is injected downward from a tip end (lower end) of this carrier gas injection nozzle 17. It is noted that a reference sign 127 in FIG. 8 indicates a carrier gas supply pipe having a tip end connected to the reformer housing 124 and the upper part of the heating part case 126. A base end of this carrier gas supply pipe 127 is connected to the carrier gas tank 14.

The fuel supply nozzle 19 is configured in the same manner as that in the fuel supply nozzle of the first embodiment. Also, similar to the first embodiment, as shown in FIGS. 8 and 10, the inclination angle θ of the carrier gas injection nozzle 17 formed in the lower end of the heating part case 126 is set to be in the range of from 30 to 60 degrees with respect to the horizontal plane, and preferably from 40 to 50 degrees with respect to the horizontal plane. Also, similar to the first embodiment, the distance H between the horizontal plane including the lower end of the carrier gas injection nozzle 17 and the horizontal plane including hole centers of the supply holes 19c of the fuel supply nozzle 19 is set to be in the range from −10 to +10 mm, and preferably from 0 to +5 mm. Furthermore, similar to the first embodiment, assuming that d1 denotes the outer diameter of the vertical pipe part 19b of the fuel supply nozzle 19 and that d2 denotes the hole diameter of the carrier gas injection nozzle 17, d1/d2 is set to be in the range of from 0.1 to 0.98, and preferably from 0.5 to 0.8.

As shown in FIG. 8, the reforming part 122 includes a reforming catalyst 122a. An inlet of the reforming catalyst 122a is provided to face the carrier gas injection nozzle 17 and the fuel supply nozzle 19 and below the lower end of the carrier gas injection nozzle 17 and the lower end of the vertical pipe part 19b of the fuel supply nozzle 19 at a relatively large distance from the lower end of the carrier gas injection nozzle 17 and the lower end of the vertical pipe part 19b of the fuel supply nozzle 19. This configuration is employed for the purposes of allowing the above-described atomized fuel 18 to gradually spread downward in a relatively wide space between the fuel supply nozzle 19 and the reforming catalyst 122a and disperse this atomized fuel 18 substantially uniformly over the entire inlet surface (upper surface) of the reforming catalyst 122a. Also, the reforming catalyst 122a is a monolith catalyst and is configured by coating a cordierite honeycomb carrier with rhodium (Rh) or ruthenium (Ru). The reforming catalyst 122a including rhodium is configured by coating a honeycomb carrier with a slurry containing a rhodium powder. Also, the reforming catalyst 122a including ruthenium is configured by coating a honeycomb carrier with a slurry containing a ruthenium powder. It should be noted that the above-described cordierite honeycomb carrier may be a metal carrier formed of stainless steel. Furthermore, similar to the first embodiment, the reducing gas supply nozzle 23 is attached to the exhaust pipe 12 of the engine 11.

The fuel reformer 113 is incorporated into the exhaust gas purifier of the diesel engine 11. This exhaust gas purifier is configured in the same manner as that in the gas purification apparatus of the first embodiment. Meanwhile, a carrier gas temperature sensor 132 that detects a temperature of the carrier gas at an outlet of the carrier gas heating part 116 is inserted into the reformer housing 124 on the outlet side of the carrier gas heating part 116 (FIG. 8). Each of detection outputs of the carrier gas temperature sensor 132, the exhaust gas temperature sensor 53, the rotation sensor 54, and the load sensor 56 is connected to the control input of the controller 57, and control outputs of the controller 57 are connected to the heating coil 116c, the fuel supply pump 38, the carrier gas flow rate regulation valve 41, and the fuel on-off valve 43, respectively. The memory 58 is provided in the controller 57. The memory 58 stores, in advance, the number of times the fuel on-off valve 43 opens and closes per unit time, presence or absence of actuation of the fuel supply pump 38, and the opening degree of the carrier gas flow rate regulation valve 41, according to the carrier gas temperature at the outlet of the carrier gas heating part 116, the exhaust gas temperature at the inlet of the selective reduction catalyst 31, the engine rotational speed, and the engine load. Also, the memory 58 stores, as a map, a change of the flow rate of NOx in the exhaust gas discharged from the engine 11 based on a change of each of the engine rotational speed and the engine load is stored. Except what is described above, the configuration is the same as that in the first embodiment.

An operation of the exhaust gas purifier having the thus configured fuel reformer 113 will be described. When the engine 11 is started, the controller 57 repeats energization and non-energization every certain time period on the heating coil 116c of the carrier gas heating part 116 and opens the carrier gas flow rate regulation valve 41 at a predetermined opening degree. Immediately after the start of the engine 11, the outlet temperature of the carrier gas heating part 116 is an extremely scarce temperature which is about room temperature, and if the carrier gas temperature sensor 132 detects this temperature which is about room temperature, the controller 57 regulates a duty ratio of an energizing time period for the heating coil 116c and a non-energizing time period for the heating coil 116c on the basis of a detection output of the carrier gas temperature sensor 132, to thereby making the energizing time for the heating coil 116c be longer than the non-energizing time for the heating coil 116c. When the carrier gas flow rate regulation valve 41 is opened, and energization and non-energization for the heating coil 116c are repeated, the carrier gas in the carrier gas tank 14 is supplied to the carrier gas passage 116e of the carrier gas heating part 116. This carrier gas reaches the carrier gas injection nozzle 17 drawing the heat, which is generated by the heating coil 116c and conducted to the coil holding part 116a and the carrier gas passage coil 116d, during a course of flowing through the carrier gas passage 116e. Since the above-described carrier gas passage 116e is sufficiently long, the carrier gas can be sufficiently heated by the carrier gas heating part 116. Also, the fuel 18 does not flow in the carrier gas passage 116e but only the carrier gas flows therein, and therefore, the fuel 18 does not adhere onto an inner wall of the carrier gas passage 116e, and the carrier gas smoothly flows in the carrier gas passage 116e. According to this, the outlet temperature of the carrier gas heating part 116 gradually increases.

If the carrier gas temperature sensor 132 detects that the outlet temperature of the carrier gas heating part 116 has reached, for example, 600° C., the controller 57 regulates a duty ratio of the energizing time period for the heating coil 116c and the non-energizing time period for the heating coil 116c, to thereby keep the outlet temperature of the carrier gas heating part 116 at a predetermined temperature which is 600° C. or higher. Also, if the exhaust gas temperature sensor 53 detects that the inlet temperature of the selective reduction catalyst 31 has increased to, for example, a relatively low temperature, for example, 200° C., the controller 57 acquires the detection outputs of the engine rotational speed and the engine load detected by the rotation sensor 54 and the load sensor 56, determines a NOx amount in the exhaust gas with respect to each of the detection outputs of the engine rotational speed and the engine load based on the map, and supplies the fuel 18 according to this NOx amount to the supply holes 19c of the fuel supply nozzle 19. That is, the controller 57 drives the fuel supply pump 38 on the basis of the respective detection outputs of the rotation sensor 54 and the load sensor 56 and also repeats opening and closing of the fuel on-off valve 43 in a predetermined duty ratio, to thereby supply the fuel 18 according to the NOx amount to the supply holes 19c of the fuel supply nozzle 19.

The fuel 18 supplied to the supply holes 19c of the fuel supply nozzle 19 is blown away with the carrier gas injected from the carrier gas injection nozzle 17 and atomized, and also, its temperature increases by means of mixing with the high-temperature carrier gas. Then, the above-described atomized fuel 18 gradually spreads downward in the relatively wide space between the fuel supply nozzle 19 and the reforming catalyst 122a and is substantially uniformly dispersed over the entire inlet surface (upper surface) of the reforming catalyst 122a. Therefore, the large part of this substantially uniformly dispersed and atomized fuel 18 is decomposed with the reforming catalyst 122a as expressed in the following formulae (1) and (2) and reformed into the reducing gas 21 such as hydrogen (H$_2$), an oxygen-containing hydrocarbon (HCHO), and carbon monoxide (CO).

$$CH_2+0.5O_2 \rightarrow H_2+CO \quad (1)$$

$$CH_2+0.5O_2 \rightarrow HCHO \quad (2)$$

Each of the foregoing formulae (1) and (2) expresses a chemical reaction formula in which the fuel 18 is decomposed into the reducing gas 21. Here, since the temperature of the atomized fuel 18 immediately before it flows into the reforming catalyst 122a is kept at the predetermined temperature which is 600° C. or higher, the reformation efficiency of the atomized fuel 18 with the reforming catalyst 122a into the reducing gas 21 can be enhanced. It should be noted that a large part of the reducing gas 21 resulting from the reformation with the reforming catalyst 122a is hydrogen (H$_2$), and the oxygen-containing hydrocarbon (HCHO) is extremely scarce.

In this way, the fuel 18 is decomposed by the fuel reformer 113 and reformed into the reducing gas 21, and thereafter, this reducing gas 21 is supplied from the reducing gas supply nozzle 23 to the exhaust pipe 12. Then, when the hydrogen gas (H$_2$) as the reducing gas 21 flows into the selective reduction catalyst 31 together with the exhaust gas, the hydrogen gas (H$_2$) functions as the reducing agent which reduces NOx (NO and NO$_2$) in the exhaust gas, and NOx in the exhaust gas is rapidly reduced to N$_2$ as expressed in the following formula (3).

$$NO+NO_2+3H_2 \rightarrow N_2+3H_2O \quad (3)$$

The foregoing formula (3) expresses a chemical reaction formula in which N and NO$_2$ in the exhaust gas react with the hydrogen gas (H$_2$) in the presence of the selective reduction catalyst 31, whereby NO and NO$_2$ are reduced to N$_2$. As a result, NOx can be efficiently decreased in a wide temperature range where the exhaust gas temperature is in a range of from a relatively low temperature to a high temperature.

Fifth Embodiment

Figure 12:
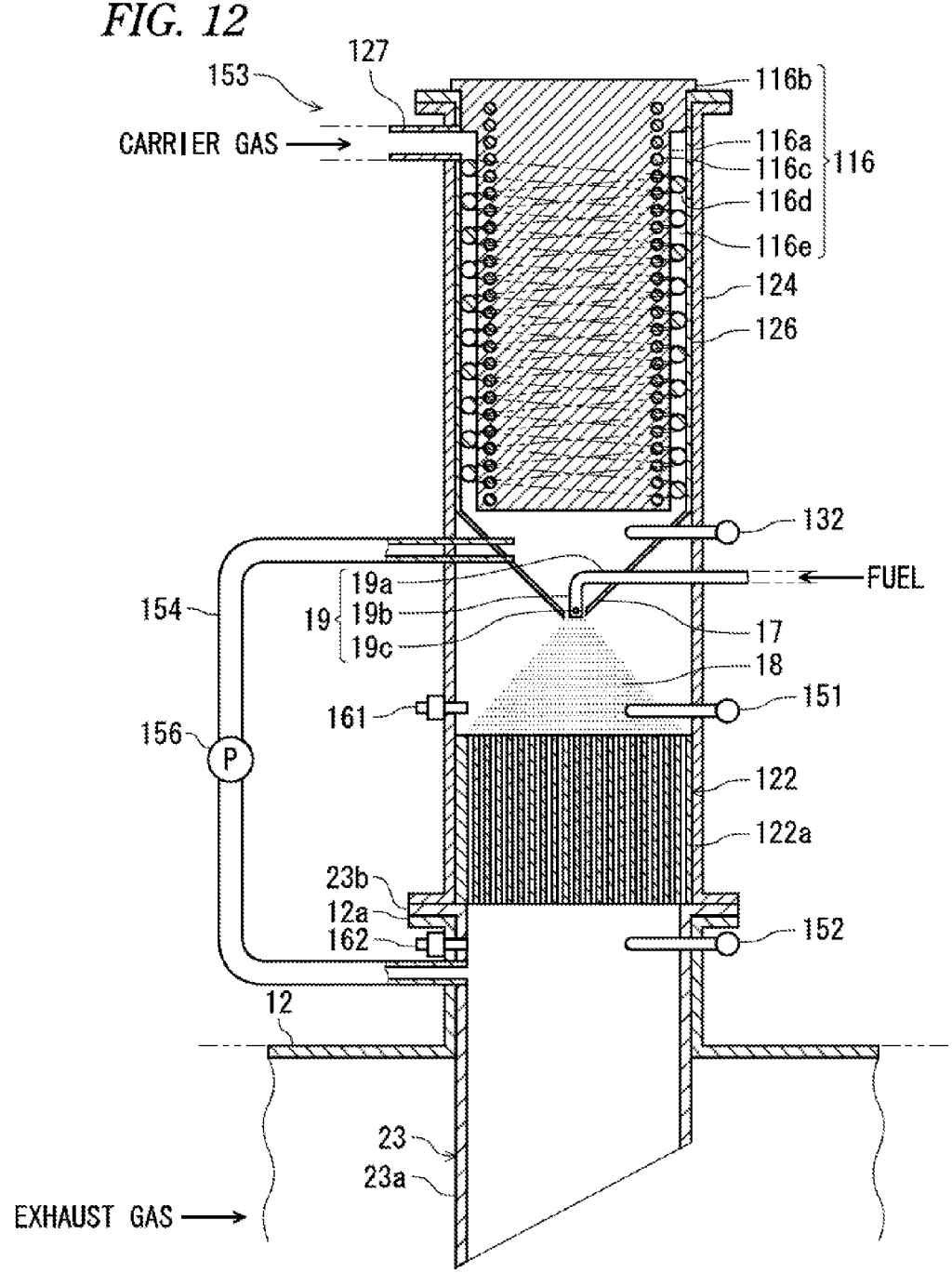
FIG. 12 is a longitudinal section configuration view showing a fuel reformer of a fifth embodiment of the present invention.
Figure 13:
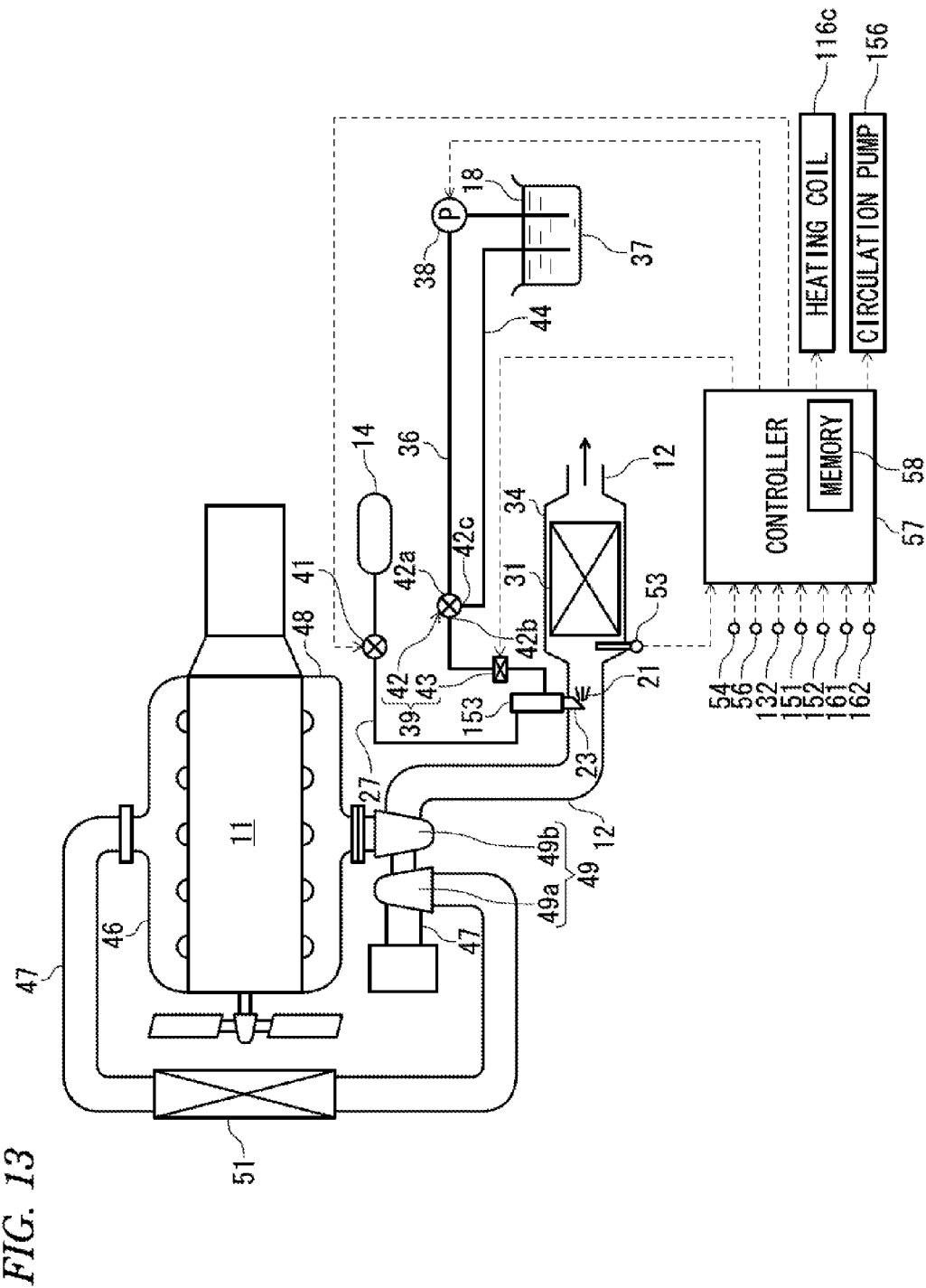
FIG. 13 is a configuration view showing an exhaust gas purifier using the fuel reformer.
Figure 14:
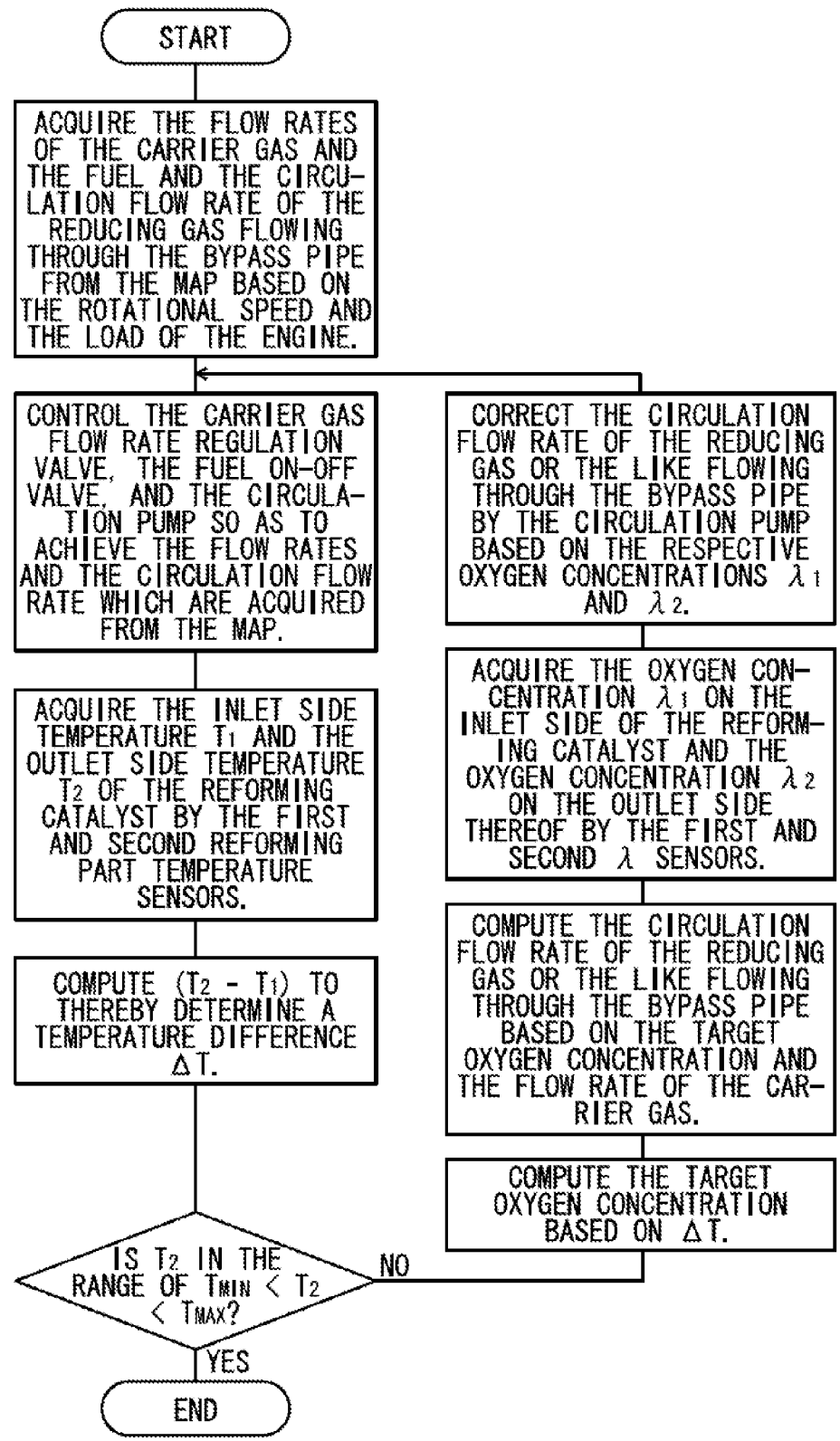
FIG. 14 is a flowchart for controlling a temperature of the fuel reformer.

FIGS. 12 to 14 show a fifth embodiment of the present invention. In FIGS. 12 and 13, the same reference signs as those in FIGS. 8 and 11 indicate the same components. In this embodiment, a bypass pipe 154 that bypasses the reforming part 122 is provided, and a circulation pump 156 that returns the reducing gas discharged from the reforming part 122 and the atomized fuel 18 to just before the carrier gas injection nozzle 17 is provided in the bypass pipe 154. One end (lower end) of the bypass pipe 154 is connected to the reformer housing 124 below the reforming catalyst 122a, and the other end (upper end) of the bypass pipe 154 is horizontally inserted into the reformer housing 124 and a lower part (funnel shaped proportion) of the heating part case 126 that are between the carrier gas heating part 116 and the carrier gas injection nozzle 17. Also, a temperature on the inlet side of the reforming part 122 is detected by a first reforming part temperature sensor 151, and a temperature on the outlet side of the reforming part 122 is detected by a second reforming part temperature sensor 152. Also, an oxygen concentration on the inlet side of the reforming part 122 is detected by a first λ sensor 161, and an oxygen concentration on the outlet side of the reforming part 122 is detected by a second λ sensor 162. Furthermore, each of detection outputs of the first reforming part temperature sensor 151, the second reforming part temperature sensor 152, the first λ sensor 161, the second λ sensor 162, the carrier gas temperature sensor 132, the exhaust gas temperature sensor 53, the rotation sensor 54, and the load sensor 56 is connected to the control input of the controller 57, and control outputs of the controller 57 are connected to the circulation pump 156, the heating coil 116c, the fuel supply pump 38, the carrier gas flow rate regulation valve 41, and the fuel on-off valve 43, respectively.

The memory 58 is provided in the controller 57. Also, the memory 58 stores, in advance, the number of times the fuel on-off valve 43 opens and closes per unit time, presence or absence of actuation of the fuel supply pump 38, and the opening degree of the carrier gas flow rate regulation valve 41, according to the carrier gas temperature at the outlet of the carrier gas heating part 116, the exhaust gas temperature at the inlet of the selective reduction catalyst 31, the engine rotational speed, and the engine load. Also, the memory 58 stores, as maps, a change of the flow rate of the carrier gas injected from the carrier gas injection nozzle 17, a change of the flow rate of the fuel 18 supplied from the fuel supply nozzle 19 to the tip end of the carrier gas injection nozzle 17, and a change of the circulation flow rate of the reducing gas containing the atomized fuel flowing through the bypass pipe 154 which are based on changes of the engine rotational speed and the engine load. Furthermore, the memory 58 stores, as a map, a change of the flow rate of NOx in the exhaust gas discharged from the engine 11 based on a change of each of the engine rotational speed and the engine load. Except what is described above, the configuration is the same as that in the first embodiment.

An operation of the exhaust gas purifier having a thus configured fuel reformer 153 will be described with reference to a flowchart of FIG. 14. When the engine 11 is started, the controller 57 acquires the flow rate of the carrier gas injected from the carrier gas injection nozzle 17, the flow rate of the fuel 18 supplied from the fuel supply nozzle 19 to the tip end of the carrier gas injection nozzle 17, and the circulation flow rate of the reducing gas containing the atomized fuel flowing through the bypass pipe 154 from the map based on the engine rotational speed detected by the rotation sensor 54 and the engine load detected by the load sensor 56. Then, the controller 57 controls the opening degree of the carrier gas flow rate regulation valve 41, the number of times the fuel on-off valve 43 opens and closes per unit time, and the circulation pump 156, respectively so that the flow rate of the carrier gas, the flow rate of the fuel 18, and the circulation flow rate of the reducing gas containing the atomized fuel as described above are achieved. Subsequently, the controller 57 acquires a temperature $T_1$ on the inlet side of the reforming catalyst 122a and a temperature $T_2$ on the outlet side of the reforming catalyst 122a by the detection outputs of the first and second reforming part temperature sensors 151 and 152, respectively and computes $(T_2-T_1)$ to obtain a temperature difference $\Delta T$ therebetween. Then, if the temperature $T_2$ on the outlet side of the reforming catalyst 122a falls within a range of $(T_{MIN}<T_2<T_{MAX})$, the circulation flow rate of the reducing gas containing the atomized fuel and flowing through the bypass pipe 154 is not corrected. Here, $T_{MIN}$ represents a minimum temperature (for example, 600° C.) at which the atomized fuel can be reformed with the reforming catalyst 122a into the reducing gas, and $T_{MAX}$ represents a heat-resistant temperature (for example, a predetermined temperature in a range of from 700° C. to 900° C.) of the reforming catalyst 122a.

On the other hand, if the temperature $T_2$ on the outlet side of the reforming catalyst 122a falls outside the range of $(T_{MIN}<T_2<T_{MAX})$, the controller 57 computes a target oxygen concentration based on the above-described temperature difference $\Delta T$ and computes the circulation flow rate of the reducing gas containing the atomized fuel and flowing through the bypass pipe 154 based on the target oxygen concentration and the flow rate of the carrier gas. Then, the controller 57 acquires the oxygen concentration $\lambda 1$ on the inlet side of the reforming catalyst 122a and the oxygen concentration $\lambda 2$ on the outlet side, respectively by the detection outputs of the first and second $\lambda$ sensors 161 and 162, corrects the circulation flow rate of the reducing gas containing the atomized fuel and caused by the circulation pump 156 to flow through bypass pipe 154 based on these oxygen concentrations $\lambda 1$ and $\lambda 2$, and then controls the circulation pump 156 so that this corrected circulation flow rate is achieved. As a result, not only the reducing gas in an optimum flow rate is achieved by the reforming catalyst 122a, but also deterioration of the reforming catalyst 122a by the heat can be suppressed. In this way, the controller 57 controls the circulation pump 156 on the basis of each of the detection outputs of the first and second reforming part temperature sensors 151 and 152, and therefore, a part of the reducing gas containing the atomized fuel resulting from mixing of the reducing gas reformed with the reforming catalyst 122a of the reforming part 122 and the atomized fuel, which has not been reformed in the reforming part 122a but passed through the reforming catalyst 122a as it is, passes through the bypass pipe 154, returns to just before the carrier gas injection nozzle 17, and again flows into the reforming part 122a, and the atomized fuel in the above-described atomized fuel containing reducing gas is reformed with the reforming catalyst 122a. As a result, efficiency for reforming the fuel into the reducing gas can be enhanced. The operations other than those described above are substantially the same as the operations in the fourth embodiment, and therefore, redundant description thereon will be omitted.

Sixth Embodiment

FIGS. 15 to 18 show a sixth embodiment of the present invention. In FIGS. 15 to 18, the same reference signs as those in FIGS. 8 and 11 indicate the same components. In this embodiment, a fuel reformer 173 includes the carrier gas heating part 116 that heats a first carrier gas supplied from the carrier gas tank 14 through a first carrier gas supply pipe 171, a first carrier gas injection nozzle 181 that injects the first carrier gas heated by the carrier gas heating part 116, a first fuel supply nozzle 191 that supplies the fuel 18 to a tip end of the first carrier gas injection nozzle 181 so that the fuel 18 is atomized with this injected first carrier gas, an exothermic catalyst part 174 that oxidizes this atomized fuel 18 and that further heats the first carrier gas to increase its temperature, a second carrier gas supply pipe 172 that mixes the carrier gas stored in the carrier gas tank 14 as the second carrier gas with the first carrier gas on an outlet side of the exothermic catalyst part 174, a second carrier gas injection nozzle 182 that injects the mixed carrier gas of the first and second carrier gases, a second fuel supply nozzle 192 that supplies the fuel 18 to a tip end of the second carrier gas injection nozzle 182 so that the fuel 18 is atomized with this injected mixed carrier gas, the reforming part 122 that decomposes this atomized fuel 18 to reform it into the reducing gas 21, and the reducing gas supply nozzle 23 that supplies the reduced gas 21 discharged from the outlet of the reforming part 122 to the exhaust pipe 12 of the engine 11.

Figure 15:
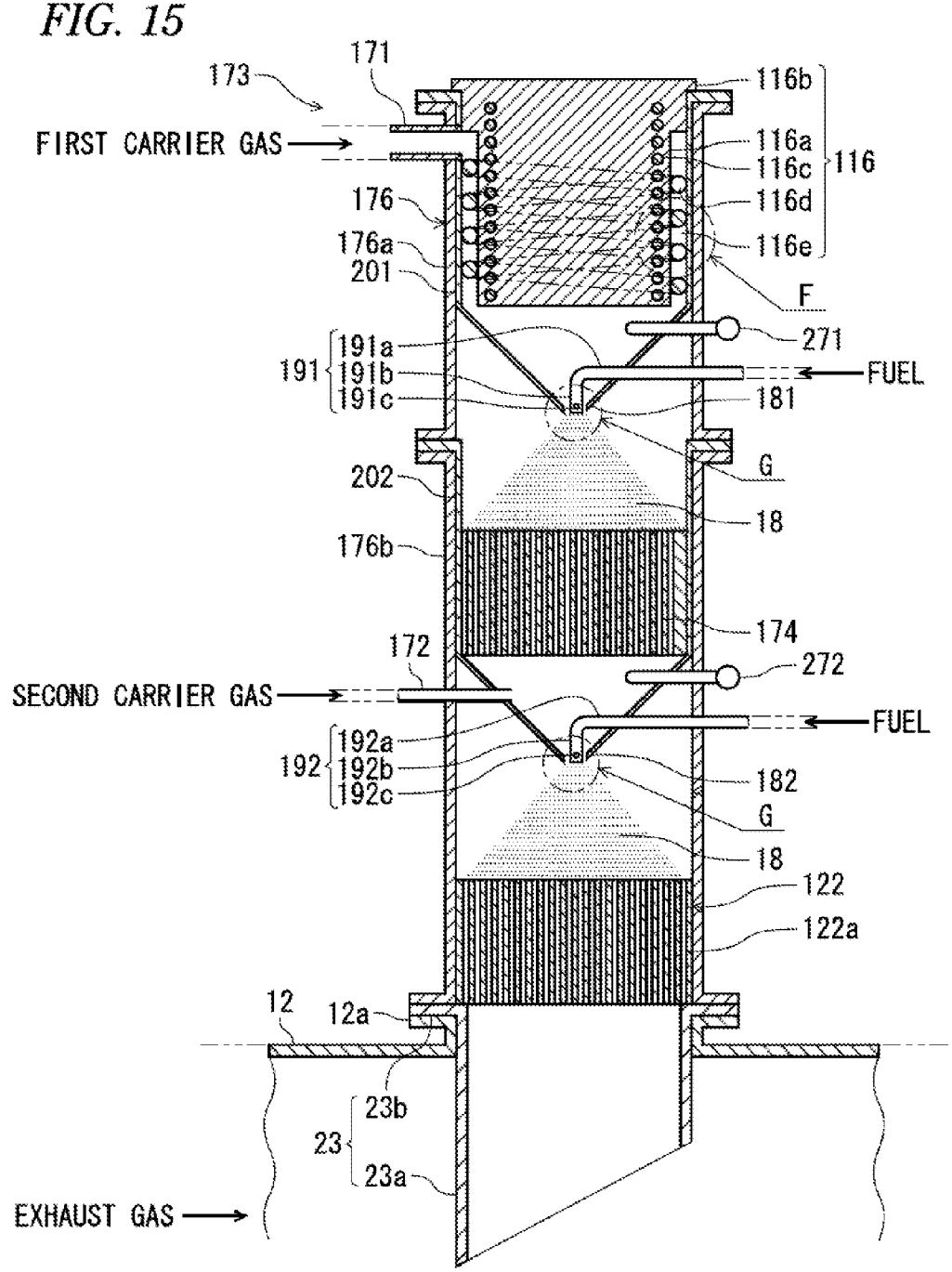
FIG. 15 is a longitudinal section configuration view showing a fuel reformer of a sixth embodiment of the present invention.

The carrier gas heating part 116 is configured in the same manner as that in the fourth embodiment, except that the length of the carrier gas heating part is shorter than that in the fourth embodiment (FIG. 15). For that reason, as for the carrier gas heating part 116, the same reference sign as that in the carrier gas heating part of the fourth embodiment is used. Also, a first heat part case 201 is configured in the same manner as the heating part case of the fourth embodiment, except that the length of the heat part case is shorter than that in the fourth embodiment. Furthermore, the first carrier gas injection nozzle 181 formed in a lower end of the first heating part case 201 is configured in the same manner as the carrier gas injection nozzle formed in the lower end of the heating part case of the fourth embodiment.

Figure 17:
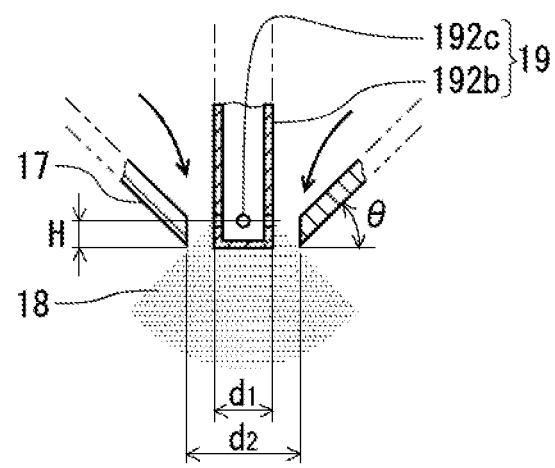
FIG. 17 is an enlarged section view of a G part in FIG. 15.

Meanwhile, the first fuel supply nozzle 191 is configured in the same manner as the fuel supply nozzle of the fourth embodiment. That is, as shown in FIGS. 15 and 17, the first fuel supply nozzle 191 includes a horizontal pipe part 191a that is provided to extend from the outer peripheral surface of a lower part, in the vertical direction, of an upper housing part 176a of a reformer housing 176 toward a center of the upper housing part 176a, a vertical pipe part 191b that is communicated with and connected to a tip end of this horizontal pipe part 191a, that is provided to extend downward, and that has a closed lower end, and a plurality of supply holes 191c that are formed at intervals of predetermined angles in the same horizontal plane in a lower side surface of the vertical pipe part 191b.

The exothermic catalyst part 174 has an inlet that faces the first carrier gas injection nozzle 181 and the first fuel supply nozzle 191 and is provided below the lower end of the first carrier gas injection nozzle 181 and the lower end of the vertical pipe part 191*b* of the first fuel supply nozzle 191 at a relatively large distance from the lower end of the first carrier gas injection nozzle 181 and the lower end of the vertical pipe part 191*b* of the first fuel supply nozzle 191 (FIG. 15). This configuration is employed for the purpose of allowing the above-described atomized fuel 18 to gradually spread downward in a relatively wide space between the first fuel supply nozzle 191 and the exothermic catalyst part 174 and dispersing this atomized fuel 18 substantially uniformly over the entire inlet surface (upper surface) of the exothermic catalyst part 174. Also, the exothermic catalyst part 174 is a monolith catalyst and is configured by coating a cordierite honeycomb carrier with platinum (Pt) or palladium (Pd). The exothermic catalyst part 174 including platinum is configured by coating a honeycomb carrier with a slurry containing a platinum powder. Also, the exothermic catalyst part 174 including palladium is configured by coating a honeycomb carrier with a slurry containing a palladium powder. It should be noted that the above-described cordierite honeycomb carrier may be a metal carrier formed of stainless steel.

The above-described exothermic catalyst part 174 is housed in an upper part of a second heating part case 202 having an upper part that is formed in a cylindrical shape and a lower part that is formed in a funnel shape which tapers downward, and this second heating part case 202 is inserted into an upper part of a lower housing part 176*b* of the reformer housing 176 (FIG. 15). Also, the second carrier gas supply pipe 172 is inserted into the lower housing part 176*b* of the reformer housing 176 and a lower part of the second heating part case 202, with extending in the horizontal direction so as to be located on an outlet side of the exothermic catalyst part 174. Furthermore, the configuration is made so that the second carrier gas injection nozzle 182 is formed in a lower end of the second heating part case 202, and the mixed carrier gas of the first and second carrier gases is injected downward from the tip end (lower end) of this second carrier gas injection nozzle 182.

The second fuel supply nozzle 192 is configured in the same manner as the fuel supply nozzle of the fourth embodiment. That is, as shown in FIGS. 15 and 17, the second fuel supply nozzle 192 has a horizontal pipe part 192*a* that is provided to extend from the outer peripheral surface at a center, in the vertical direction, of the lower housing part 176*b* of the reformer housing 176 toward a center of the lower housing part 176*b*, a vertical pipe part 192*b* that is communicated with and connected to a tip end of this horizontal pipe part 192*a*, that is provided to extend downward, and that has a closed lower end, and a plural of supply holes 192*c* that are formed at intervals of predetermined angles in the same horizontal plane in a lower side surface of the vertical pipe part 192*b*. Also, an inlet of the reforming part 122 is provided to face the second carrier gas injection nozzle 182 and the second fuel supply nozzle 192 and below the lower end of the second carrier gas injection nozzle 182 and the lower end of the vertical pipe part 192*b* of the second fuel supply nozzle 192 at a relatively large distance from the lower end of the second carrier gas injection nozzle 182 and the lower end of the vertical pipe part 192*b* of the second fuel supply nozzle 192. This configuration is employed for the purposes of allowing the above-described atomized fuel 18 to gradually spread downward in a relatively wide space between the second fuel supply nozzle 192 and the reforming part 122 and dispersing this atomized fuel 18 substantially uniformly over the entire inlet surface (upper surface) of the reforming part 122.

Figure 18:
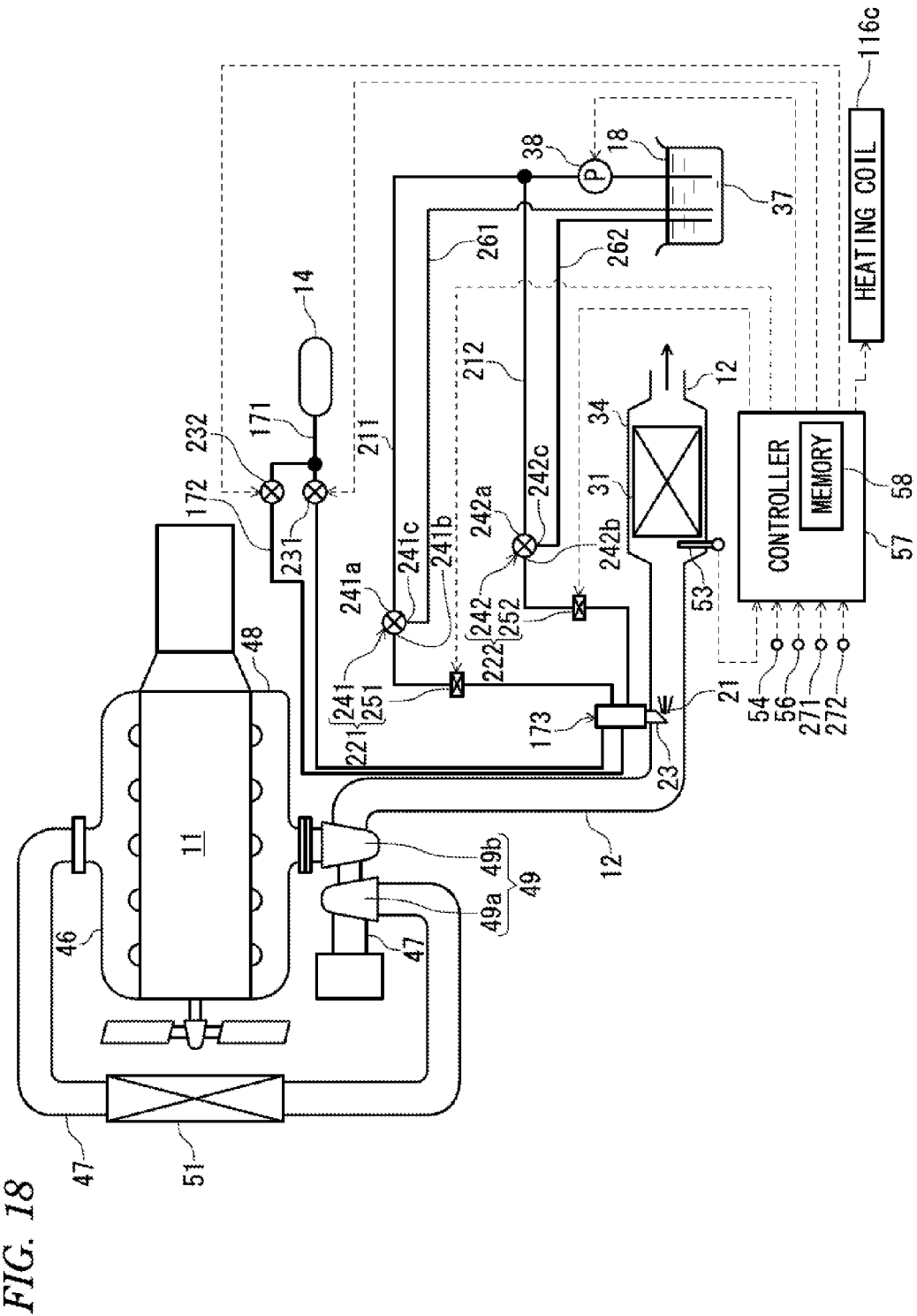
FIG. 18 is a configuration view showing an exhaust gas purifier using the fuel reformer.

Meanwhile, the fuel reformer 173 further includes a first fuel supply pipe 211 that has a tip end connected to the first fuel supply nozzle 191, the fuel tank 37 which is connected to a base end of this first fuel supply pipe 211 and which stores the fuel 18, the fuel supply pump 38 which forcedly supplies the fuel 18 in this fuel tank 37 to the first fuel supply nozzle 191, a first fuel supply amount regulation valve 221 that regulates a supply amount of the fuel 18 which is supplied from the first fuel supply nozzle 191 into the tip end of the first carrier gas injection nozzle 181, a first carrier gas flow rate regulation valve 231 provided in the first carrier gas supply pipe 171 which connects the carrier gas tank 14 and the carrier gas passage 116*e* of the carrier gas heating part 116 to each other, a second fuel supply pipe 212 that has a tip end connected to the second fuel supply nozzle 192 and a base end connected to the first fuel supply pipe 211 in the vicinity of the discharge port of the fuel supply pump 38, a second fuel supply amount regulation valve 222 that regulates the supply amount of the fuel 18 supplied from the second fuel supply nozzle 192 to the tip end of the second carrier gas injection nozzle 182, and a second carrier gas flow rate regulation valve 232 provided in the second carrier gas supply pipe 172 which connects the carrier gas tank 14 and the lower part of the second heating part case 202 to each other (FIGS. 15 and 18). It should be noted that the first carrier gas is a gas that supplies, to the exothermic catalyst part 174, oxygen necessary for oxidizing the fuel 18 in the exothermic catalyst part 174 and that the second carrier gas is a gas that supplies, to the reforming part 122, oxygen necessary for reforming the fuel 18 in the reforming part 122. Also, the second carrier gas is set to have a flow rate smaller than the first carrier gas.

The above-described fuel supply pump 38 is provided in the first fuel supply pipe 211 between the first fuel supply nozzle 191 and the fuel tank 37 (FIGS. 15 and 18). Also, the first fuel supply amount regulation valve 221 includes a first fuel pressure regulation valve 241 that is provided in the first fuel supply pipe 211 and that regulates a supply pressure of the fuel 18 to the first fuel supply nozzle 191, and a first fuel on-off valve 251 that is provided in the base end of the first fuel supply nozzle 191 and that opens or closes the base end of the first fuel supply nozzle 191. The first fuel pressure regulation valve 241 has first to third ports 241*a* to 241*c*, the first port 241*a* is connected to the discharge port of the fuel supply pump 38, the second port 241*b* is connected to the first fuel on-off valve 251, and the third port 241*c* is connected to the fuel tank 37 by a first return pipe 261. The fuel 18 forcedly supplied by the fuel supply pump 38 flows from the first port 241*a* into the first fuel pressure regulation valve 241 and is forcedly supplied from the second port 241*b* into the first fuel on-off valve 251. Also, if the pressure at the first fuel pressure regulation valve 241 reaches a setting pressure or more, the fuel 18 forcedly supplied by the fuel supply pump 38 flows from the first port 241*a* into the first fuel pressure regulation valve 241, and thereafter, the fuel 18 passes through the third port 241*c* and the first return pipe 261 and is returned to the fuel tank 37. Furthermore, the first carrier gas flow rate regulation valve 231 is configured so that the flow rate of the first carrier gas supplied from the carrier gas tank 14 to the carrier gas passage 116*e* of the carrier gas heating part 116 can be regulated.

The second fuel supply amount regulation valve 222 includes a second fuel pressure regulation valve 242 that is provided in the second fuel supply pipe 212 and that regulates a supply pressure of the fuel 18 to the second fuel supply nozzle 192, and a second fuel on-off valve 252 that is provided in the base end of the second fuel supply nozzle 192 and that opens and closes the base end of the second fuel supply nozzle 192 (FIGS. 15 and 18). The second fuel pressure regulation valve 242 includes first to third ports 242a to 242c, the first port 242a is connected to the discharge port of the fuel supply pump 38, the second port 242b is connected to the second fuel on-off valve 252, and the third port 242c is connected to the fuel tank 37 by a second return pipe 262. The fuel forcedly supplied from the fuel supply pump 38 flows from the first port 242a into the second fuel pressure regulation valve 242 and is forcedly supplied from the second port 242b to the second fuel on-off valve 252. Also, if a pressure at the second fuel pressure regulation valve 242 reaches a predetermined pressure or more, the fuel 18 forcedly supplied by the fuel supply pump 38 flows from the first port 242a into the second fuel pressure regulation valve 242, and thereafter, the fuel 18 passes through the third port 242c and the second return pipe 262 and is returned to the fuel tank 37. Furthermore, the second carrier gas flow rate regulation valve 232 is configured so that the flow rate of the second carrier gas supplied from the carrier gas tank 14 to the lower part of the second heating part case 202 can be regulated.

Meanwhile, a first carrier gas temperature sensor 271 that detects the temperature of the first carrier gas at the outlet of the carrier gas heating part 116 is inserted into the first heating part case 201 on the outlet side of the carrier gas heating part 116, and a second carrier gas temperature sensor 272 that detects the temperature of the first carrier gas or the mixed carrier gas of the first and second carrier gases at the outlet of the exothermic catalyst part 174 is inserted into the second heating part case 202 on the outlet side of the exothermic catalyst part 174 (FIG. 15). Each of detection outputs of the first carrier gas temperature sensor 271, the second carrier gas temperature sensor 272, the exhaust gas temperature sensor 53, the rotation sensor 54, and the load sensor 56 is connected to the control input of the controller 57, and control outputs of the controller 57 are connected to the heating coil 116c, the fuel supply pump 38, the first carrier gas flow rate regulation valve 231, the second carrier gas flow rate regulation valve 232, the first fuel on-off valve 251, and the second fuel on-off valve 252, respectively (FIG. 18). The memory 58 is provided in the controller 57. The memory 58 stores, in advance, the numbers of times the first and second fuel on-off valves 251 and 252 open and close per unit time, presence or absence of actuation of the fuel supply pump 38, and the openings degrees of the first and second carrier gas flow rate regulation valves 231 and 232, according to the first carrier gas temperature at the outlet of the carrier gas heating part 116, the first carrier gas temperature at the outlet of the exothermic catalyst part 174, the exhaust gas temperature at the inlet of the selective reduction catalyst 31, the engine rotational speed, and the engine load. Also, the memory 58 stores, as a map, a change of the flow rate of NOx in the exhaust gas discharged from the engine 11 with a change of each of the engine rotational speed and the engine load. Except what is described above, the configuration is the same as that in the fourth embodiment.

An operation of the exhaust gas purifier using the thus configured fuel reformer 173 will be described. When the engine 11 is started, the controller 57 repeats energization and non-energization of the heating coil 116c of the carrier gas heating part 116 every certain time period and opens the first carrier gas flow rate regulation valve 231 at a predetermined opening degree. Immediately after the start of the engine 11, an outlet temperature of the carrier gas heating part 116 is an extremely scarce temperature that is about the room temperature; and if the first carrier gas temperature sensor 271 detects this temperature of about the room temperature, the controller 57 regulates a duty ratio of an energizing time period for the heating coil 116c and a non-energizing time period for the heating coil 116c on the basis of a detection output of the first carrier gas temperature sensor 271, to thereby make the energizing time period for the heating coil 116c longer than the non-energizing time period for the heating coil 116c. If the first carrier gas flow rate regulation valve 231 is opened and energization and non-energization for the heating coil 116c are repeated, the carrier gas in the carrier gas tank 14 is supplied as the first carrier gas to the carrier gas passage 116e of the carrier gas heating part 116. This first carrier gas reaches first the carrier gas injection nozzle 181 while drawing the heat, which is generated by the heating coil 116c and conducted to the coil holding part 116a and the carrier gas passage coil 116d, during a course of flowing through the carrier gas passage 116e. Since the above-described carrier gas passage 116e is sufficiently long, the first carrier gas can be sufficiently heated by the carrier gas heating part 116. Also, the fuel 18 does not flow into the carrier gas passage 116e, but only the first carrier gas flows therein, and therefore, the fuel 18 does not adhere to an inner wall of the carrier gas passage 116e, and the first carrier gas smoothly flows in the carrier gas passage 116e. According to this, the outlet temperature of the carrier gas heating part 116 gradually increases.

If the first carrier gas temperature sensor 271 detects that the outlet temperature of the carrier gas heating part 116 has reached, for example, 250° C., the controller 57 regulates a duty ratio of the energizing time period and the non-energizing time period for the heating coil 116c, to thereby keep the outlet temperature of the carrier gas heating part 116 at 250° C., and the controller 57 also drives the fuel supply pump 38 and repeats opening and closing of the first fuel on-off valve 251 in a predetermined duty ratio, to thereby supply the fuel 18 in the fuel tank 37 to the supply holes 191c of the first fuel supply nozzle 191. The fuel 18 supplied to the supply holes 191c of the first fuel supply nozzle 191 is blown away with the first carrier gas injected from the first carrier gas injection nozzle 181 and atomized, and its temperature increases by means of mixing with the first carrier gas having a relatively high temperature. Then, the above-described atomized fuel 18 gradually spreads downward in the relatively wide space between the first fuel supply nozzle 191 and the exothermic catalyst part 174 and is substantially uniformly dispersed over the entire inlet surface (upper surface) of the exothermic catalyst part 174. Therefore, a large part of this substantially uniformly dispersed and atomized fuel 18 is oxidized in the exothermic catalyst part 174 and further heats the first carrier gas, to thereby increase the temperature. Then, if the second carrier gas temperature sensor 272 detects that the outlet temperature of the exothermic catalyst part 174 has reached, for example, 600° C., the controller 57 regulates opening and closing of the first fuel on-off valve 251, respectively, to thereby keep the outlet temperature of the exothermic catalyst part 174 at a predetermined temperature which is 600° C. or higher.

Then, if the exhaust gas temperature 53 detects that the inlet temperature of the selective reduction catalyst 31 has increased to a relatively low temperature, for example, 200° C., the controller 57 acquires each of the detection outputs of the engine rotational speed and the engine load detected by the rotation sensor 54 and the load sensor 56, determines from the map a NOx amount in the exhaust gas with respect to each of the detection outputs of the engine rotational speed and the engine load, and supplies the fuel 18 according to this NOx amount to the supply holes of the second fuel supply nozzle 192. That is, the controller 57 repeats opening and closing of the second fuel on-off valve 252 in a predetermined duty ratio on the basis of each of the detection outputs of the rotation sensor 54 and the load sensor 56, to thereby supply the fuel 18 according to the NOx amount to the supply holes of the second fuel supply nozzle 192.

At the same time, the controller 57 opens the second carrier gas flow rate regulation valve 231 at a predetermined opening degree and supplies the carrier gas in the carrier gas tank 14 as the second carrier gas from the second carrier gas supply pipe 172 to the lower part of the second heating case 202. According to this, the first carrier gas whose temperature has been further increased and the second carrier gas are mixed to form a high-temperature mixed carrier gas. The fuel 18 supplied to the supply holes 192c of the second fuel supply nozzle 192 is blown away with the mixed carrier gas injected from the second carrier gas injection nozzle 182 and atomized, and its temperature increases by means of mixing with the high-temperature mixed carrier gas. Then, the above-described atomized fuel 18 gradually spreads downward in the relatively wide space between the second fuel supply nozzle 192 and the reforming catalyst 122a and is substantially uniformly dispersed over the entire inlet surface (upper surface) of the reforming catalyst 122a. Therefore, a large part of this substantially uniformly dispersed and atomized fuel 18 is decomposed with the reforming catalyst 122a as expressed in the following formulae (1) and (2) and reformed into the reducing gas 21 such as hydrogen (H$_2$), an oxygen-containing hydrocarbon (HCHO), and carbon monoxide (CO).

$$CH_2 + 0.5O_2 \rightarrow H_2 + CO \qquad (1)$$

$$CH_2 + 0.5O_2 \rightarrow HCHO \qquad (2)$$

Each of the foregoing formulae (1) and (2) expresses a chemical reaction formula in which the fuel 18 is decomposed into the reducing gas 21. Here, since the temperature of the atomized fuel 18 immediately before it flows into the reforming catalyst 122a is kept at the predetermined temperature, which is 600° C. or higher, the reformation efficiency of the atomized fuel 18 with the reforming catalyst 122a into the reducing gas 21 can be enhanced. It should be noted that the large part of the reducing gas 21 resulting from the reformation with the reforming catalyst 122a is hydrogen (H$_2$), and the oxygen-containing hydrocarbon (HCHO) is extremely scarce.

In this way, the fuel 18 is decomposed by the fuel reformer 173 and reformed into the reducing gas 21, and thereafter, this reducing gas 21 is supplied from the reducing gas supply nozzle 23 to the exhaust pipe 12. Then, when a hydrogen gas (H$_2$) as the reducing gas 21 flows into the selective reduction catalyst 31 together with the exhaust gas, the hydrogen gas (H$_2$) functions as a reducing agent which reduces NOx (NO and NO$_2$) in the exhaust gas, and NOx in the exhaust gas is rapidly reduced to N$_2$ as expressed in the following formula (3).

$$NO + NO_2 + 3H_2 \rightarrow N_2 + 3H_2O \qquad (3)$$

The foregoing formula (3) expresses a chemical reaction formula in which N and NO$_2$ in the exhaust gas react with the hydrogen gas (H$_2$) in the presence of the selective reduction catalyst 31, whereby NO and NO$_2$ are reduced to N$_2$. As a result, NOx can be efficiently decreased in a wide temperature range where the exhaust gas temperature is in a range of from a relatively low temperature to a high temperature. Also, as described above, the first carrier gas is subjected to temperature rise in the two stages, and therefore, an electric power required for heating-up of the first carrier gas in the carrier gas heating part 116 can be decreased. As a result, the fuel 18 can be more efficiently reformed into the reducing gas than that in the fourth embodiment.

Seventh Embodiment

Figure 19:
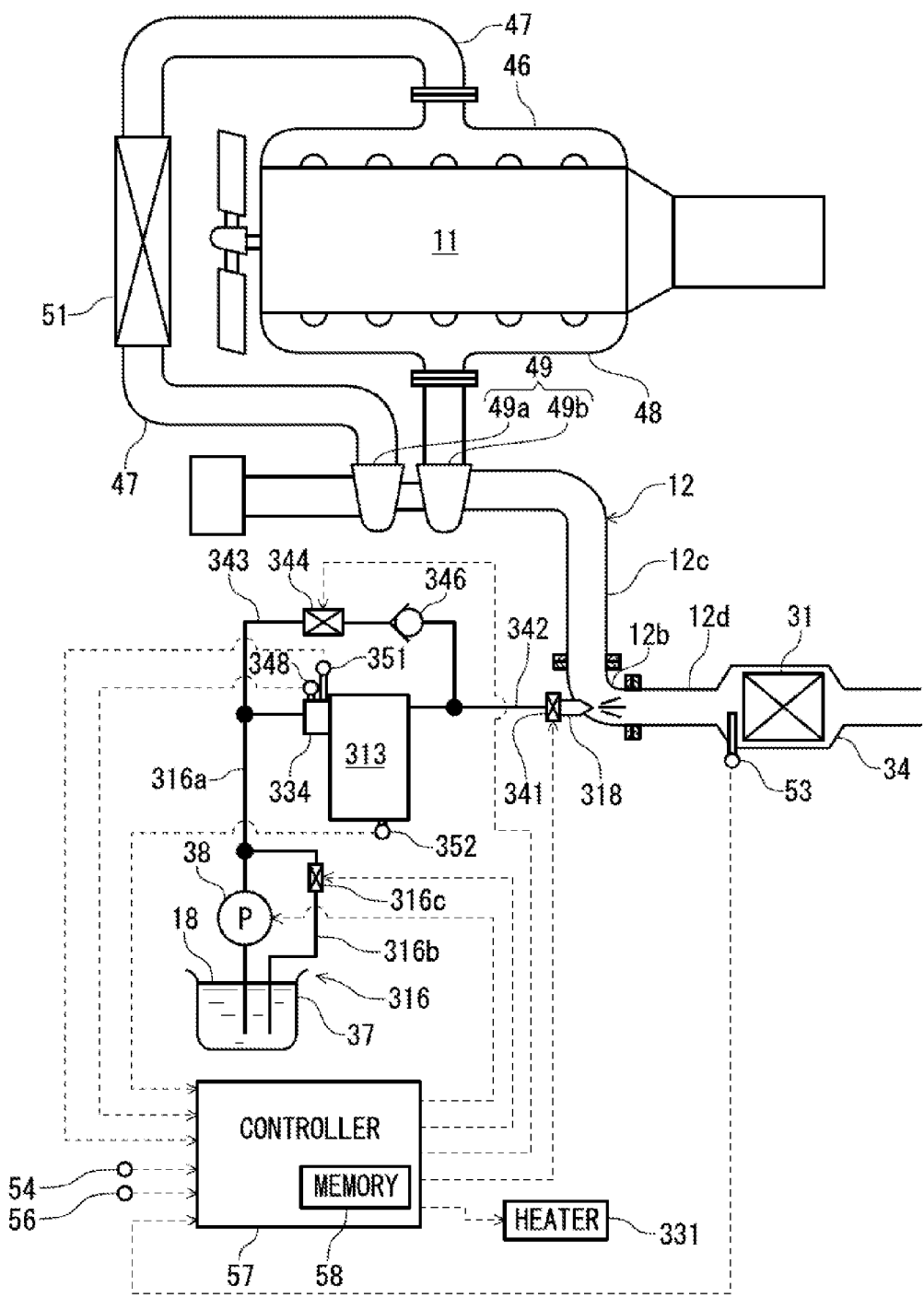
FIG. 19 is a configuration view of an exhaust gas purifier of a seventh embodiment of the present invention.

FIGS. 19 to 22 show a seventh embodiment of the present invention. In FIG. 19, the same reference signs as those in FIG. 3 indicate the same components. In this embodiment, the exhaust gas purifier includes the selective reduction catalyst 31 capable of reducing NOx in the exhaust gas discharged from the diesel engine 11 to N$_2$, a fuel reformer 313 that reforms the liquid fuel 18 into a hydrocarbon-based gas, a fuel supply device 316 that supplies the fuel 18 to the fuel reformer 313, and an injection nozzle 318 that extends into the exhaust pipe 12 on the exhaust gas upstream side of the selective reduction catalyst 31 and that can inject a hydrocarbon-based gas. Here, the fuel which is supplied to the fuel reformer 313 by the fuel supply device 316 is the same as the fuel supplied to the diesel engine 11. Also, the selective reduction catalyst 31 is configured in the same manner as the selective reduction catalyst of the first embodiment.

Figure 20:
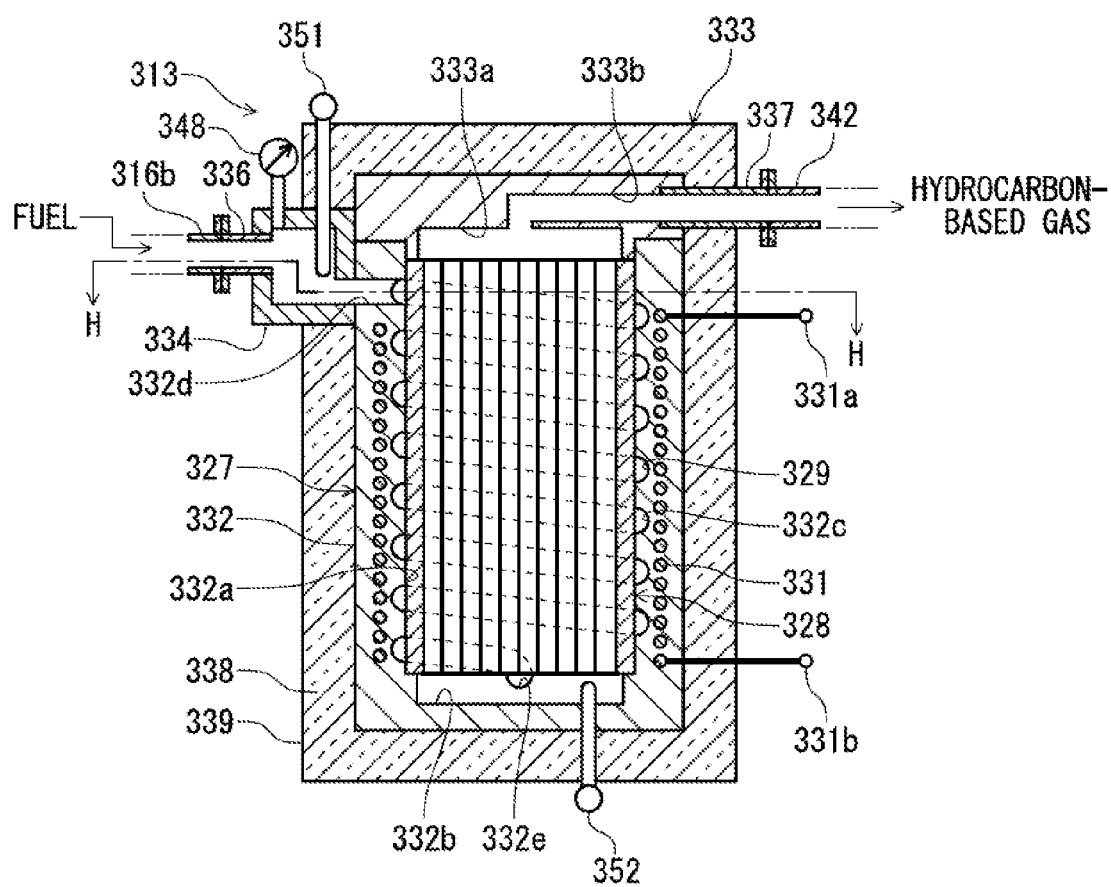
FIG. 20 is a longitudinal section view of a fuel reformer of the exhaust gas purifier.
Figure 21:
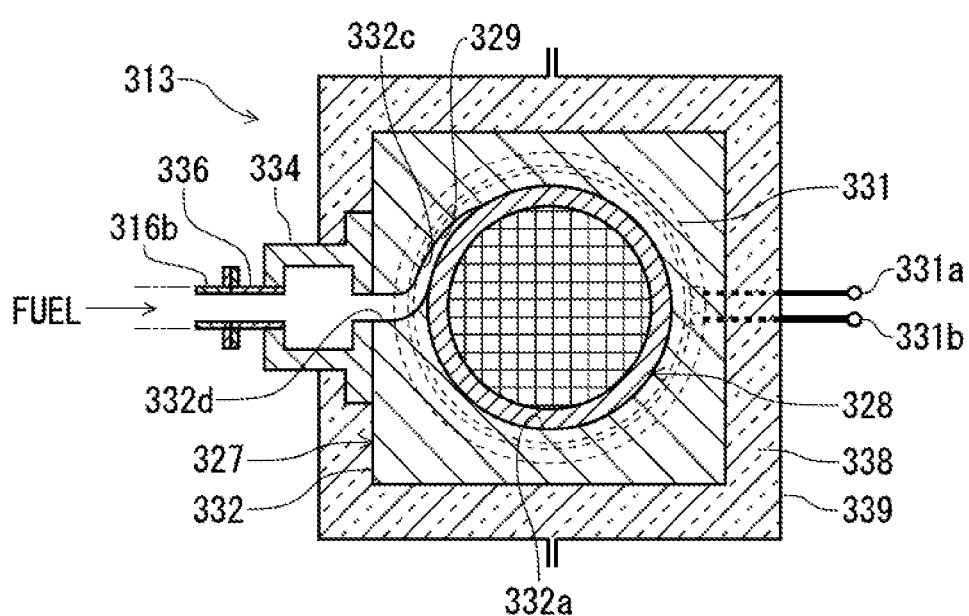
FIG. 21 is a section view taken along an H-H line in FIG. 20.

Meanwhile, as shown in FIGS. 20 and 21, the fuel reformer 313 is configured in the substantially same way as the fuel vaporizer of the third embodiment. Specifically, the fuel reformer 313 includes a hermetically sealed cylindrical reforming case 327; a reforming catalyst 328 that is housed in this reforming case 327, a fuel passageway 329 that is provided helically between an inner peripheral surface of the reforming case 327 and an outer peripheral surface of the reforming catalyst 328; and a heater 331 that is helically arranged so as to surround the fuel passageway 329 and that is embedded in a wall of the reforming case 327. The reforming case 327 includes a case main body 332 that has a rectangular cylindrical shape and that has an opening upper end and a closed lower end, a lid 333 that has a rectangular plate shape, that is detachably attached to the open end of the case main body 332, and that closes the open end of the case main body 332 in an openable manner, and a fuel storage part 334 that is attached to the upper outer peripheral surface of the case main body 332 and that temporarily stores the liquid fuel 18 (FIG. 19) which is to flow into the reforming case 327. A catalyst housing part 332a that houses the reforming catalyst 328 is formed inside the case main body 332, and a relatively shallow lower recessed part 332b having a diameter smaller than an inner diameter of the catalyst housing part 332a is formed on the bottom surface of this catalyst housing part 332a. Also, a recessed groove 332c that helically extends from the upper part of the reforming case 327 toward the lower portion of the reforming case 327 is formed in the inner peripheral surface of the reforming case 327. The above-described fuel passageway 329 is formed by the recessed groove 332c of the case main body 332 and the outer peripheral surface of the reforming catalyst 328 in a state where the reforming catalyst 328 is housed in the catalyst housing part 332a. An upper end of the above-described recessed groove 332c is connected to an inlet hole 332d formed in the upper outer peripheral surface of the case main body 332, and a lower end of the recessed groove 332c is connected to an outlet groove 332e that extends to the above-described lower recessed part 332b. Furthermore, the fuel storage part 334 is attached to the upper outer peripheral surface of the case main body 332 so that its inside is communicated with the inlet hole 332d, and a supply short pipe 336 that allows the liquid fuel 18 (FIG. 19) to pass through the fuel storage part 334 and the inlet hole 332d and to flow into the fuel passageway 329 is connected to the outer side face of the fuel storage part 334.

Meanwhile, the reforming catalyst 328 is a monolith catalyst and is configured by coating a cordierite honeycomb carrier with a zeolite or alumina. Examples of the zeolite include rhodium-zeolite, platinum-zeolite, palladium-zeolite, and the like. The reforming catalyst 328 including rhodium-zeolite, platinum-zeolite, or palladium-zeolite is configured by coating a honeycomb carrier with a slurry containing a zeolite powder having been ion-exchanged with rhodium, platinum, or palladium. Also, the reforming catalyst 328 including rhodium-alumina, platinum-alumina, or palladium-alumina is configured by coating a honeycomb carrier with a slurry containing a γ-alumina powder or θ-alumina powder which has rhodium, platinum or palladium supported thereon. When the vaporized or vaporized and misted fuel is supplied to this reforming catalyst 328, this vaporized or vaporized and misted fuel is decomposed into a hydrocarbon-based gas and reformed on the reforming catalyst 328. Also, a relatively shallow upper recessed part 333a having a diameter smaller than the inner diameter of the catalyst housing part 332a is formed in the lower surface of the lid 333, and an outlet hole 333b communicated with the upper recessed part 333a is formed in the side face of the lid 333. A discharge short pipe 337 that discharges the hydrocarbon-based gas reformed with the reforming catalyst 328 is connected to this outlet hole 333b.

The above-described reforming case 327 is formed of a metal having a relatively high heat conductivity that is in a range of from 15 to 17 W/(m·K), such as SUS316, SUS304, or Inconel (registered trademark, manufactured by Huntington Alloys Canada Limited). Also, as for the heater 331, it is preferable to use a so-called sheathed heater which is configured by loosely inserting a heating element such as a nichrome wire into a metal sheath (metal ultrafine pipe) and filling a powder of a high-purity inorganic insulating material in a space between the metal sheath and the heating element. Furthermore, the case main body 332 and the lid 333 of the reforming case 327 are covered by a heat insulation case 339 filled with a heat insulating material 338. According to this, dissipation of the heat generated by the heater 331 can be suppressed. It is noted that in FIGS. 20 and 21, reference signs 331a and 331b indicate terminals of the heater 331.

As shown in FIGS. 19 and 20, the fuel supply device 316 includes the fuel tank 37 which stores the liquid fuel 18, a first supply pipe 316a that connects this fuel tank 37 to the supply short pipe 336 of the above-described fuel reformer 313, the fuel supply pump 38 which is provided in the first supply pipe 316a and which forcedly supplies the fuel 18 in the fuel tank 37 to the fuel reformer 313, a return pipe 316b having one end connected to the first supply pipe 316a between the fuel supply pump 38 and the supply short pipe 336 and the other end connected to the fuel tank 37, and a pump flow rate regulation valve 316c that is provided in this return pipe 316b. The above-described fuel supply pump 38 is driven by a motor not shown. The configuration is made so that by not only changing the rotational speed of this fuel supply pump 316c continuously or stepwise but also regulating the opening degree of the pump flow rate regulation valve 316c, the pressure of the fuel 18 discharged by the fuel supply pump 38 can be regulated. Also, the discharge short pipe 337 of the fuel reformer 313 is connected to the injection nozzle 318 via a second supply pipe 342, and a flow rate regulation valve 341 that regulates the flow rate of the hydrocarbon-based gas, which is injected from the injection nozzle 318, by opening or closing this second supply pipe 342 is provided in the second supply pipe 342. This flow rate regulation valve 341 can regulate the flow rate of the hydrocarbon-based gas injected from injection nozzle 318 by controlling the number of times of opening and closing per unit time, the opening time period, and the closing time period. Furthermore, an inlet part and an outlet part of the fuel reformer 313 are communicated with and connected to each other by a bypass pipe 343 so as to bypass the fuel reformer 313, and an opening degree regulation valve 344 that regulates the flow rate of the fuel flowing through the bypass pipe 343 by regulating the opening degree of the bypass pipe 343 is provided in this bypass pipe 343. Specifically, one end of the bypass pipe 343 is connected to the first supply pipe 316a, and the other end of the bypass pipe 343 is connected to the second supply pipe 342. It is noted that a reference sign 346 in FIG. 19 indicates a check valve. This check valve 346 has a function to allow the fuel to flow from the first supply pipe 316a into the second supply pipe 342 and to prohibit the fuel or the hydrocarbon-based gas from flowing from the second supply pipe 342 into the first supply pipe 316a.

Figure 22:
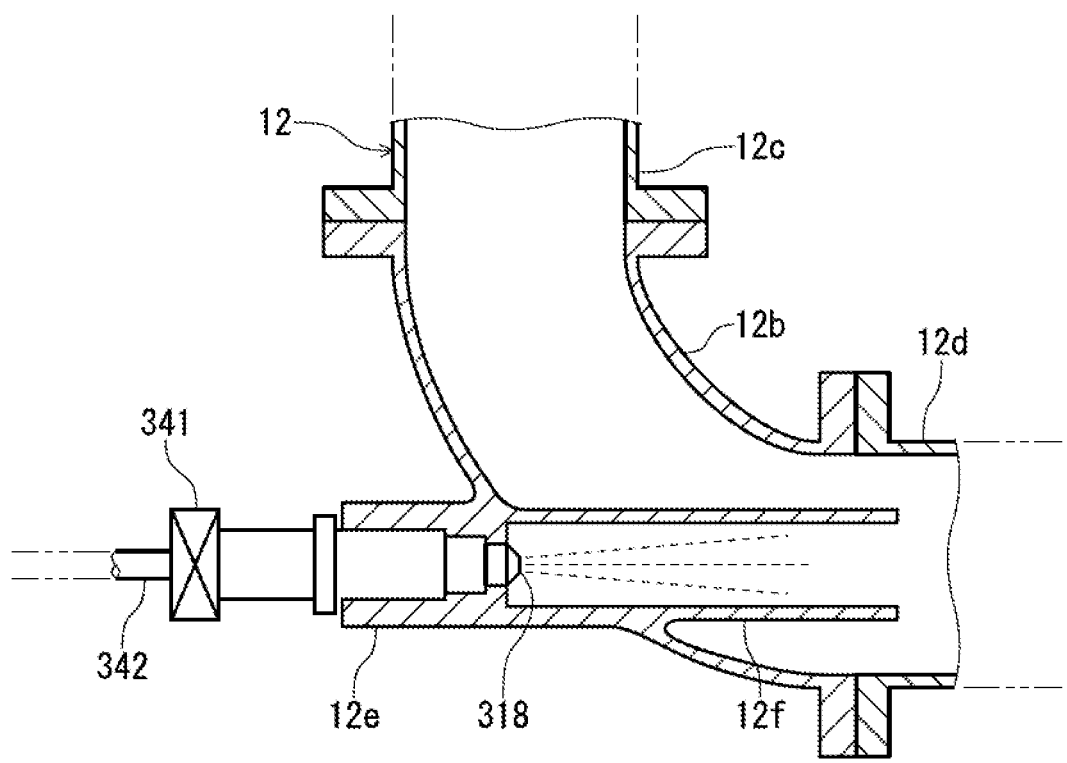
FIG. 22 is an enlarged main part section view including an injection nozzle of the exhaust gas purifier.

As shown in detail in FIG. 22, the injection nozzle 318 is inserted into a curved pipe part 12b that is curved at approximately 90 degrees in the exhaust pipe 12. Specifically, the exhaust pipe 12 includes the above-described curved pipe part 12b, an upstream side straight pipe part 12c that is detachably attached to an exhaust gas inlet of this curved pipe part 12b and that extends straight, and a downstream side straight pipe part 12d that is detachably attached to in an exhaust gas outlet of the curved pipe part 12b and that extends straight. In the curved pipe part 12b, a cylindrical nozzle attachment part 12e is provided integrally with the curved pipe part 12b so that it protrudes from the outer surface of the curved pipe part 12b. A direction of the nozzle attachment part 12e is set so that when the injection nozzle 318 is attached to this nozzle attachment part 12e, a center line of an injection port of the injection nozzle 318 coincides with a hole center of the downstream side straight pipe part 12d, that is, the hydrocarbon-based gas or the liquid fuel injected by the injection nozzle 318 is directed toward a center in the downstream side straight pipe part 12d. Also, a guide pipe 12f extends toward the downstream side straight pipe part 12d concentrically with the nozzle attachment part 12e is provided in the curved pipe part 12b integrally with the curved pipe part 12b. A length and an inner diameter of this guide pipe 12f are set so that contact of the hydrocarbon-based gas or the liquid fuel injected from the injection nozzle 318 with an inner wall of the guide pipe 12f is lessened, whereby the hydrocarbon-based gas or the liquid fuel can be effectively mixed with the exhaust gas.

Meanwhile, the exhaust gas temperature sensor 53, which detects the exhaust gas temperature related to the selective reduction catalyst 31, is provided in the case 34 on the exhaust gas inlet side of the selective reduction catalyst 31 (FIG. 19). Also, in the fuel storage part 334 of the fuel reformer 313, a pressure sensor 348 and a first temperature sensor 351 that detect an inlet pressure and an inlet temperature of the fuel reformer 313, that is, a pressure and a temperature of the fuel immediately before it flows into the fuel passageway 329, respectively is provided (FIG. 20). Also, in the lower recessed part 332b of the reformer case 327 of the fuel reformer 313, a second temperature sensor 352 that detects a temperature of the fuel discharged from the fuel passageway 329, that is, a temperature of the vaporized or vaporized and misted fuel which is heating by the heater 331 is provided. Furthermore, the engine 11 is provided with the rotation sensor 54, which detects the rotational speed of the engine 11, and the load sensor 56, which detects the load of the engine 11 (FIG. 19). Each of detection outputs of the exhaust temperature sensor 53, the pressure sensor 348, the first temperature sensor 351, the second temperature sensor 352, the rotation sensor 54, and the load sensor 56 is connected to the control input of the controller 57, and the control outputs of the controller 57 are connected to the heater 331, the fuel supply pump 38, the pump flow rate regulation valve 316c, the flow rate regulation valve 341, and the opening degree regulation valve 344, respectively.

The memory 58 is provided in the controller 57. The memory 58 stores, in advance, the rotational speed of the fuel supply pump, the opening degree of the pump flow rate regulation valve 316c, the number of times the flow rate regulation valve 341 opens and closes per unit time, the opening time period of the flow rate regulation valve 341 per unit time, and the closing time period of the flow rate regulation valve 341 per unit time, according to the engine rotational speed, the engine load, and the exhaust gas temperature on the inlet side of the selective catalyst type catalyst 31. Also, the memory 58 stores, as a map, a change of the flow rate of NOx in the exhaust gas according to the engine rotational speed and the engine load. Furthermore, the memory 58 stores, as a map, a change of the generation rate of the hydrocarbon-based gas according to the inlet pressure of the fuel reformer 313, the temperature in the fuel passageway 329, and the flow rate of the hydrocarbon-based gas discharged from the reforming catalyst 328. When a partial pressure of the fuel which has been heated and vaporized by the heater 331 is higher, the reformation reaction of the fuel with the reforming catalyst 328 can be more promoted, and therefore, the inlet pressure of the fuel reformer 313 is set to be relatively high as in a range of from 30 to 100 kPa. For that reason, the reforming case 327 is manufactured so as to have pressure resistance. It should be noted that the heating efficiency of the fuel by the heater 331 can be detected based on a temperature difference between the detection outputs of the first and second temperature sensors 351 and 352.

An operation of the exhaust gas purifier having the thus configured fuel reformer 313 will be described. Immediately after start of the engine 11, or when the engine 11 operates under light load, the exhaust gas temperature is low and in a range of from 100 to 180° C. If the exhaust gas temperature sensor 53 detects the exhaust gas temperature that is in this temperature range and the rotation sensor 54 and the load sensor 56 detect that the engine 11 operates under no load or light load, the controller 57 turns on the heater 331 on the basis of each of the detection outputs of the exhaust gas temperature sensor 53, the rotation sensor 54, and the load sensor 56 and also gradually increases the rotational speed of the fuel supply pump. It is noted that the controller 57 controls the opening degree regulation valve 344 to keep it the bypass pipe 343 being in a closed state. Then, if the pressure sensor 348 detects that the inlet pressure of the fuel reformer 313 has reached a predetermined pressure (for example, 30 kPa), the fuel supply pump is caused to rotate at the rotational speed at that time, and also, the opening degree of the pump flow rate regulation valve 316c is regulated, whereby the inlet pressure of the fuel reformer 313 is kept at the above-described predetermined pressure. In this state, if the first and second sensors 351 and 352 detect that the temperature of the fuel in the fuel passageway 329 has reached a predetermined temperature, the controller 57 opens and closes the flow rate regulation valve 341 at a predetermined number of times of opening and closing per unit time, a predetermined opening time period, and a predetermined closing time period.

According to this, the liquid fuel which has flown into the fuel passageway 329 is heated by the heater 331 and is rapidly vaporized or misted, and this vaporized or misted fuel is decomposed with the reforming catalyst 328 and reformed into a hydrocarbon-based gas such as a gaseous HC and a lightened HC (for example, a partially oxidized hydrocarbon, a cracked hydrocarbon, etc.), carbon monoxide, and hydrogen. Specifically, the liquid fuel 18 is heated by the heater 331 and vaporized or misted in the fuel passageway 329 of the hermetically sealed reforming case 327, and therefore, the pressure in the reforming case 327 becomes high, and the vaporized or misted fuel in this high pressure state is reformed with the reforming catalyst 328 into the hydrocarbon-based gas. That is, the liquid fuel 18 is heated by the heater 331 and vaporized or misted during a course of passing through the fuel passageway 329, and therefore, the volume of the fuel in the reforming case 327 expands, and the vaporized or misted fuel in a state where a partial pressure thereof becomes high flows into the reforming catalyst 328 and comes into contact with its surface. As a result, the reformation reaction of the vaporized or misted fuel with the reforming catalyst 328 can be promoted, and therefore, the liquid fuel 18 can be surely reformed into the hydrocarbon-based gas in the fuel reformer 313.

The hydrocarbon-based gas injected from the injection nozzle 318 into the exhaust pipe 12 flows into the selective type catalyst 31 together with the exhaust gas. This hydrocarbon-based gas, which has flown into the selective type catalyst 31 together with the exhaust gas, functions as the reducing agent which reduces NOx (NO and $NO_2$) in the exhaust gas. That is, NOx in the exhaust gas is rapidly reduced with the selective reduction catalyst 31 to $N_2$. As a result, even if the exhaust gas temperature is relatively low, NOx in the exhaust gas can be efficiently decreased.

Meanwhile, if the exhaust gas temperature exceeds 180° C., the controller 57 turns off the heater 331 and also controls the opening degree regulation valve 344 to open the bypass pipe 343 at a predetermined opening degree, on the basis of the detection output of the exhaust gas temperature sensor 53. It is noted that the controller 57 causes the fuel supply pump 38 to rotate at a predetermined rotational speed, opens or closes the flow rate regulation valve 341 at a predetermined number of times of opening and closing (per unit time), a predetermined opening time period, and a predetermined closing time period, and also regulates the opening degree of the pump flow rate regulation valve 316c, to thereby keep the inlet pressure of the fuel reformer 313 at the above-described predetermined pressure. According to this, the liquid fuel 18 passes through the bypass pipe 343 without passing through the fuel reformer 313 and the liquid fuel 18 is injected as it is from the injection nozzle 318 into the exhaust pipe 12. This injected liquid fuel 18 is reformed with the exhaust gas having the relatively high temperature into the hydrocarbon-based gas, and therefore, this hydrocarbon-based gas functions as the reducing agent which reduces NOx in the exhaust gas to $N_2$ on the selective reduction catalyst 31, and NOx in the exhaust gas is efficiently decreased.

It should be noted that although the exhaust gas purifier of the present invention is applied to the diesel engine in the above-described first to seventh embodiments, the exhaust gas purifier of the present invention may also be applied to a gasoline engine. Also, although the exhaust gas purifier of the present invention is applied to the turbo supercharger-equipped diesel engine in the above-described first to seventh embodiments, the exhaust gas purifier of the present invention may also be applied to a natural aspiration type diesel engine or a natural aspiration type gasoline engine. Also, although the fuel pressure is regulated by the fuel pressure regulation valve, which is the three-way valve, in the above-described first to sixth embodiments, the fuel pressure may also be regulated by means of regulation of an opening and closing time period of the fuel on-off valve and the presence or absence of driving of the fuel supply pump. Also, although the reforming part is configured by the reforming catalyst in the above-described fourth embodiment, the reforming part may also be configured by a glow plug or the reforming part may be configured by a glow plug and a reforming catalyst. Also, although the fuel passageway is formed by forming the helically recessed groove on the inner peripheral surface of the case main body of the reforming case and housing the reforming catalyst in the catalyst housing part of the case main body in the above-described seventh embodiment, the fuel passageway may also be formed by forming the recessed groove on the outer peripheral surface of the reforming catalyst and housing the reforming catalyst in the catalyst housing part of the case main body. Furthermore, although the catalyst temperature sensor is provided on the exhaust gas inlet side of the selective reduction catalyst in the catalyst case in the above-described seventh embodiment, so long as the temperature related to the selective reduction catalyst can be detected, the catalyst temperature sensor may be provided on the exhaust gas outlet side of the selective reduction catalyst in the catalyst case or the catalyst temperature sensor may be provided on both the exhaust gas inlet side and the exhaust gas outlet side of the selective reduction catalyst in the catalyst case.

EXAMPLES

Next, examples of the present invention will be described in detail along with comparative examples.

Example 1

As shown in FIG. 3, the selective reduction catalyst 31 was provided in the exhaust pipe 12 of the straight six turbo supercharger-equipped diesel engine 11 having 8,000 cc displacement. This selective reduction catalyst 31 was a copper-based catalyst manufactured by coating a honeycomb carrier with a slurry containing a zeolite powder having been ion-exchanged with copper. Also, the fuel reformer 13, which decomposes the fuel 18 to reform it into the reducing gas 21, was connected to the exhaust pipe 12 on the exhaust gas upstream side of the selective reduction catalyst 31, and the reducing gas supply nozzle 23 of the fuel reformer 13 was inserted into the exhaust pipe 12. As shown in FIGS. 1 and 2, this fuel reformer 13 has the carrier gas injection nozzle 17 which injects the carrier gas (air) supplied from the carrier gas tank 14 (air tank), the fuel supply nozzle 19 which supplies the fuel 18 to the tip end of the carrier gas injection nozzle 17 so that the fuel 18 is atomized with the carrier gas injected from the carrier gas injection nozzle 17, the reforming part 22 which decomposes this atomized fuel 18 and reforming it into the reducing gas 21, and the above-described reducing gas supply nozzle 23 which supplies the reducing gas 21 discharged from the outlet of the reforming part 22 to the exhaust pipe 12 of the engine 11. The reforming part 22 included the glow plug 22a. This exhaust gas purifier was an example 1.

Example 2

The configuration was made the same as that of the exhaust gas purifier having the fuel reformer of the example 1, except that as shown in FIG. 4, the reforming part 72 includes the glow plug 22a, and the reforming catalyst 72b which is provided between this glow plug 22a and the reducing gas supply nozzle 23 and at the predetermined distance from the glow plug 22a. This exhaust gas purifier was an example 2.

Example 3

As shown in FIGS. 8 to 11, the fuel reformer 113 had the carrier gas heating part 116 which heats the carrier gas (air) supplied from the carrier gas tank 14 (air tank), the carrier gas injection nozzle 17 which injects the carrier gas heated by the carrier gas heating part 116, the fuel supply nozzle 19 which supplies the fuel 18 to the tip end of the carrier gas injection nozzle 17 so that the fuel 18 is atomized with the carrier gas injected from the carrier gas injection nozzle 17, the reforming part 122 which decomposes this atomized fuel 18 and reforms it into the reducing gas 21, and the above-described reducing gas supply nozzle 23 which supplies the reducing gas 21 discharged from the outlet of the reforming part 122 to the exhaust pipe 12 of the engine 11. The reforming part 122 was configured by the reforming catalyst 122a manufactured by coating a honeycomb carrier with a slurry containing a rhodium (Rh) powder. Except what is described above, the configuration was made the same as that of the exhaust gas purifier having the fuel reformer of the first embodiment. This exhaust gas purifier was an example 3.

<Comparison Test 1 and Evaluation>

Amounts of hydrogen and acetaldehyde generated by each of the fuel reformers of the examples 1 to 3 were measured. The generation amounts of hydrogen and acetaldehyde were shown in terms of a ratio to the amount of the supplied fuel. Results are shown in FIGS. 23 and 24.

Figure 23:
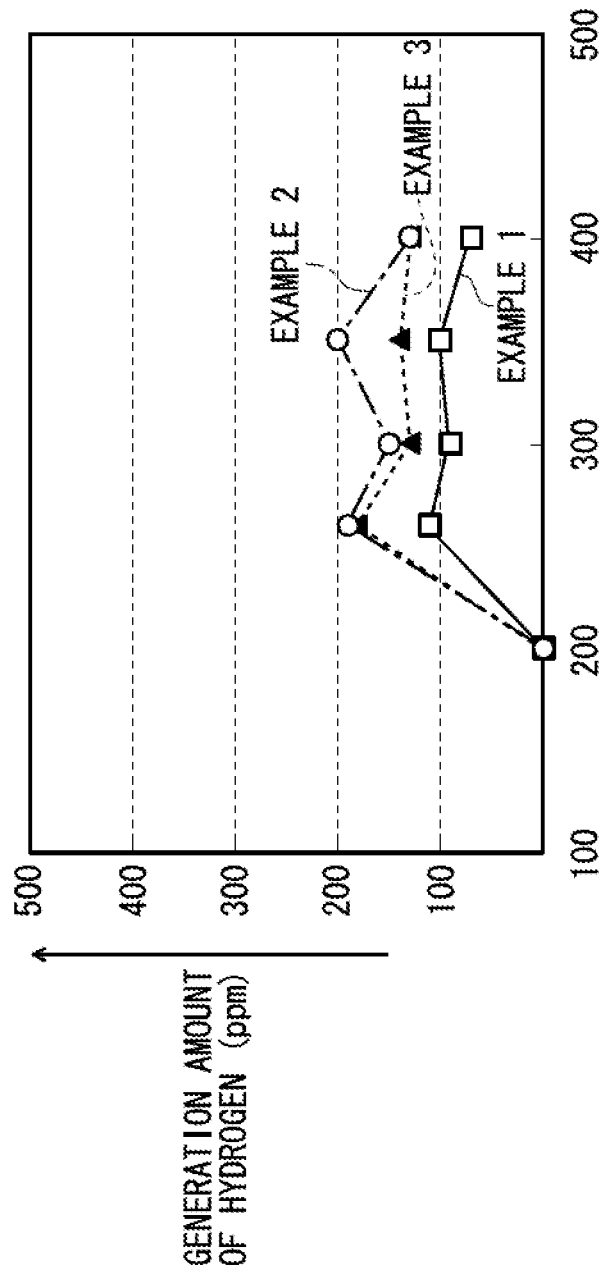
FIG. 23 is a graph showing a change of a generation amount of hydrogen with a change of an exhaust gas temperature when each of fuel reformers of examples 1 to 3 is used.
Figure 24:
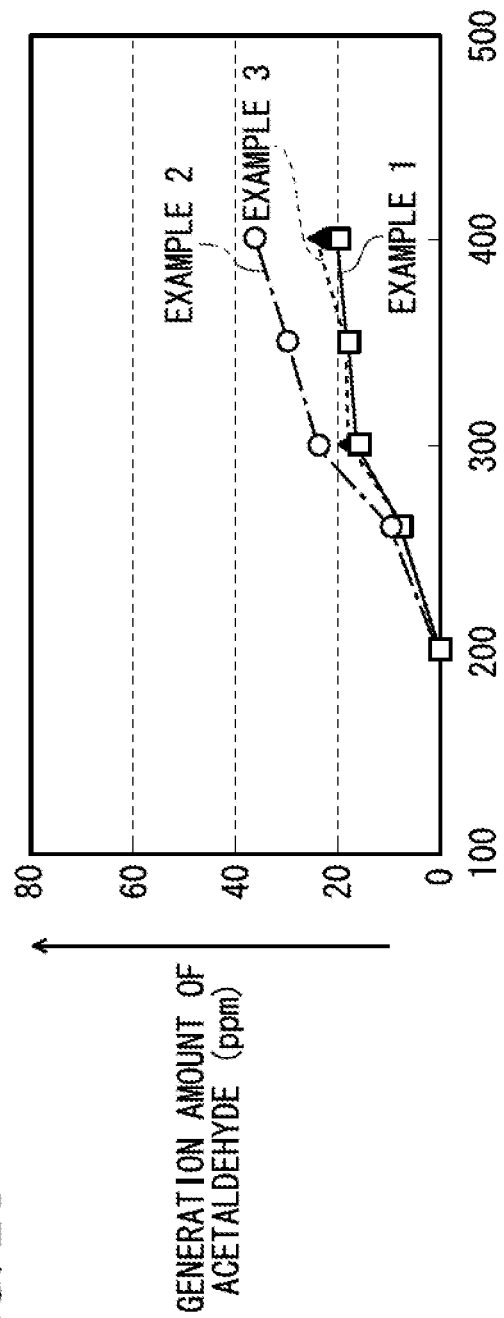
FIG. 24 is a graph showing a change of a generation amount of acetaldehyde with the change of the exhaust gas temperature when each of the fuel reformers of the examples 1 to 3 is used.

As can be seen from FIG. 23, in the example 1, the maximum generation amount of hydrogen was about 110 ppm, whereas in the example 3, the maximum generation amount of hydrogen was increased to about 180 ppm, and in the example 2, the maximum generation amount of hydrogen was more increased to about 190 ppm. Also, as can be seen from FIG. 24, in the example 1, the maximum generation amount of acetaldehyde was about 20 ppm, whereas in the example 3, the maximum generation amount of acetaldehyde was increased to about 22 ppm, and in the example 2, the maximum generation amount of acetaldehyde was more increased to about 37 ppm.

<Comparison Test 2 and Evaluation>

A NOx decrease rate was measured while the temperature of the exhaust gas discharged from each of the exhaust pipes of engine of the examples 1 to 3 was gradually increased from 100° C. to 400° C. by varying a rotational speed and a load of the engine. Results are shown in FIG. 25.

Figure 25:
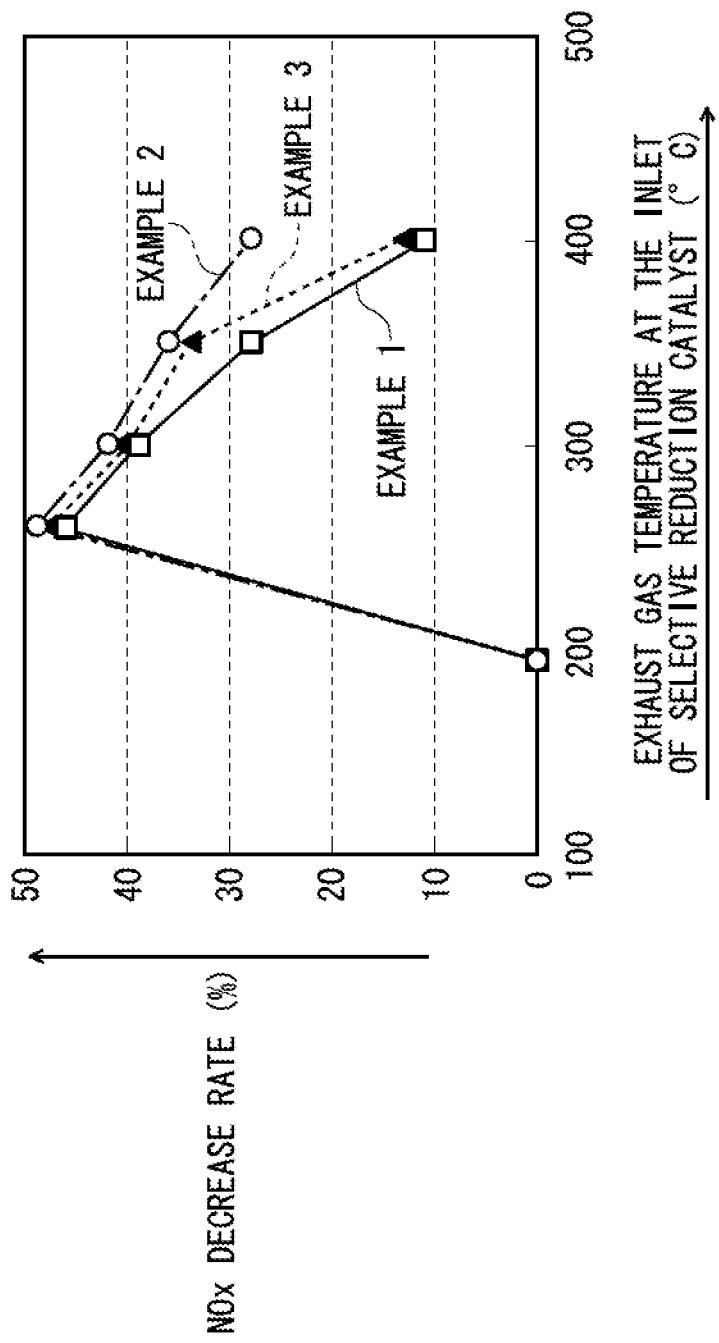
FIG. 25 is a graph showing a change of a NOx decrease rate with the change of the exhaust gas temperature when each of the exhaust gas purifiers of the examples 1 to 3 is used.

As can be seen from FIG. 25, in the examples 1 to 3, when the exhaust gas temperature was about 250° C., the NOx decrease rate was at maximum, and the NOx decrease rates were from about 46 to 49% and substantially equal to each other. Meanwhile, in the example 1, when the exhaust temperature was increased to about 400° C., the NOx decrease rate was lowered to about 11%, whereas in the example 3, even when the exhaust gas temperature was increased to about 400° C., the NOx decrease rate was lowered only to about 13%, and in the example 2, even when the exhaust gas temperature was increased to about 400° C., the NOx decrease rate was lowered only to about 20%.

Example 4

As shown in FIG. 12, the bypass pipe 154 which bypasses the reforming catalyst 122a of the reforming part 122 was provided in the reformer housing 124, and the circulation pump 156 which returns the reducing gas discharged from the reforming catalyst 122a and the atomized fuel 18 to just before the carrier gas injection nozzle 17 was provided in this bypass pipe 154. Except for what is described above, the configuration was made the same as that of the exhaust gas purifier having the fuel reformer of the example 3. This exhaust gas purifier was Example 4.

<Comparison Test 3 and Evaluation>

Amounts of hydrogen and acetaldehyde generated by each of the fuel reformers of the examples 3 and 4 were measured. The generation amounts of hydrogen and acetaldehyde were shown in terms of a ratio to the amount of the supplied fuel. Results are shown in FIGS. 26 and 27.

Figure 26:
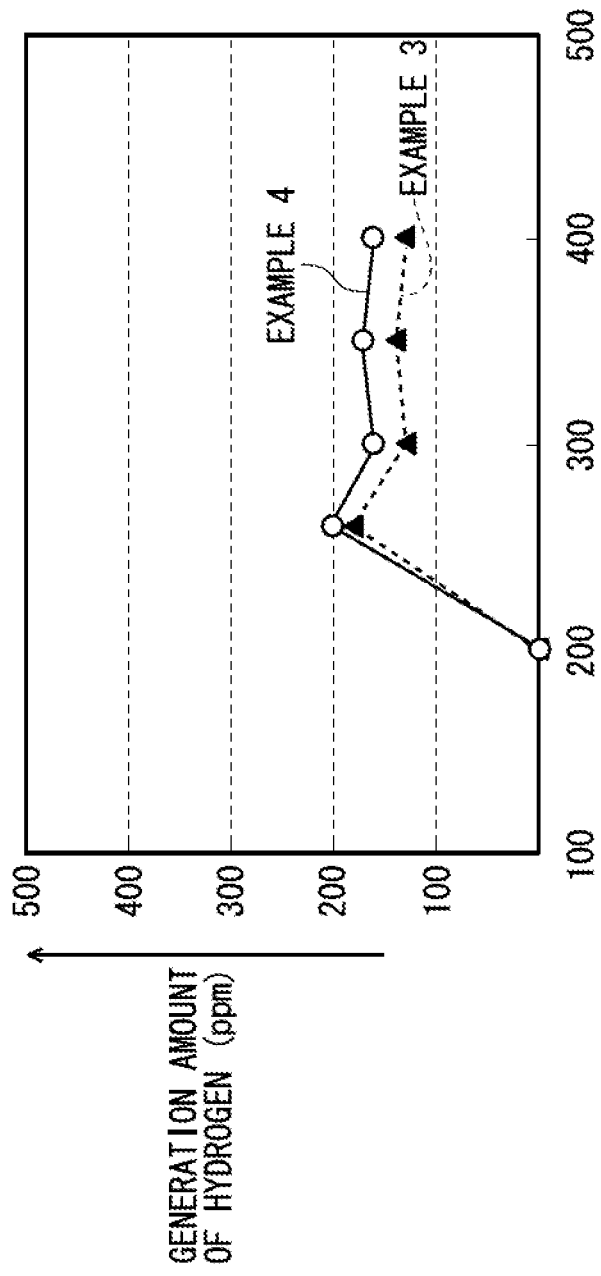
FIG. 26 is a graph showing a change of a generation rate of hydrogen with a change of an exhaust gas temperature when each of fuel reformers of examples 3 and 4 is used.
Figure 27:
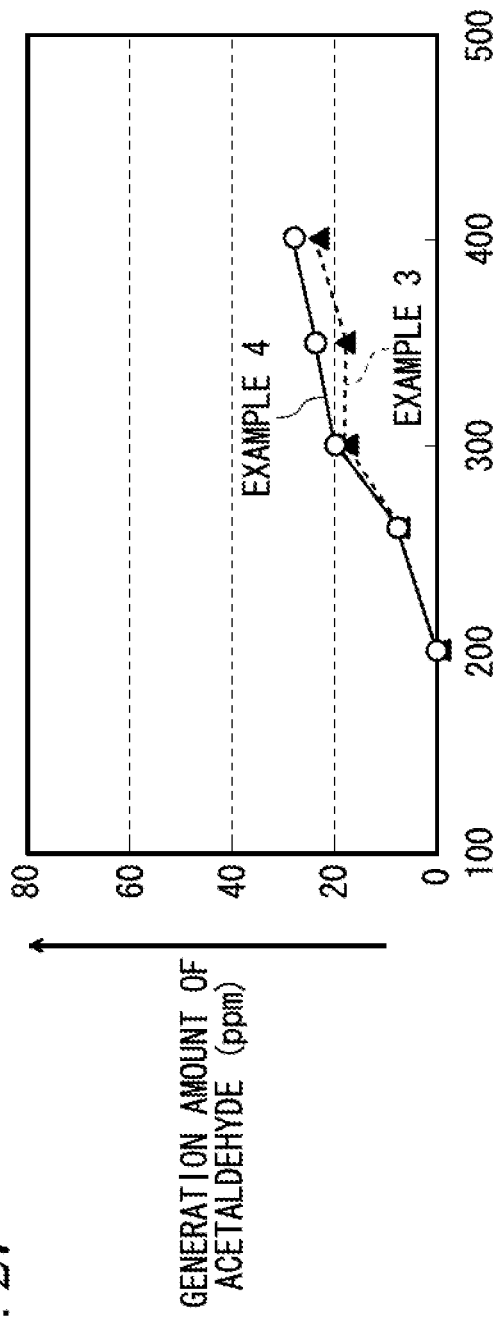
FIG. 27 is a graph showing a change of a generation rate of acetaldehyde with the change of the exhaust gas temperature when each of fuel reformers of the examples 3 and 4 is used.

As can be seen from FIG. 26, in the example 3, the maximum generation amount of hydrogen was about 180 ppm, whereas in the example 4, the maximum generation amount of hydrogen increased to about 200 ppm. Also, as can be seen from FIG. 27, in the example 3, the maximum generation amount of acetaldehyde was about 22 ppm, whereas in the example 4, the maximum generation amount of acetaldehyde increased to about 24 ppm.

<Comparison Test 4 and Evaluation>

A NOx decrease rate was measured while the temperature of the exhaust gas discharged from each of the exhaust pipes of the engine of the examples 3 and 4 was gradually increased from 100° C. to 400° C. by varying the rotational speed and the load of the engine. Results are shown in FIG. 28.

Figure 28:
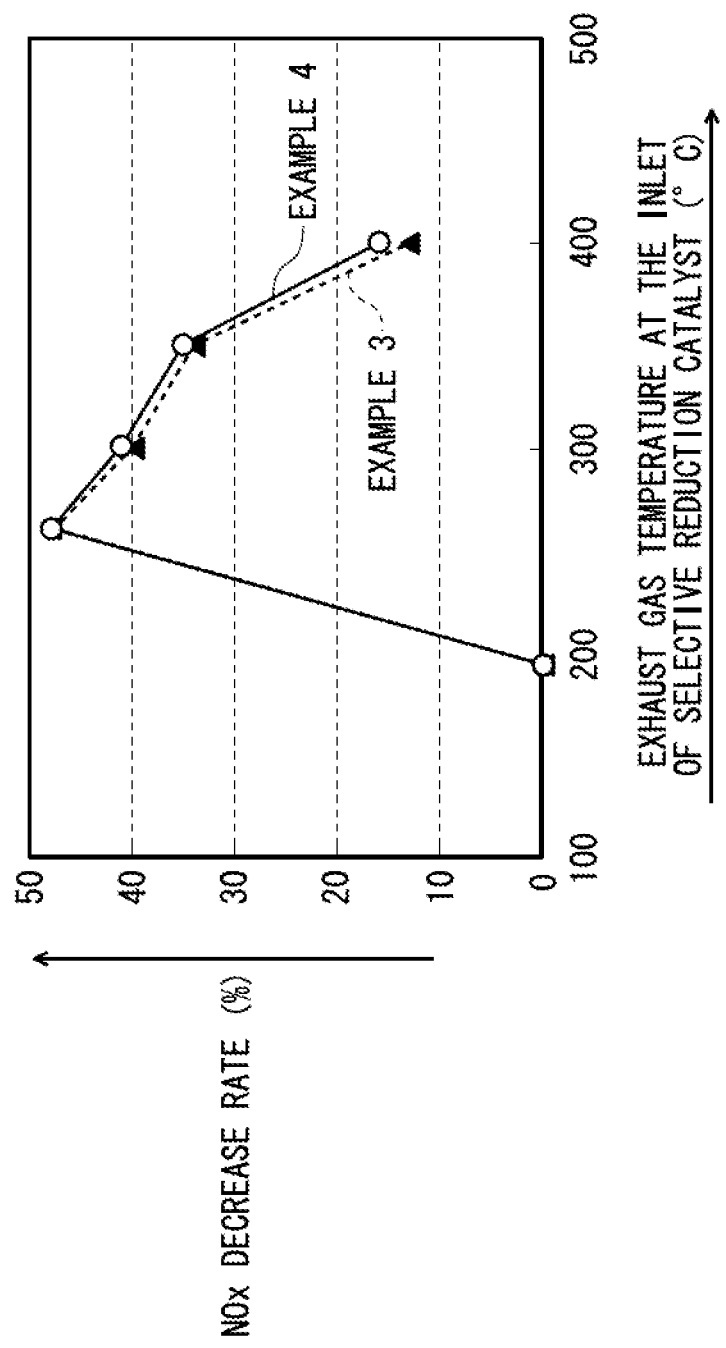
FIG. 28 is a graph showing a change of a NOx decrease rate with the change of the exhaust gas temperature when each of the exhaust gas purifiers of the examples 3 and 4 is used.

As can be seen from FIG. 28, in the examples 3 and 4, when the exhaust gas temperature was about 250° C., the NOx decrease rate was at maximum, and the NOx decrease rates were about 48% and substantially equal to each other. Meanwhile, in the example 3, when the exhaust temperature was increased to about 400° C., the NOx decrease rate was lowered to about 13%, whereas in the example 4, even when the exhaust gas temperature was increased to about 400° C., the NOx decrease rate was lowered only to about 16%.

Example 5

Figure 16:
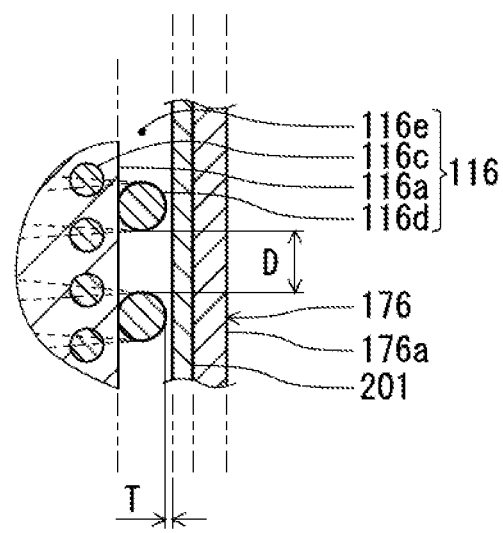
FIG. 16 is an enlarged section view of an F part in FIG. 15.

As shown in FIGS. 15 to 17, the fuel reformer 173 includes the carrier gas heating part 116 which heats the first carrier gas (air) supplied from the carrier gas tank 14 (air tank), the first carrier gas injection nozzle 181 which injects the first carrier gas heated by the carrier gas heating part 116, the first fuel supply nozzle 191 which supplies the fuel 18 to a tip end of the first carrier gas injection nozzle 181 so that the fuel 18 is atomized with the first carrier gas injected from the first carrier gas injection nozzle 181, the exothermic catalyst part 174 which oxidizes the above-described atomized fuel 18 and further heats the first carrier gas to increase the temperature, the second carrier gas injection nozzle 182 which injects the mixed carrier gas obtained by mixing the second carrier gas (air) supplied from the carrier gas tank 14 with the first carrier gas heated by the exothermic catalyst part 174, the second fuel supply nozzle 192 which supplies the fuel 18 to a tip end of the second carrier gas injection nozzle 182 so that the fuel 18 is atomized with the mixed carrier gas injected from the second carrier gas injection nozzle 182, the reforming part 122 which decomposes this atomized fuel 18 to reform it into the reducing gas 21, and the above-described reducing gas supply nozzle 23 which supplies the reduced gas 21 discharged from the outlet of the reforming part 122 to the exhaust pipe 12 of the engine 11. The exothermic catalyst part 174 was a catalyst manufactured by coating a honeycomb carrier with a slurry containing a platinum (Pt) powder. Also, the reforming part 122 was configured by the reforming catalyst 122a manufactured by coating a honeycomb carrier with a slurry containing a rhodium (Rh) powder. Except what is described above, the configuration was made the same as that of the exhaust gas purifier having the fuel reformer of the example 3. This exhaust gas purifier was an example 5.

<Comparison Test 5 and Evaluation>

Amounts of hydrogen and acetaldehyde generated by each of the fuel reformers of the examples 3 and 5 were measured. The generation amounts of hydrogen and acetaldehyde were shown in terms of a ratio to the amount of the supplied fuel. Results are shown in FIGS. 29 and 30.

Figure 29:
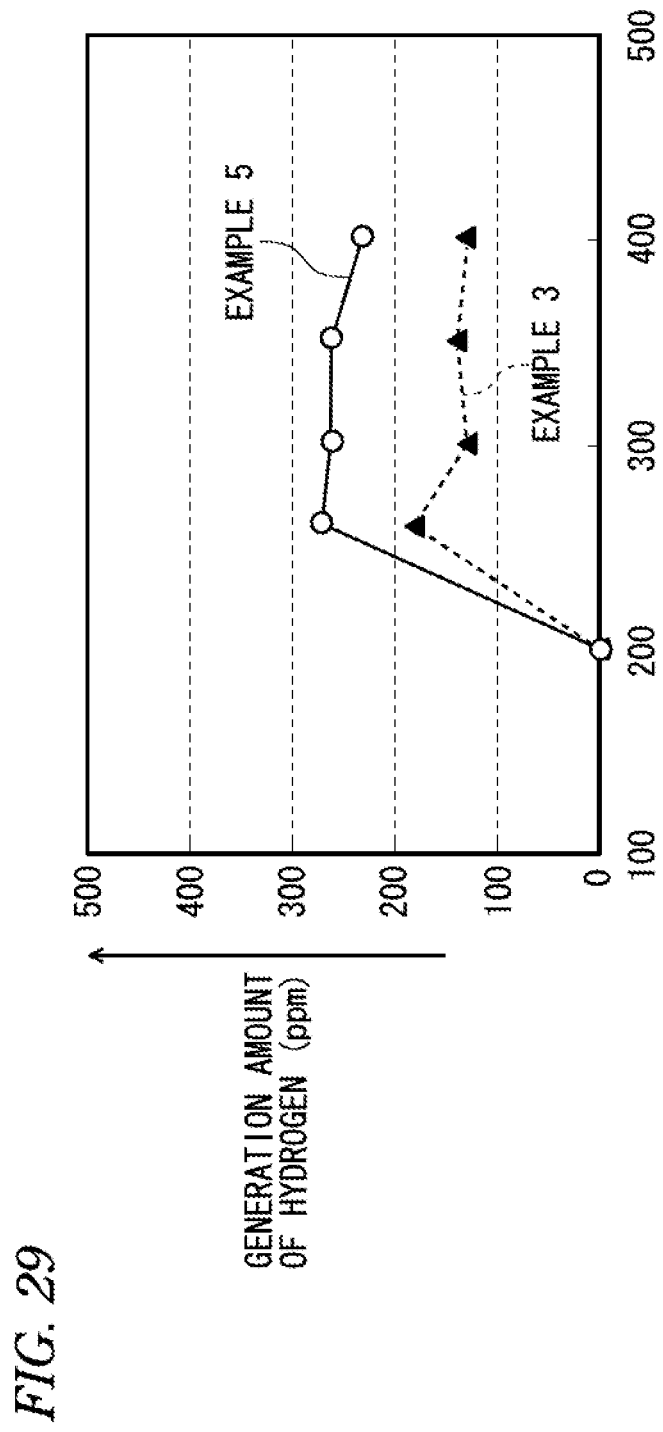
FIG. 29 is a graph showing a change of generation rate of hydrogen with the change of the exhaust gas temperature when each of fuel reformers of the examples 3 and 5 is used.
Figure 30:
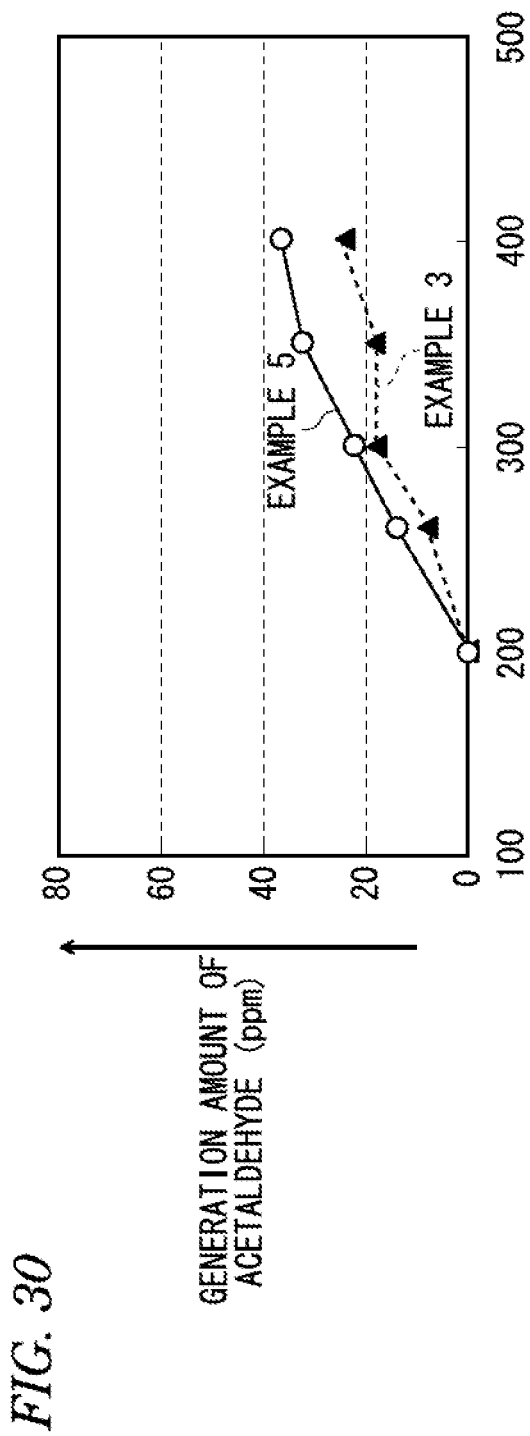
FIG. 30 is a graph showing a change of generation rate of acetaldehyde following the change of the exhaust gas temperature when each of the fuel reformers of the examples 3 and 5.

As can be seen from FIG. 29, in the example 3, the maximum generation amount of hydrogen was about 180 ppm, whereas in the example 5, the maximum generation amount of hydrogen increased to about 270 ppm. Also, as can be seen from FIG. 30, in the example 3, the maximum generation amount of acetaldehyde was about 22 ppm, whereas in the example 5, the maximum generation amount of acetaldehyde increased to about 37 ppm.

Comparative Example 1

The configuration was made the same as that of the example 3, except that the fuel reformer was not provided. This exhaust gas purifier was a comparative example 1.

<Comparison Test 6 and Evaluation>

A NOx decrease rate was measured while the temperature of the exhaust gas discharged from each of the exhaust pipes of engine of Examples 3 and 5 and Comparative Example 1 was gradually increased from 200° C. to 400° C. by varying a rotational speed and a load of the engine. Results are shown in FIG. 31.

Figure 31:
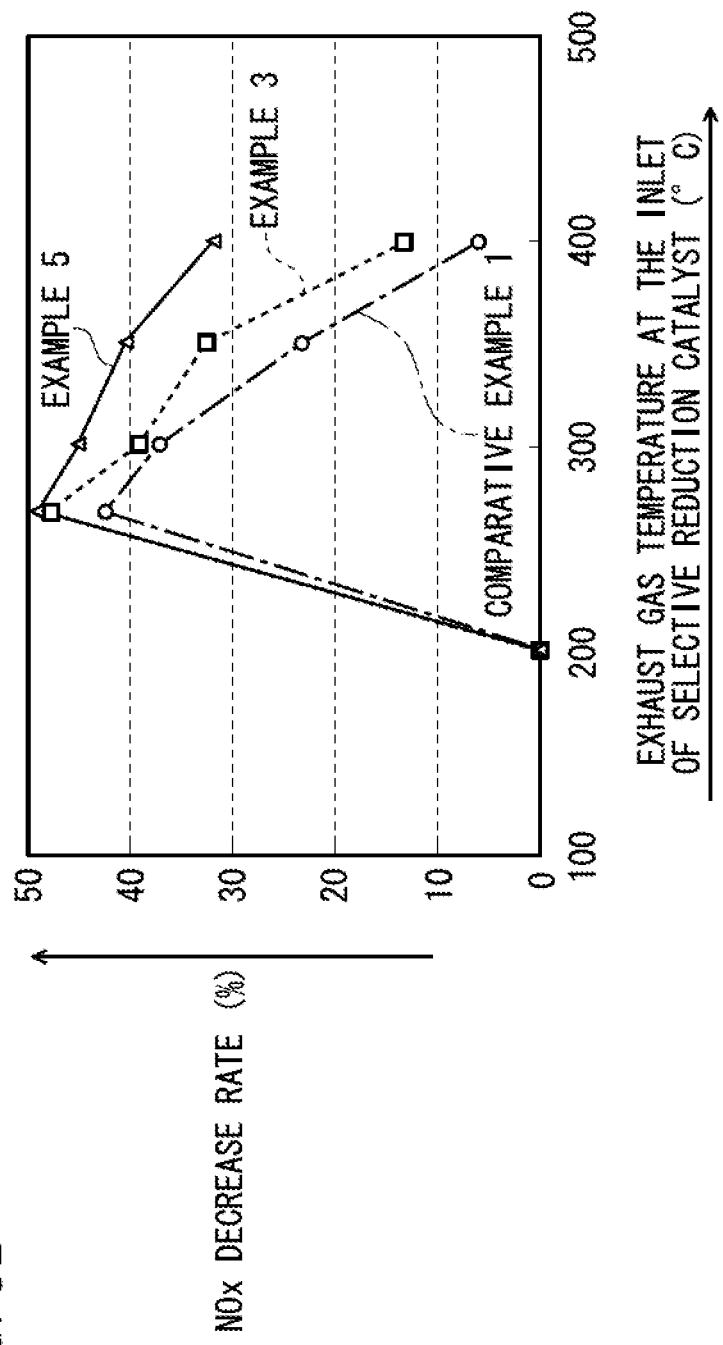
FIG. 31 is a graph showing a change of a NOx decrease rate with the change of the exhaust gas temperature when each of the exhaust gas purifiers of the examples 3 and 5 and a comparative example 1.

As can be seen from FIG. 31, in the exhaust gas purifier of the comparative example 1, the NOx decrease rate was low and about 42% at maximum, whereas in the exhaust gas purifiers of the examples 3 and 5, the NOx decrease rate was high and from about 48 to 49% at maximum. Meanwhile, when the exhaust temperature increased to about 400° C., the NOx decrease rate in the comparative Example 1 was lowered to about 6%, whereas even when the exhaust gas temperature increased to about 400° C., the NOx decrease rate in the example 3 was lowered only to about 13%, and even when the exhaust gas temperature increased to about 400° C., the NOx decrease rate in the example 5 was lowered only to about 32%.

Example 6

As shown in FIGS. 20 and 21, the fuel reformer 313 includes the hermetically sealed cylindrical reforming case 327, the reforming catalyst 328 housed in this reforming case 327, the fuel passageway 329 provided helically between the inner peripheral surface of the reforming case 327 and the outer peripheral surface of the reforming catalyst 328, and the heater 331 which is helically arranged so as to surround the fuel passageway 329 and which is embedded in the wall of the reforming case 327. The reforming case 327 was formed of SUS 316, and a sheathed heater was used as the heater 331. Also, the reforming catalyst 328 was a rhodium-based catalyst manufactured by coating a honeycomb carrier with a slurry containing a zeolite powder having been ion-exchanged with rhodium.

As shown in FIG. 19, an inlet end of the above-described fuel reformer 313 was connected to the fuel tank 37 via the first supply pipe 316, an outlet end of the fuel reformer 313 was connected to the injection nozzle 318 via the second supply pipe 342, and the injection nozzle 318 was provided so that it extended to the exhaust pipe 12 on the exhaust gas upstream side of the selective reduction catalyst 31. Also, the fuel supply pump 38 was provided in the first supply pipe 316a, and the flow rate regulation valve 341 which opens and closes this second supply pipe 342 was provided in the second supply pipe 342. Furthermore, the exhaust gas temperature sensor 53 was provided on the exhaust gas inlet side of the selective reduction catalyst 31 in the reforming case 326. Except what is described above, the configuration was made the same as that of the exhaust gas purifier having the fuel reformer of the example 1. This exhaust gas purifier was an example 6.

Comparative Example 2

The configuration was made the same as that of the example 6, except that the fuel reformer was not provided. This exhaust gas purifier was a comparative example 2.
<Comparison Test 7 and Evaluation>

Figure 32:
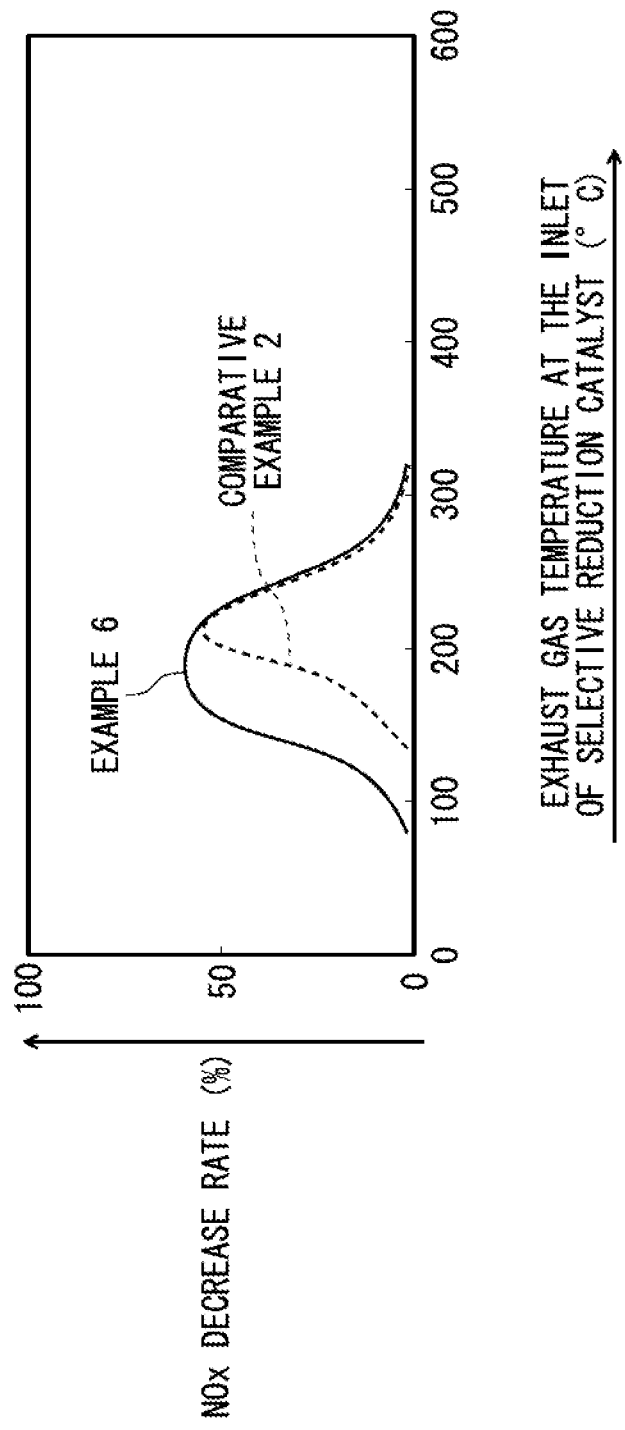
FIG. 32 is a graph showing a change of a NOx decrease rate following a change of an exhaust gas temperature when each of exhaust gas purifiers of an example 6 and a comparative example 2.

A NOx decrease rate was measured while the temperature of the exhaust gas discharged from each of the exhaust pipes of the engine of the example 6 and comparative Example 2 from 100° C. to 550° C. was gradually increased by varying a rotational speed and a load of the engine. Results are shown in FIG. 32. It should be noted that in the exhaust gas purifier of the example 6, when the exhaust gas temperature was from 100 to 180° C., the heater was turned on to supply the hydrocarbon-based gas from the injection nozzle to the exhaust pipe, and when the exhaust gas temperature exceeded 180° C., the heater was turned off to supply the liquid fuel from the injection nozzle into the exhaust pipe. Also, in the exhaust gas purifier of the comparative example 2, when the exhaust gas temperature was in the range of from 100 to 550° C., the fuel supply device was driven to supply the liquid fuel from the injection nozzle to the exhaust pipe.

As can be seen from FIG. 32, it is found that in the exhaust gas purifier of the comparative example 2, when the exhaust gas temperature was relatively low and in the range of from 100 to 180° C., NOx in the exhaust gas could not be substantially purified, whereas in the exhaust gas purifier of the example 6, when the exhaust gas temperature was relatively low and in the range of from 100 to 180° C., the purification rate of NOx in the exhaust gas abruptly increased with an increase of the temperature. It is also found that when the exhaust gas temperature exceeded 200° C., the purification rate of NOx by the exhaust gas purifier of the comparative example 2 was substantially equal to the purification rate of NOx by the exhaust gas purifier of the example 6.

INDUSTRIAL APPLICABILITY

In the fuel reformer and the exhaust gas purifier using the same according to the present invention, the fuel reformer decomposes the fuel including the hydrocarbon based-liquid to reform it into the reducing gas, and by using the reducing gas resulting from the reformation by this fuel reformer as the reducing agent of the exhaust gas purifier, it can be utilized for purifying NOx in an exhaust gas of engine.

It should be noted that this international application claims the benefits of Japanese Patent Application No. 200371 (2011-200371) filed on Sep. 14, 2011 and Japanese Patent Application No. 005805 (2012-005805) filed on Jan. 16, 2012, and the contents of Japanese Patent Applications Nos. 2011-200371 and 2012-005805 are incorporated herein in their entirety.

The invention claimed is:
1. A fuel reformer comprising:
a carrier gas injection nozzle that injects a carrier gas supplied from a carrier gas source;
a carrier gas heating part provided between the carrier gas source and the carrier gas injection nozzle and that can adjust an amount of heat generation for heating the carrier gas supplied from the carrier gas source, the carrier as heating part including:
a coil holding part formed in a columnar shape,
a heating coil embedded so as to extend along an outer peripheral surface of the coil holding part and not be exposed on the outer peripheral surface of the coil holding part, and
a carrier gas passage coil that is helically wound around the outer peripheral surface of the coil holding part to thereby form a carrier as passage through which the carrier gas flows helically along the outer peripheral surface of the coil holding part;
a fuel supply nozzle that supplies a fuel, including a hydrocarbon-based liquid and supplied from a fuel source, to a tip end of the carrier gas injection nozzle so that the fuel is atomized with the carrier gas injected from the carrier gas injection nozzle;
a reforming part that includes an inlet that faces the carrier gas injection nozzle and the fuel supply nozzle and that decomposes the atomized fuel so as to reform the atomized fuel into a reducing gas including either or both of hydrogen and an oxygen-containing hydrocarbon; and
a reducing gas supply nozzle that is attached to in an exhaust pipe of an engine so as to supply the reducing gas discharged from an outlet of the reforming part to the exhaust pipe.

2. The fuel reformer according to claim 1, wherein the reforming part includes a glow plug that decomposes a part or a large part of the atomized fuel by heating the atomized fuel so as to reform the part or the large part of atomized fuel into the reducing gas including either or both of the hydrogen and the oxygen-containing hydrocarbon.

3. The fuel reformer according to claim 2, wherein the reforming part includes the glow plug and a reforming catalyst that is provided between the glow plug and the reducing gas supply nozzle at a predetermined distance from the glow plug and that decomposes a part or a large part of a remaining atomized fuel so as to reduce the part or the large part of the remaining atomized fuel into the reducing gas including either or both of the hydrogen and the oxygen-containing hydrocarbon.

4. The fuel reformer according to claim 1, wherein a fuel vaporizer that vaporizes a part or a large part of the fuel by heating is provided between the fuel source and the fuel supply nozzle.

5. The fuel reformer according to claim 1, further comprising:
a carrier gas temperature sensor that detects an outlet temperature of the carrier gas heating part; and
a controller that controls the amount of heat generation of the carrier gas heating part based on a detection output of the carrier gas temperature sensor and that controls a supply flow rate of the fuel to the fuel supply nozzle according to a flow rate of NOx flowing through the exhaust pipe, wherein
the reforming part includes either or both of a glow plug and a reforming catalyst.

6. The fuel reformer according to claim 5, wherein
the carrier gas heating part, the carrier gas injection nozzle, the fuel supply nozzle, and the reforming part are housed in a reformer housing, and
the reformer housing is connected to a base end of the reducing gas supply nozzle.

7. The fuel reformer according to claim 1, wherein
a bypass pipe that bypasses the reforming part is provided,
a circulation pump that returns the reducing gas and the atomized fuel, which are discharged from the reforming part, to just before the carrier gas injection nozzle is provided in the bypass pipe,
a temperature of the reforming part is detected by a reforming part temperature sensor, and
the controller controls the circulation pump based on a detection output of the reforming part temperature sensor.

8. A fuel reformer comprising
a carrier gas heating part that can adjust an amount of heat generation for heating a first carrier gas supplied from a carrier gas source through a first carrier gas supply pipe;
a first carrier gas injection nozzle that injects the first carrier gas heated by the carrier gas heating part;
a first fuel supply nozzle that supplies a fuel including a hydrocarbon-based liquid to a tip end of the first carrier gas injection nozzle so that the fuel is atomized with the first carrier gas injected from the first carrier gas injection nozzle;
an exothermic catalyst part that includes an inlet facing the first carrier gas injection nozzle and the first fuel supply nozzle and that oxidizes the atomized fuel to further heat the first carrier gas and to increase a temperature thereof;
a second carrier gas supply pipe that mixes a second carrier gas supplied from the carrier gas source with the first carrier gas heated by the exothermic catalyst part;
a second carrier gas injection nozzle that injects the mixed carrier gas of the first and second carrier gases;
a second fuel supply nozzle that supplies the fuel including the hydrocarbon-based liquid to a tip end of the second carrier gas injection nozzle so that the fuel is atomized with the mixed carrier gas injected from the second carrier gas injection nozzle;
a reforming part that includes an inlet facing the second carrier gas injection nozzle and the second fuel supply nozzle and that decomposes the atomized fuel to reform the atomized fuel into a reducing gas including either or both of hydrogen and an oxygen-containing hydrocarbon;
a reducing gas supply nozzle that is attached to an exhaust pipe of an engine so as to supply, to the exhaust pipe, the reducing gas discharged from an outlet of the reforming part;
a first carrier gas temperature sensor that detects an outlet temperature of the carrier gas heating part;
a second carrier gas temperature sensor that detects an outlet temperature of the exothermic catalyst part; and
a controller that controls the amount of heat generation of the carrier gas heating part based on a detection output of the first carrier gas temperature sensor, that controls a supply flow rate of the fuel to the first fuel supply nozzle based on a detection output of the second carrier gas temperature sensor, and that further controls a supply flow rate of the fuel to the second fuel supply nozzle according to a flow rate of NOx flowing through the exhaust pipe.

9. The fuel reformer according to claim 8, wherein
the carrier gas heating part, the first carrier gas injection nozzle, the first fuel supply nozzle, the exothermic catalyst part, the second carrier gas injection nozzle, the second fuel supply nozzle, and the reforming part are housed in a reformer housing, and
the reformer housing is connected to a base end of the reducing gas supply nozzle.

10. The fuel reformer according to claim 8, wherein
the carrier gas heating part includes
a coil holding part formed in a columnar shape,
a heating coil that is embedded so as to extend along an outer peripheral surface of this coil holding part and not to be exposed on the outer peripheral surface of the coil holding part, and
a carrier gas passage coil that is helically wound around the outer peripheral surface of the coil holding part, to thereby form a carrier gas passage through which the first carrier gas flows helically along the outer peripheral surface of the coil holding part.

11. An exhaust gas purifier comprising
a selective reduction catalyst that is provided in an exhaust pipe of an engine and that can reduce NOx in an exhaust gas to $N_2$;
the fuel reformer according to claim 1, the fuel reformer including the reducing gas supply nozzle extending to the exhaust pipe on an exhaust gas upstream side of the selective reduction catalyst and, in operation, supply from the reducing gas supply nozzle to the exhaust pipe, the reducing gas which functions as a reducing agent in the selective reduction catalyst;
an exhaust gas temperature sensor that detects an exhaust gas temperature related to the selective reduction catalyst; and
a controller, which in operation, controls operation of the fuel reformer based on a detected on output of the exhaust gas temperature sensor.

12. An exhaust gas purifier comprising
a selective reduction catalyst that is provided in an exhaust pipe of an engine and that can reduce NOx in an exhaust gas to $N_2$;
the fuel reformer according to claim 8, the fuel reformer including the reducing gas supply nozzle extending to the exhaust pipe on an exhaust gas upstream side of the selective reduction catalyst and, in operation, supplying from the reducing gas supply nozzle to the exhaust pipe, the reducing gas which functions as a reducing agent in the selective reduction catalyst;

an exhaust gas temperature sensor that detects an exhaust gas temperature related to the selective reduction catalyst; and a controller, which in operation, controls operation of the fuel reformer based on a detection output of the exhaust gas temperature sensor.

13. An exhaust gas purifier for purifying an exhaust gas of an engine, the exhaust gas purifier comprising:

a selective reduction catalyst that is provided in an exhaust pipe of the engine and that can reduce NOx in the exhaust gas to $N_2$;

a fuel reformer that heats a liquid fuel in a hermetically sealed reforming case by a heater to vaporize or vaporize and mist the liquid fuel and that further reforms the vaporized or vaporized and misted fuel with a reforming catalyst into a hydrocarbon-based gas, the fuel reformer including:

a carrier gas injection nozzle that injects a carrier gas supplied from a carrier gas source;

a carrier gas heating part provided between the carrier gas source and the carrier gas injection nozzle and that can adjust an amount of heat generation for heating the carrier gas supplied from the carrier gas source, the carrier gas heating part including:

a coil holding part formed in a columnar shape, a heating coil embedded so as to extend along an outer peripheral surface of the coil holding part and not be exposed on the outer peripheral surface of the coil holding part, and a carrier gas passage coil that is helically wound around the outer peripheral surface of the coil holding part to thereby form a carrier gas passage through which the carrier gas flows helically along the outer peripheral surface of the coil holding part;

a fuel supply device that supplies the fuel into the fuel reformer;

an injecting nozzle that extends to an exhaust pipe on an exhaust gas upstream side of the selective reduction catalyst and that can inject the hydrocarbon-based gas reformed with the reforming catalyst;

a catalyst temperature sensor that detects an exhaust gas temperature related to the selective reduction catalyst;

a pressure sensor that detects an inlet pressure of the fuel reformer; and a controller, which in operation, controls operation of the fuel reformer and the fuel supply device based on respective detection outputs of the catalyst temperature sensor and the pressure sensor.

14. The exhaust gas purifier according to claim 13, wherein the fuel reformer includes the hermetically sealed cylindrical reforming case, the reforming catalyst housed in this reforming case, a fuel passageway that is provided helically between an inner peripheral surface of the reforming case and an outer peripheral surface of the reforming catalyst, and the heater that is helically arranged so as to surround the fuel passageway and that is embedded in a wall of the reforming case.

15. The exhaust gas purifier according to claim 13, comprising:

a bypass pipe that communicates and connects an inlet part and an outlet part of the fuel reformer with each other so as to bypass the fuel reformer; and an opening degree regulation valve that is provided in the bypass pipe and that regulates an opening degree of the bypass pipe.

* * * * *

UNITED STATES PATENT AND TRADEMARK OFFICE
CERTIFICATE OF CORRECTION

PATENT NO.       : 9,623,376 B2
APPLICATION NO.  : 14/344852
DATED            : April 18, 2017
INVENTOR(S)      : Hiroshi Hirabayashi et al.

Page 1 of 1

It is certified that error appears in the above-identified patent and that said Letters Patent is hereby corrected as shown below:

In the Claims

Column 44, Line 38:
"to thereby form a carrier as passage through which" should read, --to thereby form a carrier gas passage through which--.

Column 46, Line 49:
"selective reduction catalyst and, in operation, supply" should read, --selective reduction catalyst and, in operation, suppling--.

Column 46, Line 57:
"fuel reformer based on a detected on output of the" should read, --fuel reformer based on a detected output of the--.

Signed and Sealed this
Nineteenth Day of December, 2017

Joseph Matal
*Performing the Functions and Duties of the
Under Secretary of Commerce for Intellectual Property and
Director of the United States Patent and Trademark Office*